US005627969A

United States Patent [19]
Kobayashi et al.

[11] Patent Number: 5,627,969
[45] Date of Patent: May 6, 1997

[54] UNIVERSAL LINK CONFIGURATOR FOR PHYSICAL LINK CONFIGURATIONS IN A DATA LINK NODE

[75] Inventors: Seiichi Kobayashi; Taro Asao, both of Kawasaki, Japan

[73] Assignee: Fujitsu Limited, Kanagawa, Japan

[21] Appl. No.: 563,557

[22] Filed: Nov. 28, 1995

Related U.S. Application Data

[63] Continuation of Ser. No. 262,913, Jun. 21, 1994, abandoned.

[30] Foreign Application Priority Data

Nov. 15, 1993 [JP] Japan ..................... 5-308776

[51] Int. Cl.⁶ ................................................. G06F 13/00
[52] U.S. Cl. ................. 395/200.1; 395/800; 395/200.21
[58] Field of Search ........................... 395/800, 200.21, 395/200.1; 370/60, 85, 94.1, 110, 109, 112

[56] References Cited

U.S. PATENT DOCUMENTS

| | | | |
|---|---|---|---|
| 4,641,378 | 2/1987 | McConnell et al. | 455/619 |
| 4,723,208 | 2/1988 | Chadima, Jr. et al. | 395/200.21 |
| 4,781,427 | 11/1988 | Husbands et al. | 350/96.16 |
| 4,922,486 | 5/1990 | Lidinsky et al. | 370/60 |
| 5,003,508 | 3/1991 | Hall | 395/286 |
| 5,008,882 | 4/1991 | Peterson et al. | 370/94.1 |
| 5,046,185 | 9/1991 | Hirai et al. | 375/4 |
| 5,051,992 | 9/1991 | Taniguchi et al. | 370/110.1 |
| 5,058,132 | 10/1991 | Li | 375/38 |
| 5,093,824 | 3/1992 | Coan et al. | 370/16 |
| 5,138,615 | 8/1992 | Lamport et al. | 370/94.3 |
| 5,181,017 | 1/1993 | Frey, Jr. et al. | 395/200 |
| 5,204,949 | 4/1993 | Yasue et al. | 395/200 |
| 5,237,659 | 8/1993 | Takots | 395/200 |
| 5,267,245 | 11/1993 | Maruyama et al. | 370/109 |
| 5,282,257 | 1/1994 | Ota | 385/46 |
| 5,295,012 | 3/1994 | Wilson et al. | 370/85.7 |
| 5,295,139 | 3/1994 | Palmer | 370/60 |
| 5,313,496 | 5/1994 | de Goede | 375/95 |
| 5,345,558 | 9/1994 | Opher et al. | 395/200 |

Primary Examiner—Mehmet B. Geckil

[57] ABSTRACT

A link configurator capable of freely forming a physical link configuration per node. This link configurator has a first selective switch logic group for selecting the termination or the relay of a first data stream on a near-end aggregate or tributary side, a second selective switch logic group for selecting the termination or the relay of a second data stream on a far-end connecting side to an adjacent node group, and a connecting group for connecting the first and the second selective switch logic groups. The first and second selective switch logic groups are set to have a terminating or relaying function by a selective control signal.

9 Claims, 52 Drawing Sheets

F I G. 3 5
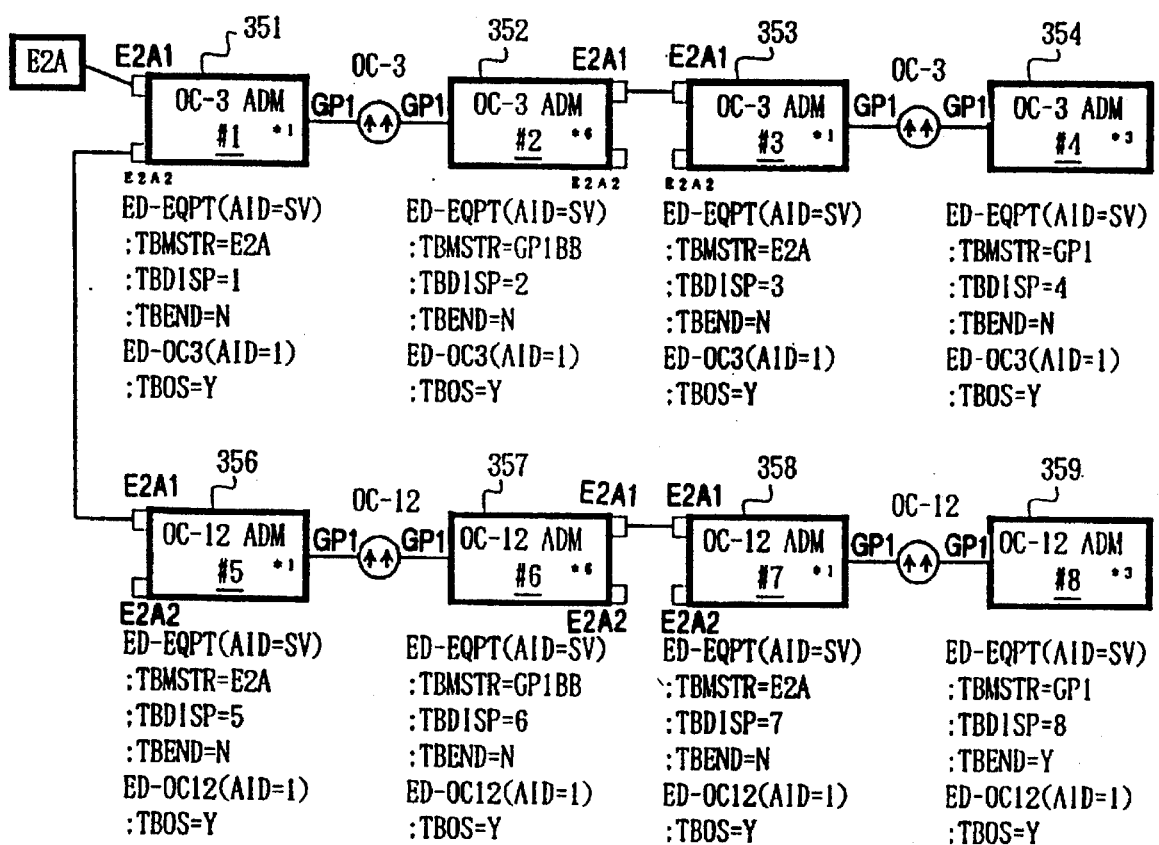

UNIVERSAL LINK CONFIGURATOR FOR PHYSICAL LINK CONFIGURATIONS IN A DATA LINK NODE

This is a continuation of application Ser. No. 08/262,913, filed Jun. 21, 1994 now abandoned.

BACKGROUND OF THE INVENTION

1. Field of the Invention

The present invention relates to a universal link configurator, and particularly to a universal link configurator capable of making physical link configurations per a data link node (e.g. E2A-TBOS: Telemetory Byte Oriented Serial system in North American BOC) such as a carrier current supply apparatus or a data communication apparatus for a specific application (e.g. maintenance or management) utilizing Over Head Bits (service bits) and a general Data Communication Bearer (e.g. DDS or ISDN).

2. Related Prior Art

Conventionally, a data relay (intermediate) node or a data terminal (End) node has examined a data block called a packet consisting of an information portion and a header portion for describing the service organization to dynamically determine whether or not the data block should be terminated or forwarded at the node so that the logical connection may not depend on a physical connecting configuration.

It is of course that those nodes are physically and completely linked so that the data block or packet may communicate with all of the nodes in the network. However, such a sequential relaying operation for packets at each of the nodes requires a processing time to determine the termination or the relay of the information.

In a network with a comparatively large number of nodes, a maxium transferring time is remarkably increased depending on the number of hops which is the number of nodes the data block passes through. It is therefore seen that a response with respect to a predetermined information in a specific route is extremely delayed.

Further, this provides an operating characteristic that the message response times in all of the nodes are not confined in a restricted range.

Therefore, it is not generally suitable for a specific application such as a service mainly for a maintenance or management which only requires simplicity, rapidity or the like. This is because if the message response times in all of the nodes do not conform within the restricted range, the management time of all of the nodes for a fault detecting phase, a fault specifying phase, and a fault restoring phase for a maintenance or management may be different from each other.

In addition, if a more complicated management for the elements of the nodes is demanded, an object with a multi-function and a high-performance hardware/software, that is an expensive apparatus or equipment is required for a concentrated control, which fails to pay for customer's plant and equipment investment circumstances.

Therefore, particularly for such a specific application, there is required a service which is good in the efficiency of plant and equipment investment with respect to rationalization and needs no logical connecting procedures.

Because of no logical connecting procedures, it is necessary for every topological network to have means for providing complete links and a double routing allocation function for the network facility fault.

For such a specific application, there is prior art individually providing a route connection for each of the nodes and providing entire routing to realize a rapidity (high response) by taking advantage of a fixed nature or semi-fixed nature of physical connecting circumstances which are characterized by a service based on such a specific application. In this case, the data block has no header portion describing a service organization and provides no logical connecting services.

Thus, there is prior art which assures the quality of data on the route in the form of hardware. However, such prior art has a supportable physical conneting configuration limited to "Point to Point" or "Tree" and can not meet all of the topologies belonging to communication networks.

Furthermore, a recursive network connected in the form of a ring does not have a double routing allocation function for a particular facility fault.

Also, since connecting means depend on mechanical switches, the change of an initial physical connecting configuration according to the increase or decrease in the number of network nodes as a controlled object or a network facility fault can easily cause a large number of problems due to manual operations in the form of hardware requiring a large quantity of time.

Therefore, the re-change of a connecting configuration for such a network facility fault requires a dynamic operation which a manual operation can not meet at all.

The above prior art substantially has no means which meet a dynamic routing allocation for changing a physical connection from an initial working condition, for a topological change of a network, and for discrete event by re-provisioning for a network manager or a double routing allocation function for a facility fault.

Under the circumstances, as described above, there has been increasing a demand for a universal function which can freely change the form of a physical connection of a data link node (e.g. E2A-TBOS: Telemetory Byte Oriented Serial system in North American BOC) such as a carrier current supply apparatus or data communication apparatus for a specific application (e.g. maitenance or management) utilizing Over Head Bits (service bits) and a general Data Communication Bearer (e.g. DDS or ISDN), with electronic provisioning or re-provisioning by a network manager for the application of network topologies.

Such a demand comes from an increase of a carrier current apparatus due to the increase of controlled objects (e.g. a line subscriber of a telephone service) which frequently occurs.

Accordingly, there has been required a provisional electronic link configurator and means for working the same which freely include a physical link configuration with respect to any network topology belonging to a communication network. There has been also required means for a double routing allocation for network facility faults.

SUMMARY OF THE INVENTION

It is accordingly an object of the present invention to provide a universal link configurator capable of making physical link configurations per a data link node which can avoid the adoption of a networking technology utilizing a logical connecting service which is difficult in maintaining uniformity for a message response time due to the increase of a response delay on a specific route, in view of the necessity of the rapidity (high speed response) in a specific application.

It is an another object of the present invention to provide a universal link configurator and an electronic type working means which can use a fixed or semi-fixed re-changeable physical connection utilizing electronic procedures with electronic provisioning or re-provisioning by a network manager for a routing service and which can make any network configurations belonging to a communication network having a double routing allocation function for network facility faults.

It is a further another object of the present invention to provide a provisional electronic link configurator which can freely include a physical link configuration with respect to any network topology belonging to a communication netwotrk.

A universal link configurator capable of making physical link configurations per a data link node comprises, as a basic arrangement, a first selective switch logic group for selecting the termination or the relay of a first data stream on a near-end aggregate or tributary side; a second selective switch logic group for selecting the termination or the relay of a second data stream on a far-end connecting side with an adjacent node group; and a connecting group for connecting said first selective switch logic group and said second selective switch logic group; said first selective switch logic group and said second selective switch logic group being set to perform the termination or the relay function by a selective control signal.

A further object and effect of the present invention will be made apparent from the following descriptions.

BRIEF DESCRIPTION OF THE INVENTION

The accompanying drawings, which are incorporated in and constitute a part of the specification, illustrate presently preferred embodiments of the invention, and together with the general description given above and the detailed description of the preferred embodiments given below, serve to explain the principles of the invention:

FIG. 35 is a diagram schematically showing a fifth application of the present invention;

DESCRIPTION OF THE PREFERRED EMBODIMENTS

Figure 1:
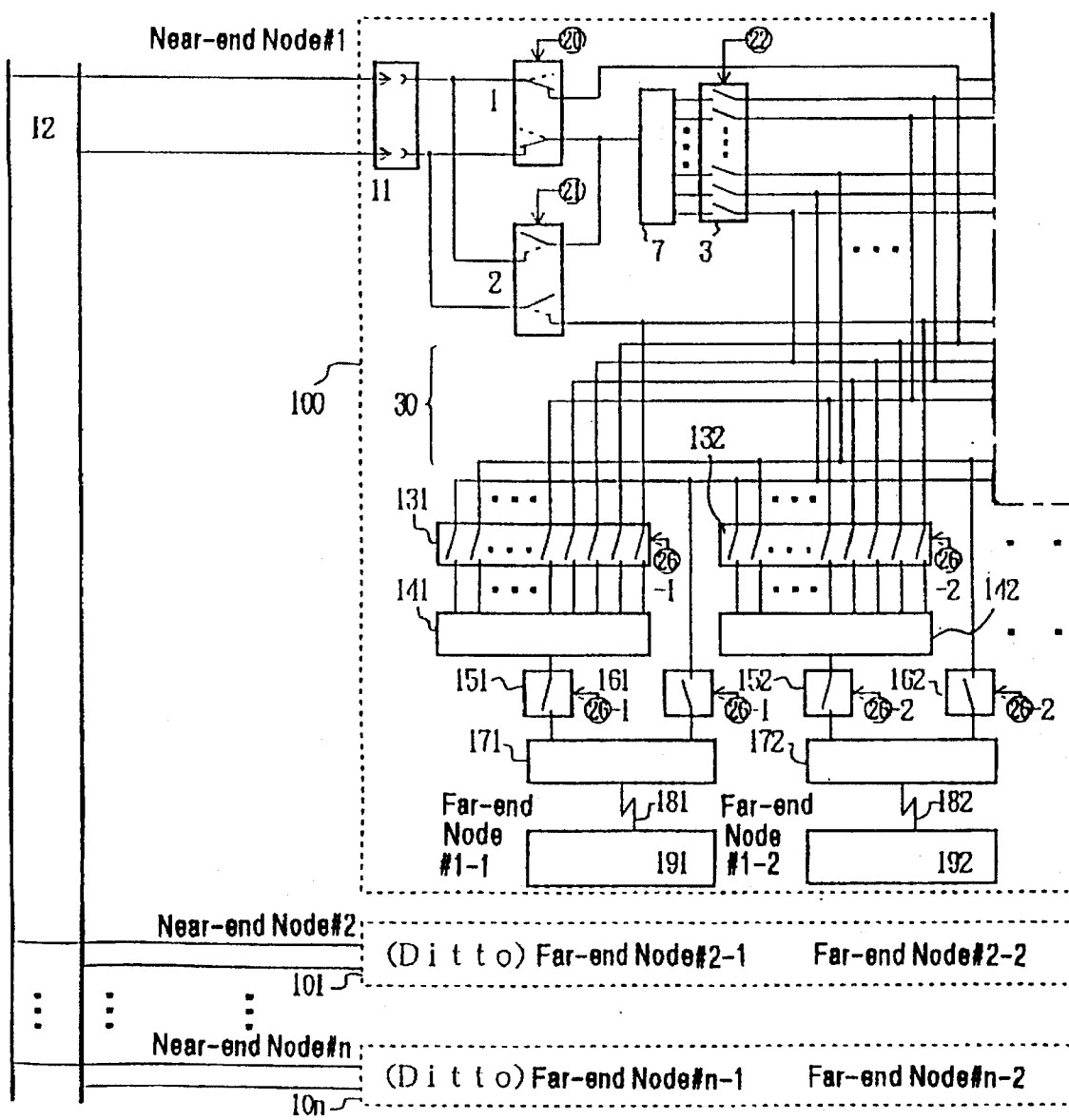
FIG. 1 is a diagram showing a part of a conceptual arrangement of the present invention.

In advance of the description of detailed embodiments of the present invention, the priciple thereof will now be described for a better understanding of the present invention. Throughout the following descriptions of the embodiments of the present invention, identical reference numerals or symbols are used to designate identical or corresponding portions.

Figure 2:
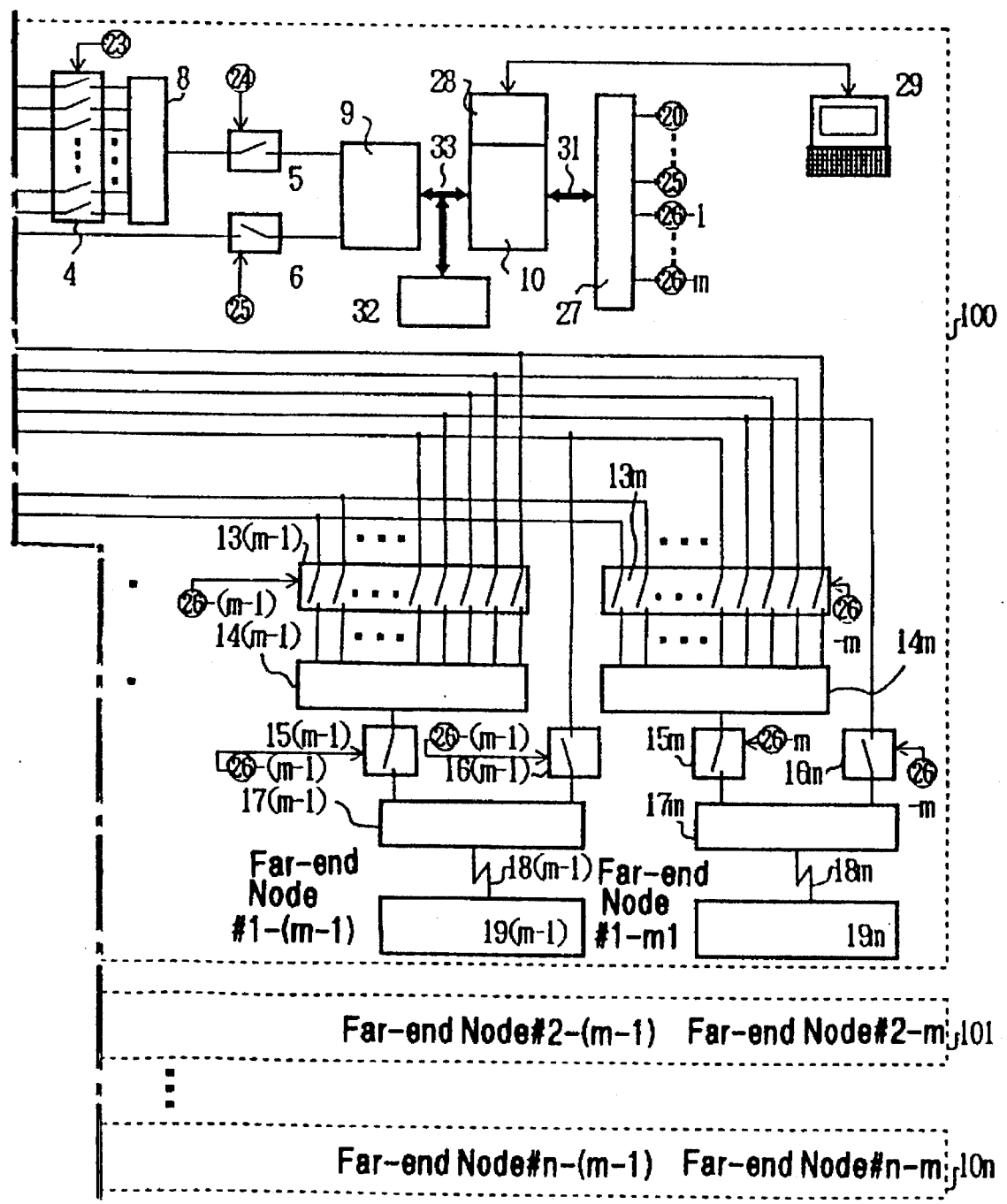
FIG. 2 is a diagram showing a part of a conceptual arrangement of the present invention having a connection with FIG. 1.

FIGS. 1 and 2 respectively show divided conceptual arrangements of a universal link configurator according to the present invention. In the figures, reference numerals 100, 101, . . . 10n denote universal link configurators of the present invention which are allocated in each of network nodes.

Near-end nodes which are adjacent from each other are connected through an information transfer path of aggregates or tributaries using a hard-wire 12 such as a cable. Also, far-end nodes which are adjacent from each other are connected through an information transfer path of an independent link using facility media 181, . . . , 18M.

Reference numerals 1 and 2 denote transfer switch logics for determining whether the nodes should function in the aggregates or in the tributaries with respect to data stream within an overhead bit flowing through the hard-wire 12 when the network nodes comprising a link configurator of the present invention are connected with a high impedance by the hard-wire 12.

The data stream flowing through the hard-wire 12 is converted into a level of TTL/CMOS logic signals which are base band signals by a carrier transmitting/receiving device 11, and are treated as such logic signals after the carrier transmitting/receiving device 11.

Reference numerals 151, . . . , 15m, 161 . . . 16m denote make switch logics for determining whether the data stream from adjacent far-end nodes should be disconnected or connected.

Adjacent far-end nodes are interconnected by carrier transmitting/receiving devices 171, . . . 17m at the near-end side and carrier transmitting/receiving devices 191, . . . 19m at the far-end side through facility media 181, . . . 18m such as overhead bit (service bit) facility provided in-band carrier such as optical signals, a user bit facility superimposed with an out-band carrier, or a general carrier facility.

The data stream flowing through the facility media 181, . . . 18m is converted into a TTL/CMOS logic signal having a base band level by the carrier transmitting/receiving devices 171, . . . 17m at the near-end side and is treated as the same logic signal following the carrier transmitting/receiving devices 171, . . . 17m at the near-end side.

Thus, the link configurator of the present invention has an option between two types of data stream, that is data stream at the near-end aggregates or tributaries and data stream at the far-end connecting side with adjacent node groups, with regard to the termination or relay at the node.

For this option, the former data stream is provided with selection switch logics 3, 4 and TTL/CMOS logic signal connecting devices 7, 8.

The latter data stream is provided with selection switch logic groups 131, . . . 13m and TTL/CMOS logic signal connecting device groups 141, . . . 14m. The selection switch logic groups 131, . . . 13m enable the data stream to be interconnected with all of the routes by the wiring combination of a connecting group 30.

A configuration controller 10 provides a selection switch logic setting binary code based on provisioning information from a craft virtual terminal recognized through a user interface 28 for a latched decoder 27 via a controller bus 31.

This binary code is converted into corresponding selection control signals 20, 21, 22, 23, 24, 25, 26, 26-1-26-m by the latched decoder 27. These selection control signals 20, 21, 22, 23, 24, 25, 26, 26-1-26-m change over corresponding selection switch logics and selection switch logic groups.

This makes a universal selection connecting control from a network manager and a double routing allocation control for a facility fault.

At the same time, the configuration controller 10 makes a control such that only an effective information is extracted out of the aforementioned two types of data stream on the route to be terminated and is written in or read from a shared memory through a serial connecting device 9 and a resident bus 33.

It is to be noted that the serial connectiong device 9 is connected to make switch logics 5, 6 for determining whether or not the aforementioned two types of data stream should be terminated at the input/output serial communication side. The make condition of these make switch logics 5, 6 are controlled by the selection control signals 24, 25 similary to corresponding latched decoder 27.

Thus, all of the nodes can be set as a simple relay node, a relaying or terminating intermediate node, or an exclusively terminating end-node.

As above described, the present invention provides the link configurator 100, 101, ... 10m as shown in FIGS. 1 and 2 in the divided form for each network node to connect adjacent near-end nodes through an information transfer path of aggregates or tributaries using the hard-wire 12.

Adjacent far-end nodes are connected by an information transfer path of an independent link using the facility media 181, ... 18m.

The link configurator 100, 101, ... 10m disposed in each of the network nodes respectively include a craft virtual terminal 29. This craft virtual terminal 29 makes electronic provisioning by using electronic procedures and a double routing allocation for a facility fault with respect to a recursive network comprehensive device whereby all of the information transfer paths directed to the link configurators can be freely connected or segregated.

Therefore, all of the network nodes and a sole apparatus or equipment for concentrated control or management can be completely linked directly or indirectly in the network regardless of a network topology.

Consequently, a predetermined message or command issued from a sole concentrated control or management equipment called a network node is delivered to all of the network nodes linked in the network by the aforementioned operation together with the responses from other nodes obtained on the relaying route.

Futhermore, each of the nodes filters out a predetermined message or command so that resources in the nodes can be selectively extracted by tracing the opposite route to the route where the message or command has been delivered from a specified node by the message or command.

At this time, the network node directly connected to such a sole concentrated control or management equipment extracts the resources from each of the nodes and transfers the same to the sole apparatus for concentrated control or management.

FIGS. 3 to 6 are diagrams illustrating an application of the universal link configurator of the present invention and the allocation thereof. In the figures, reference numeral 100 denote the universal link configurator according to the present invention.

Figure 3:
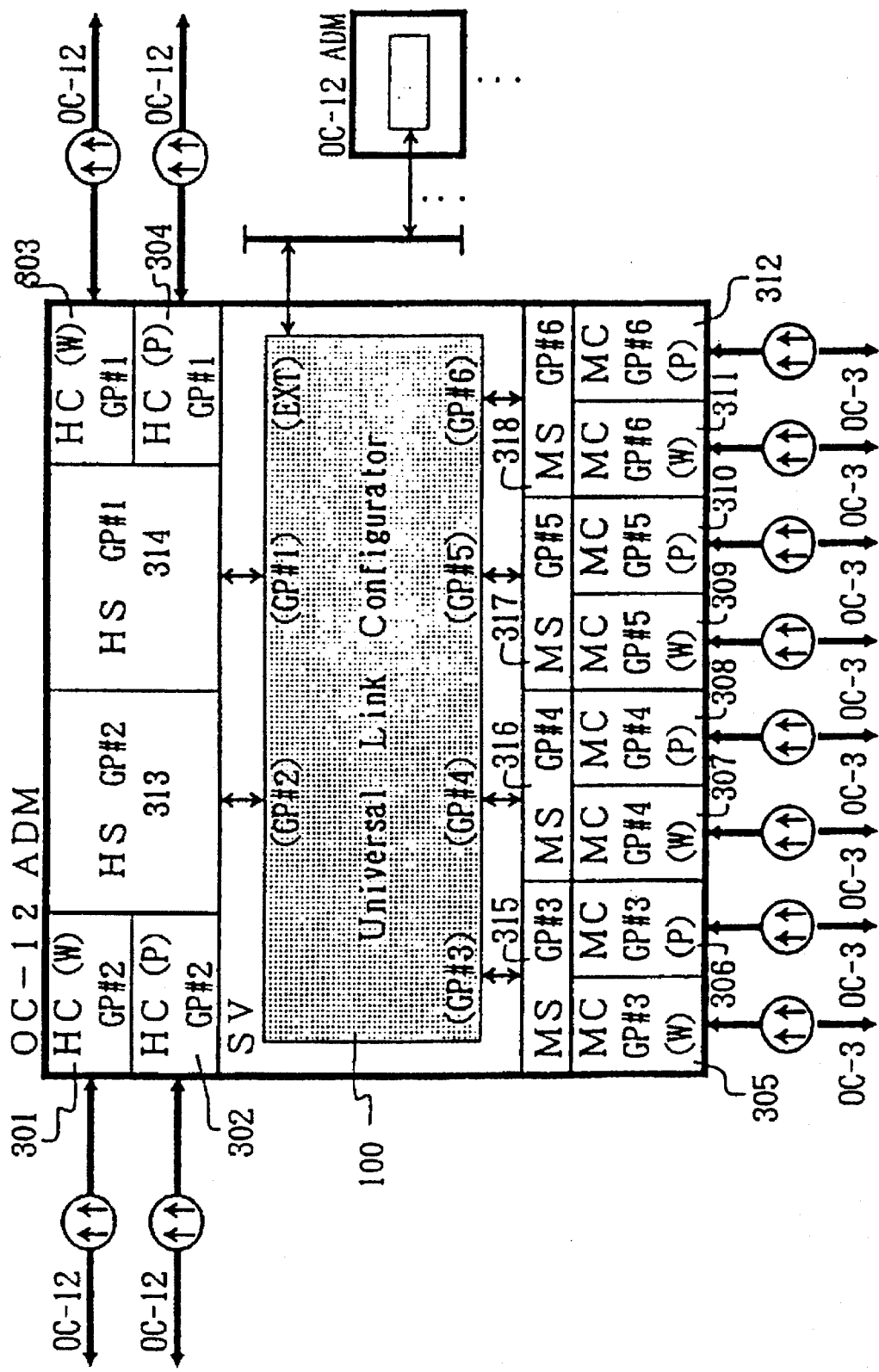
FIG. 3 is a first functional diagram of the present invention.
Figure 4:
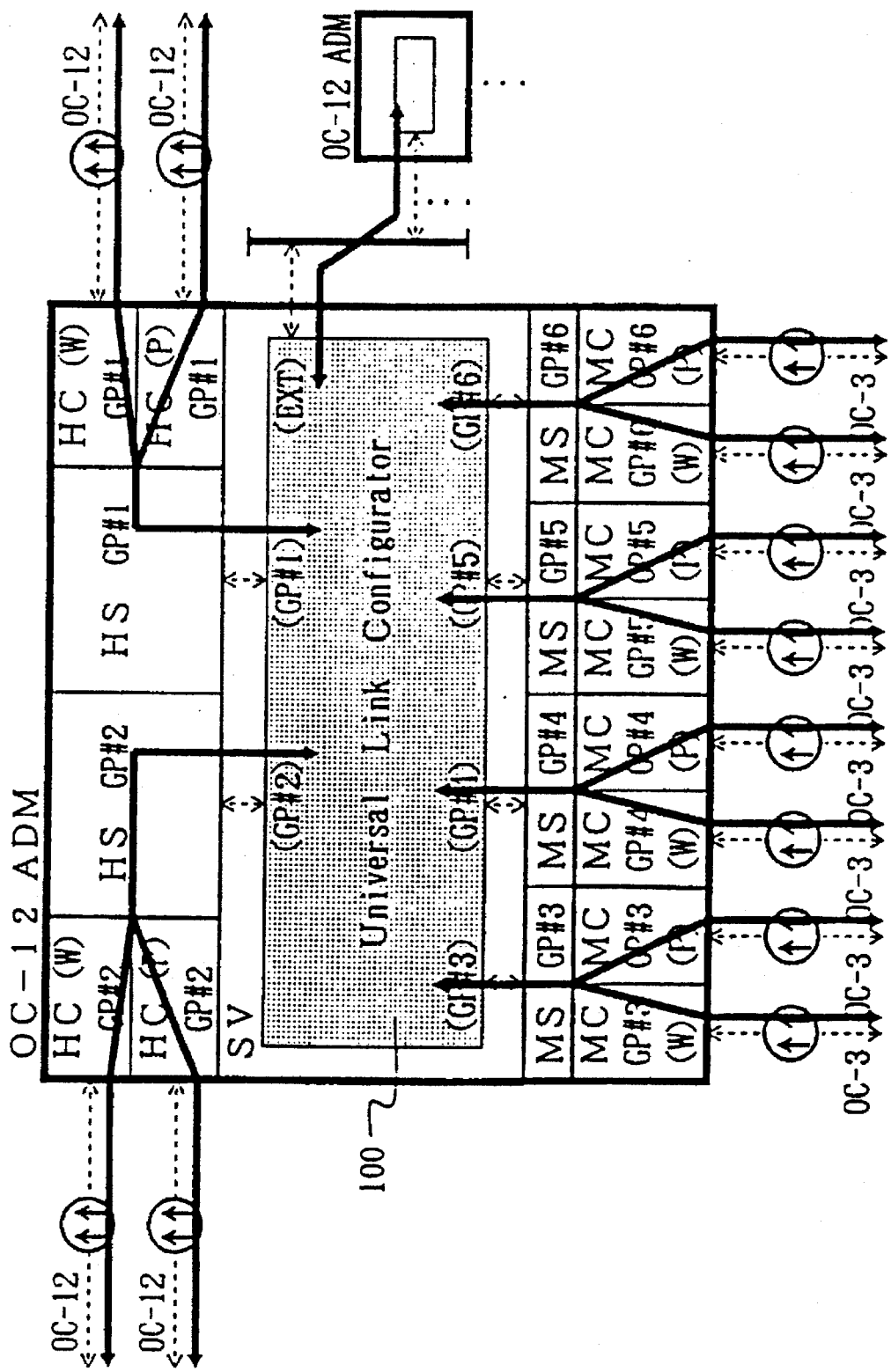
FIG. 4 is a first signal flow chart of the present invention corresponding to FIG. 3.
Figure 5:
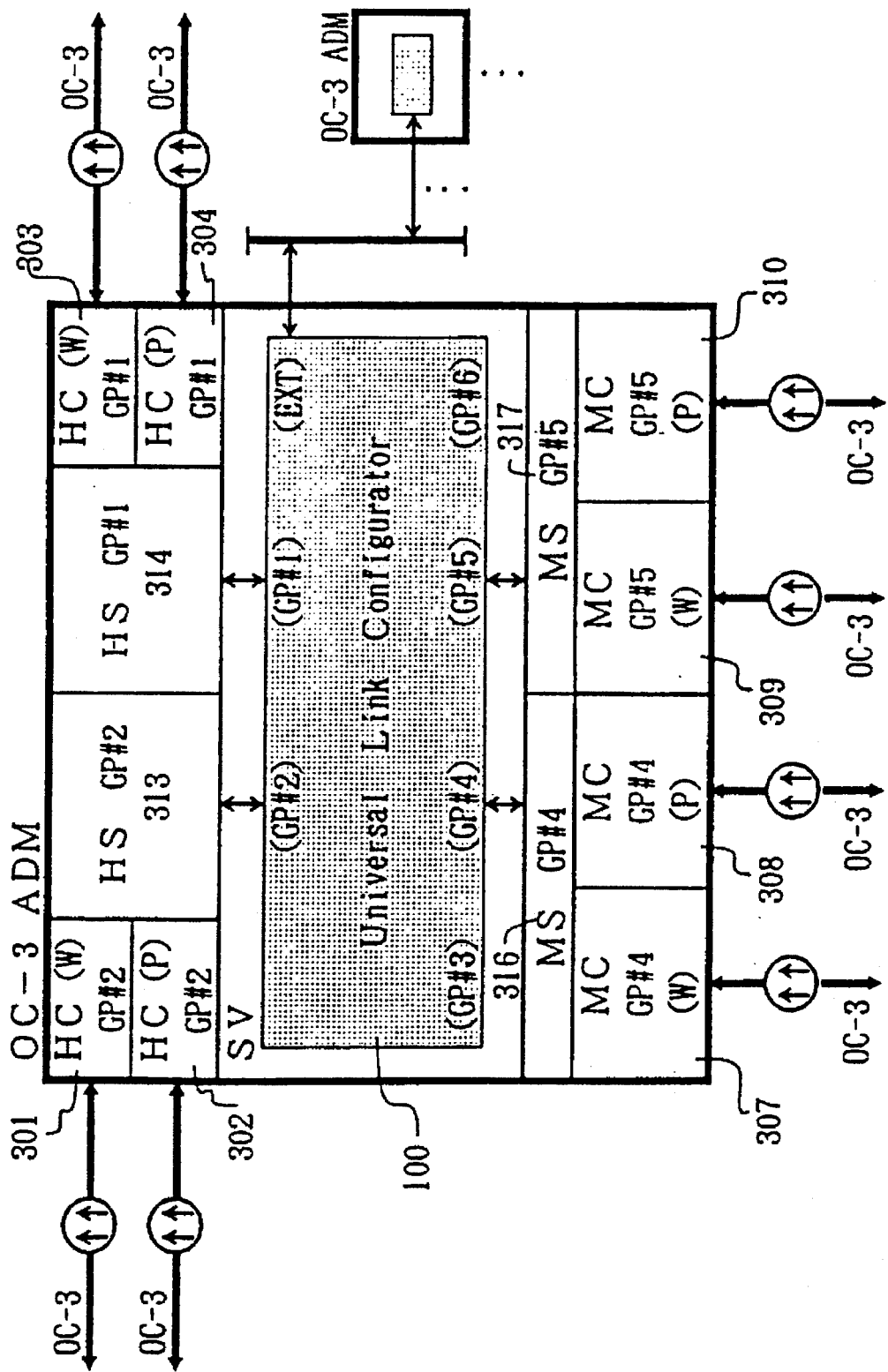
FIG. 5 is a second functional diagram of the present invention.
Figure 6:
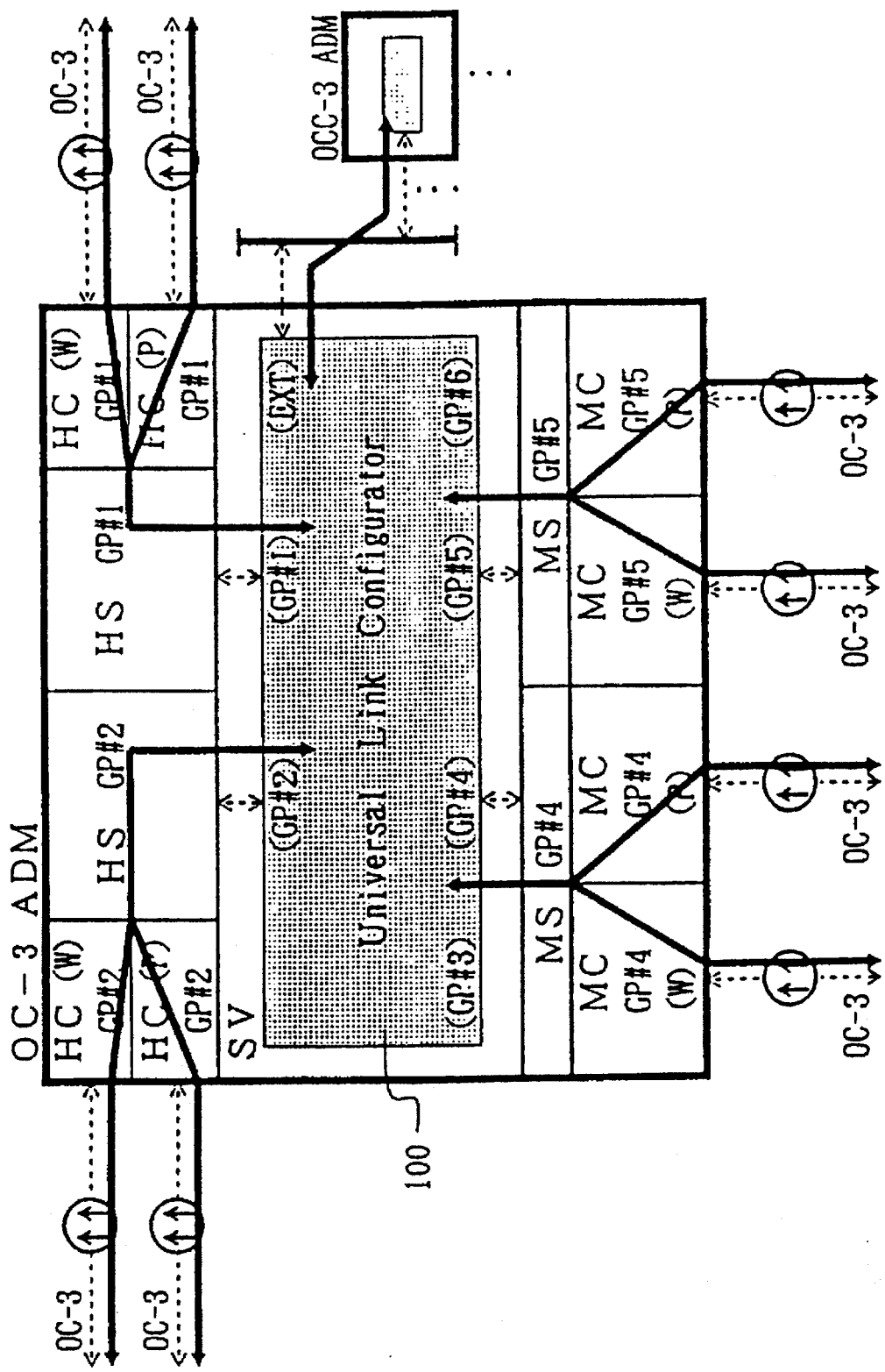
FIG. 6 is a second signal flow chart of the present invention corresponding to FIG. 5.

FIGS. 3 and 4 show an application of the universal link configurator according to the present invention to an OC-12 ADM (Add-Drop-Multiplexer), and FIGS. 5 and 6 show an application to an OC-3 ADM.

FIGS. 3 and 5 show a hardware arrangement of these apparatuses, FIGS. 4 and 6 show a signal flow chart with overhead facilities which the corresponding universal link configurators in FIGS. 3 and 5 can interface as an input/output information path.

It is to be noted that the OC-12 ADM or OC-3 ADM equipment is a kind which can make service for an optical transmission carrier in accordance with SONET (Synchronous Optical Network) standard which is the North American standard for a wire optical transmission system.

This equipment uses an OC-12 signal (Optical Carrier at level 12; having a data transmitting/receiving capability of 622.080 million bits/second) or an OC-3 signal (Optical Carrier at level 3; having a data transmitting/receiving capability of 155.520 million bits/second) as a backbone carrier, and realizes any tributary channel allocation by separating or connecting a synchronous multi-structured data block line represented in the carrier.

This equipment has a capability of transmitting/receiving the tributary source as a tributary carrier.

In FIG. 3, the backbone carrier is the OC-12 signal as shown by a thick arrows in the right and left directions and is terminated at HC (High-speed Channel) units 301–304 of the right GP (Group) #1 and the left GP #2.

Between MC (Middle-speed Channel) units 305–312 of the GP#3/GP#4/GP#5/GP#6 arranged in the lower portion of FIG. 3, a tributary channel allocation is carried out.

The backbone carrier is also converted into a tributary carrier as the OC-3 signal shown by thick arrows in the both directions in the lowest portion of FIG. 3. In the opposite process, the tributary carrier is terminated and given a tributary channel allocation, and is followed by the conversion into the backbone carrier.

It is to be noted that the HC units 301–304 and the MC units 305–312 at the GP#1–GP#6 are doubled to make a mutual service between two working and protecting units.

These six carrier facilities have overhead bits (service bits) for the maintenance of the lines which are multiplexed/demultiplexed by the HS (High-speed Switch) units 313–314 and the MS (Middle-speed Switch) units 315–318 in relation to each of the carriers.

Among the overhead bits as multiplexed/demultiplexed in that process, E2A-TBOS service bits used for an application of the present invention are provided as a service carrier for the universal link congfigurater.

These are, as shown by a thick arrow in FIG. 4, guided to the uiversal link configurator 100 of the present invention from the six carrier facilities.

Different from this, the HS units 313–314 and the MS units 315–318 carry out change-over operations between working and protecting optical facilities terminated by the HC units 301–304 and the MC units 305–312 of the GP#1–GP#6 by using the service bits for different applications in the overhead bits.

The universal link configurator 100 of the present invention also comprises an EXT (External Serial Communication) port for interface with external equipments.

An application for the OC-3 ADM equipment as shown in FIGS. 5 and 6 is the same as the application for the OC-12 ADM equipment as aforementioned except for that the backbone carrier is an OC-3 signal and the tributary carrier is also an OC-3 signal having only two groups (GP#4, GP#5).

It is to be noted that the OC-3 signal represented in the tributary carrier has an effective transmission capacity of just one third (51.840 million bits/second) of the carrier rate.

FIGS. 7–10 are block diagrams showing a detailed arrangements of an embodiment of the universal link configurator of the present invention.

Figure 7:
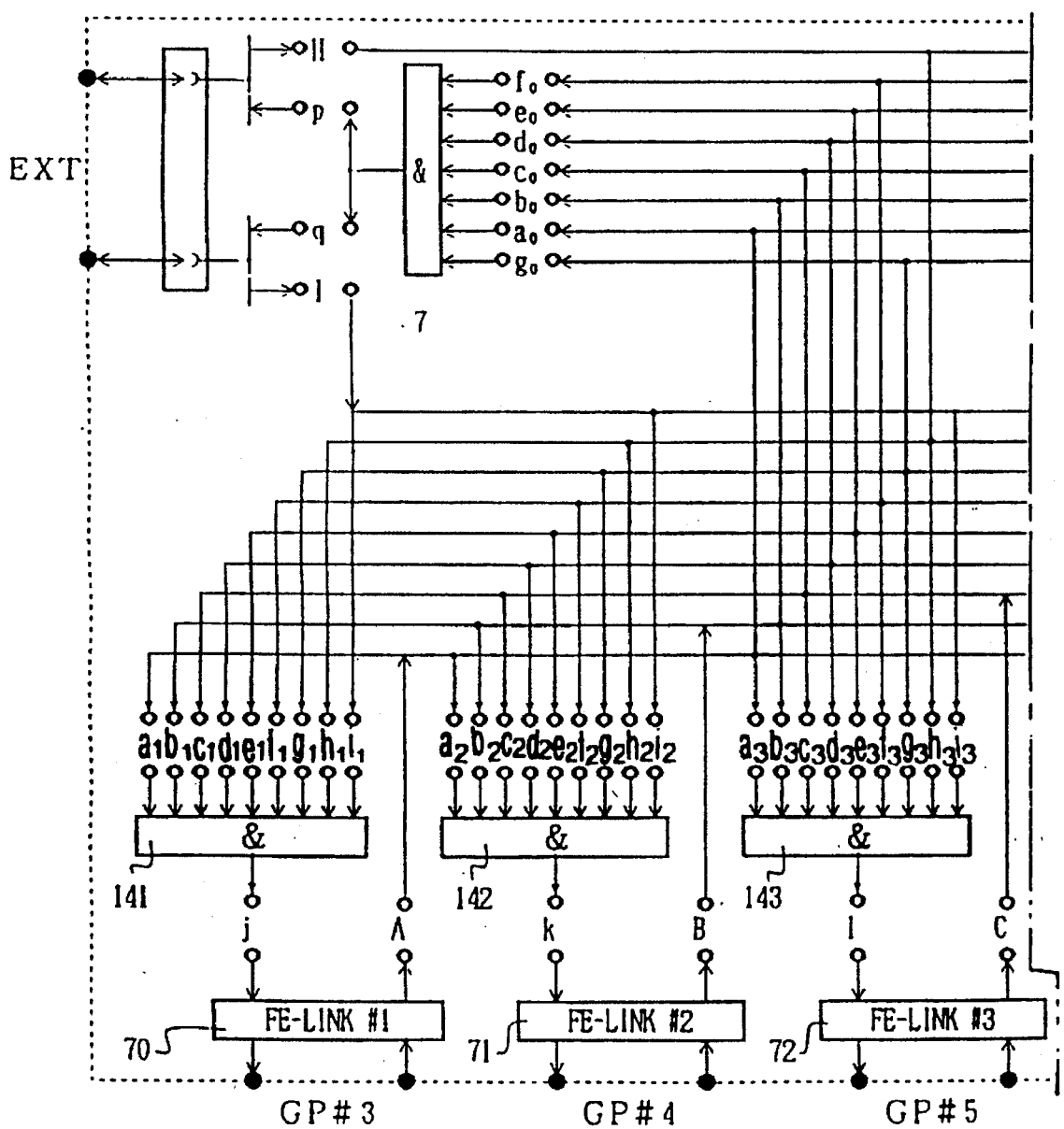
FIG. 7 is a diagram showing a part of a detailed arrangement of a first embodiment of the present invention.
Figure 8:
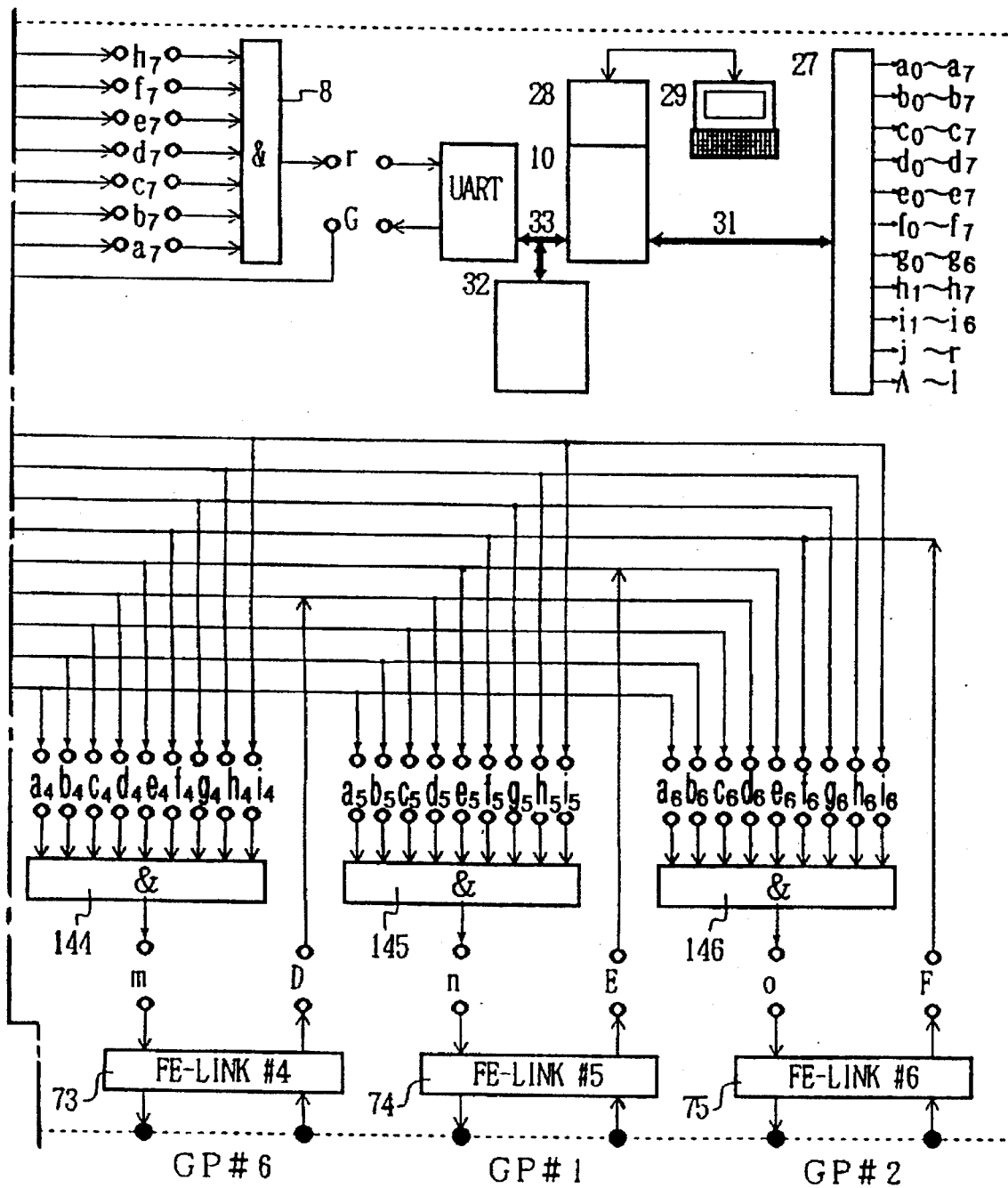
FIG. 8 is a diagram showing a part of a detailed arrangement of the first embodiment of the present invention having a connection with FIG. 7.

Particularly, FIGS. 7 and 8 illustrate two-divided details of the internal arrangement of the universal link configurator of the present invention provided in an SV (Super Vising) unit of each of the ADM equipments to effect a complete link function between networks in accordance with the allocation of the universal link configurator 100 in the OC-12 ADM to OC-3 ADM equipments shown in FIGS. 3 to 6.

Figure 9:
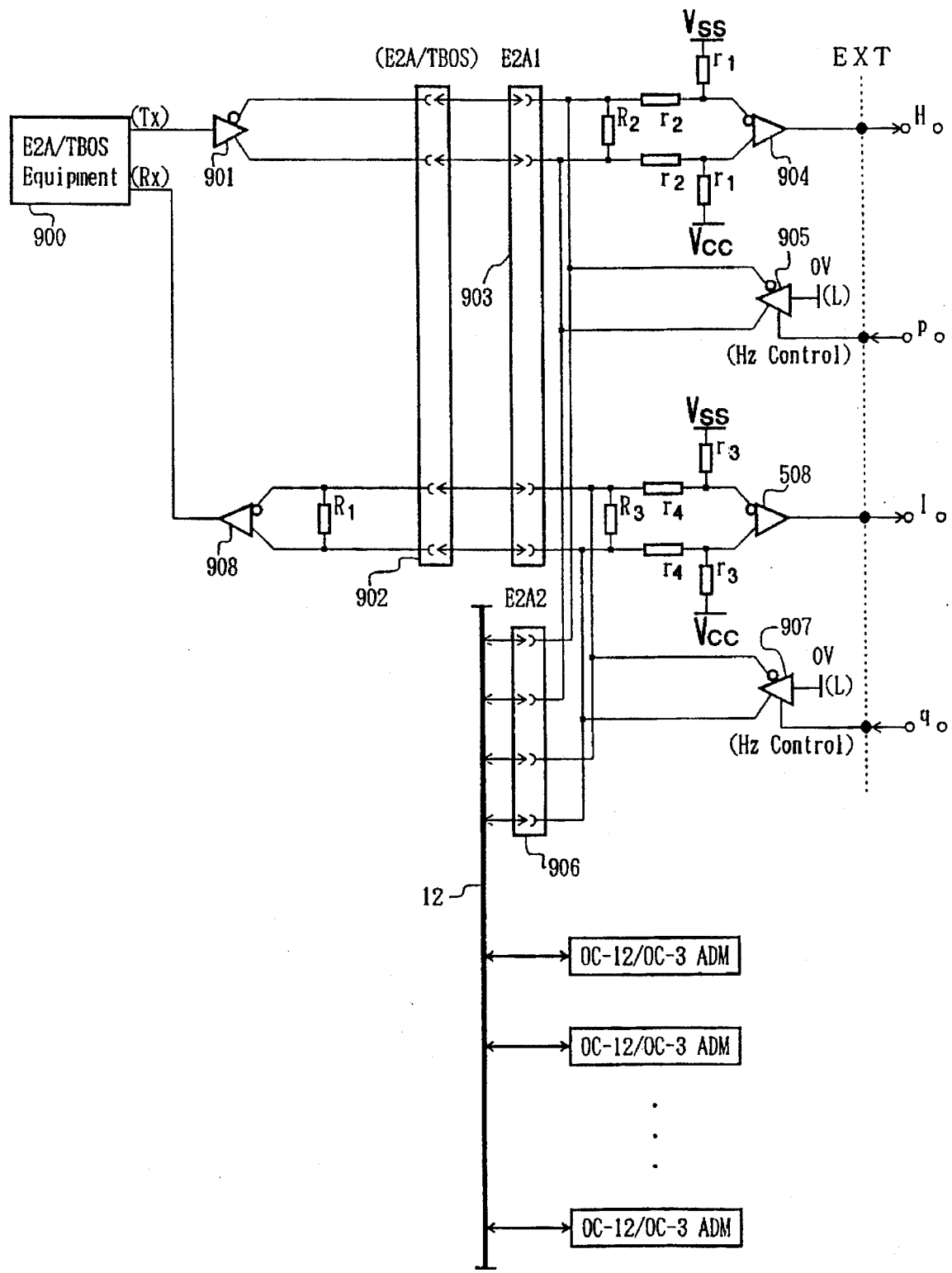
FIG. 9 is a diagram showing a detailed arrangement of a second embodiment of the present invention.
Figure 10:
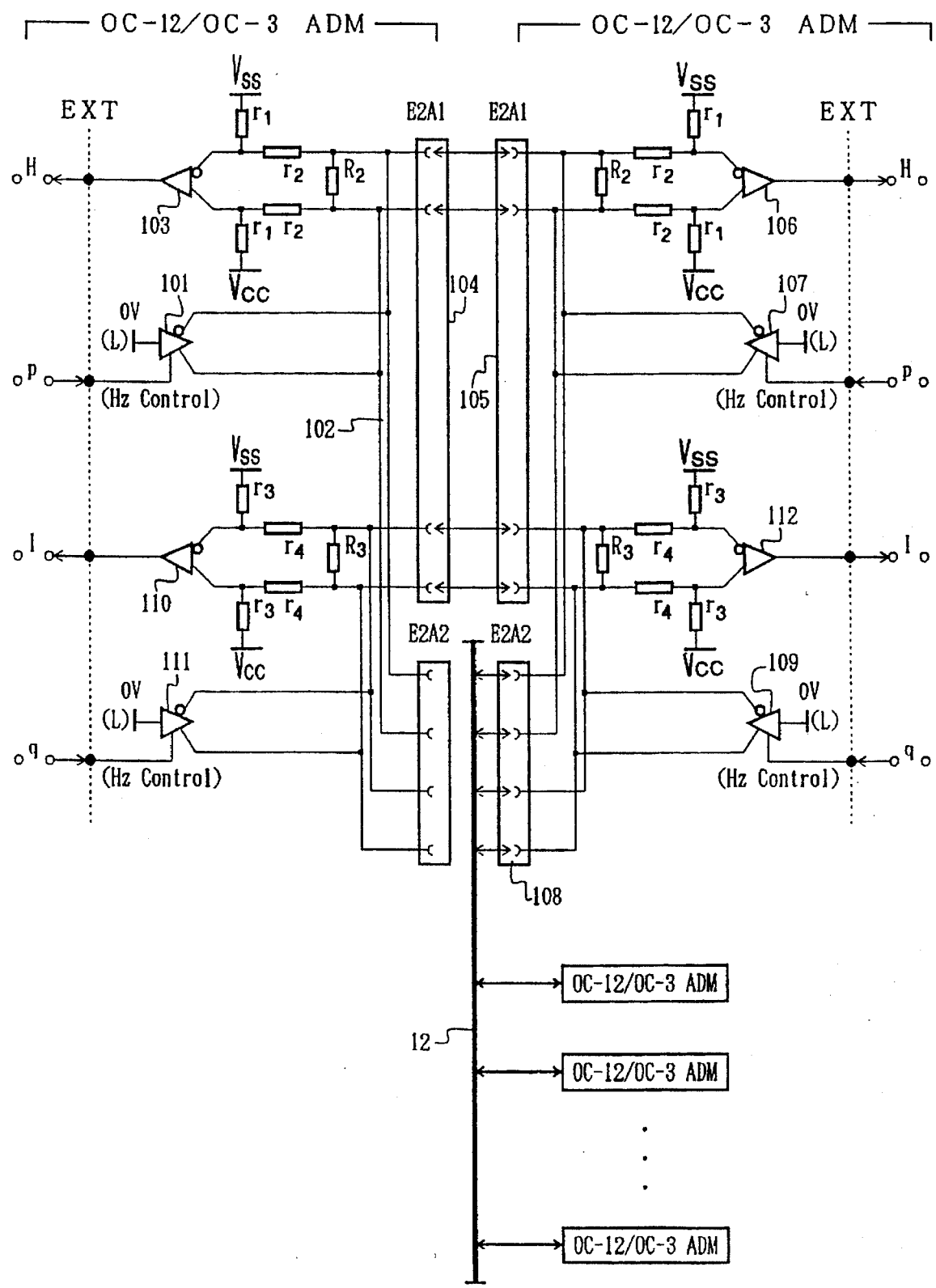
FIG. 10 is a diagram showing a detailed arrangement of a third embodiment of the present invention.

FIGS. 9 and 10 are block diagrams showing the detailed arrangement of the EXT port for the interface with external equipments.

Particularly, FIG. 9 shows a mutually connecting arrangement of the EXT port utilized for a direct connection of the E2A-TBOS equipment allocated as a sole concentrated control/arrangement for network nodes in one embodiment of the present invention.

FIG. 10 shows a mutually connecting arrangement of the EXT port utilized for an indirect connection as an extended interface of the E2A-TBOS equipment in a context gap of the overhead carrier.

In FIGS. 7 and 8, refference numerals 10, 27, 28, 29, 31, 32, 33 denote identical portions in FIGS. 1 and 2. Also, switching elements directly connected with signal starting points of the universal link configurator or signal inputs from other systems are represented by A, B, C, D, E, F, G, H, I.

Switching elements directly connected to signal terminals or signal outputs to other systems are represented by j, k, l, m, n, o, p, q, r. Also, switching elements inserted between delivering signals of the swiching elements A, B, C, D, E, F, G, H, I and link gates (multi-input AND gates 7, 8, 141–146 represented by reference numeral &) connecting the delivering signals and arranged to select the connecting signal are represented by the order of the link gates with suffix.

Particularly, switching elements for the signals delivered through the switching element A are a0, a1, a2, a3, a4, a5, a6, a7 and switching elements for the signals delivered through the switching element B are b0, b1, b2, b3, b4, b5, b6, b7.

Switching elements for the signals delivered through the switching element C are c0, c1, c2, c3, c4, c5, c6, c7 and switching elements for the signals delivered through the switching element D are d0, d1, d2, d3, d4, d5, d6, d7.

Likewise, switching elements for the signals delivered through the switching element E are e0, e1, e2, e3, e4, e5, e6, e7 and switching elements for the signals delivered through the switching element F are f0, f1, f2, f3, f4, f5, f6, f7 and switching elements for the signals delivered through the switching element G are g0, g1, g2, g3, g4, g5, g6.

Furthermore, switching elements for the signals delivered through the switching element H are h1, h2, h3, h4, h5, h6, h7 and switching elements for the signals delivered through the switching element I are i1, i2, i3, i4, i5, i6, i7.

In one embodiment of the present invention, a separatable unit of the data block is a character represented by a parity bit attatched octet packaged with a start bit and a stop bit based on asynchronous communication. Therefore, serial communication elements equipped in the universal link configurator are universal asynchronous receiving/transmitting elements (UART) 32.

FE-LINK#1, FE-LINK#2, FE-LINK#3, FE-LINK#4, FE-LINK#5, FE-LINK#6 denoted by reference numerals 70–75 are TTL/CMOS logic signal transferring transceiver elements. These form a facility media for transmitting/receiving a base band signal between HS units and MS units (in FIGS. 3 to 6).

The facility media per se resides in the HS units 313–314 and the MS units 315–318 as well as the HC units 301–304 and the MC units 305–312. The base band data transferred between the HS units 313–314 and the MS units 315–318 are multiplexed in or demultiplexed from the band of the pre-assigned overhead bits and are then converted to or inversely converted from an optical signal by the HC units 301–304 or the MC units 305–312.

The inputs-outputs of the GP#1/GP#2/GP#3/GP#4/GP#5/GP#6/EXT in the universal link configurator 100 shown in FIGS. 3–6 are the same as in FIGS. 7 and 8.

The outputs a0–a7, b0–b7, c0–c7, d0–d7, e0–e7, f0–f7, g0–g6, h1–h7, i1–i7, j–r, A–I of the latched decoder 27 determined by a logic signal whether the corresponding switching elements a0–a7, b0–b7, c0–c7, d0–d7, e0–e7, f0–f7, g0–g6, h1–h7, i1–i7, j–r, A–I should be connected or disconnected.

FIGS. 9 and 10 specifically illustrate how the EXT inputs/outputs in FIGS. 7 and 8 make interface with external devices. FIG. 9 illustrates an externally connecting arrangement assuming that the external device for the interface be an E2A-TBOS equipment 900.

A balanced type driver device 901 at the latter stage of the E2A-TBOS equipment 900 provides as an output logically inverted signals respectively for the signal lines with or without a mark ○ by using V cc (logic "H") and VSS (logic "L").

This output signal is connected to an E2A1 (or E2A2) externally connecting connector 903 for the OC-12 ADM or OC-3 ADM equipment by a cable through an externally connecting connector (E2A/TBOS) 902 of the E2A-TBOS equipment 900.

A balanced signal provided for the OC-12 ADM or OC-3 ADM equipment is terminated with a line impedance R2, and is provided for a balanced type receiver device 904 by the combination of the signal lines with or without the mark ○ through a fail-safe circuit system using "Thevenin termination" with resistors r1, r2, and V SS as well as resistors r1, r2, and V CC for establishing the logic condition in case of the interruption of the balanced signal line, that is the interruption of a connecting cable between the connectors.

The balanced signal is converted into the same as the TTL/CMOS logic signal as a transmitting singal (TX) of the E2A-TBOS equipment 900, and then reaches to the switching element H at the EXT side of the OC-12 ADM or OC-3 ADM equipment.

At this time, the balanced signal is also directly connected to the output of the balanced type driver element 905, by the combination of the signal lines with or without the mark ○, controlled in the form of high impedance by the TTL/CMOS logic signal provided as an output from a switching element p at the EXT side of the OC-12 ADM or OC-3 ADM equipment.

However, the TTL/CMOS logic signal from the switching element p is maintained at logic "L" level of the TTL/CMOS logic signal by the reflection of the interrupted condition of the switching element p. Consequently, the output with respect to the balanced signal line is made to have a high impedance without influence to any input signal to the switching elemet H.

The balanced signal passing through the E2A2 (or E2A1) externally connecting connector 906 of the OC-12 ADM or OC-3 ADM equipment is broadcast to the connectors for all of the OC-12 ADM or OC-3 ADM equipments as externally connected, with a daisy chain connection using the cable 12.

The message broadcast to the OC-12 ADM or OC-3 ADM equipments from the E2A-TBOS equipment 900 through that information path is combined with the response from each of the ADM equipments on the relay route and is extracted at each of the ADM equipments whereby the resources of the ADM equipments can be selectively extracted from the external equipments 900.

These resources are combined on the way with the broadcast message which each of the ADM equipments similarly relays. The ADM equipments directly connected to the E2A-TBOS equipment 900 only extract the resources from the ADM equipments to transfer them to the E2A-TBOS equipment 900.

These resources return to the externally connecting connector (E2A/TBOS) 902 of the E2A-TBOS equipment 900 along the opposite route to the above mentioned route by the balanced signal output by a high impedance (logic "H") or VCC (logic "H") and VSS (logic "L") of the balanced type driver device 907 controlled in the presence of a high impedance by the TTL/CMOS logic signal provided as an output from the switching element q of the ADM equipment selected according to the message.

The resources are then terminated by the connecting line impedance R1 by the combination of the signal lines with or without the mark ○ is provided as an input to the balanced signal line of the balanced type receiver device 908 at the former stage at the receiving side (RX) of the E2A-TBOS equipment 900.

The balanced input signal is converted into the TTL/CMOS logic signal by the balanced type receiver device 908 and is collected as a response to the E2A-TBOS equipment 900.

Upon the interruption of the balanced signal line of the balanced type receiver device 508 positioned at the former stage of the switching device I of the ADM equipments, namely upon the interruption of the connecting cable between the connectors, it is possible to maintain a voltage higer than a minimum differential voltage at the response system balanced signal line circuit network so that a logic "H" signal appears on the receiving side (R x) of the E2A-TBOS equipment 900 due to a fail safe circuit system using Thevenin terminal with the resistots r3, r4, Vss as well as the resistors r3, r4 and Vcc for establishing the logic condition and the balanced line terminal with the line impedance R3.

Accordingly, a high impedance condition of the balanced signal line based on the logic "H" output signal for the TTL/CMOS logic signal level from the switching device q of the ADM equipments can transparently transfer the logic "H" for the TTL/CMOS logic signal level at the receiving side (RX) of the E2A-TBOS equipment 900.

Of course, the output signal condition of the switching element q of the ADM equipments is transferred as it is to the switching element I of the AMD equipments. However, because of the switching element I being interrupted due to setting, input signals going ahead is interrupted so as to make no effect on the signals following the switching element I.

FIG. 10 shows an externally connecting arrangement assuming that the external equipment for interface be the OC-12 ADM or OC-3 ADM equipment residing in the context gap (disconnection point) of the overhead carrier functioning as an extended interface of the E2A-TBOS equipment. In this figure, the ADM equipment functioning as an extended interface of the E2A-TBOS equipment is shown on the left side.

The extended ADM equipment of the E2A-TBOS equipment repeats the transmitting signal (TX) of the E2A-TBOS equipment. The balanced driver device 101 high-impedance-controlled by the TTL/CMOS logic signal provided as an output from the switching device p of the extended ADM equipment uses a logically inverted signal on the combined signal lines with or without the mark ○ as Vcc (logic "H") and Vss (logic "L") or as a high impedance (logic "H") for its output.

To the balanced signal line 102 to which the driver device 101 is connected, the balanced type receiver device 103 which is terminated with the line impedance R2 in the same extended ADM equipment is also connected in the united form of the signal lines with or without the mark ○ through a fail safe circuit system using Thevenin terminal with the resistors r1, r2 and V ss as well as the resistors r1, r2 and Vcc for establishing the logic condition upon the interruption of the balanced signal lines, that is upon the interruption of the connecting cable between the connectors.

Therefore, even if the driver device 103 is made to have a high impedance condition due to the TTL/CMOS logic "L" signal provided as an output from the switching device p of the extended ADM equipment, a voltage higher than a minimum differential voltage can be maintained so that the logic "H" appears on the balanced signal line circuit network. Accordingly, the TTL/CMOS logic signal from the switching device p passes through the balanced signal line 102 and is converted into the same TTL/CMOS logic signal by the receiver device of any other ADM equipments transparently connected to the balanced signal line, and can be provided as an input for the switching device H.

It is to be noted that to the switching device H of the extended ADM equipment the output signal condition of the switching device p of the same extended ADM equipment is transferred as it is and that since the switching device H interrupts an input signal going ahead due to a predetermined interruption, there is no effect on the signal following the switching device H.

The output signal from the switching device p of the extended AMD equipment and driven by a driver device at a next stage is connected to the (E2A1) or (E2A2) externally connectiong connector 105 of the terminated OC-12 ADM or OC-3 ADM equipment allocated on the right side by means of cable through the externally connecting connector E2A1 (or E2A2) 104 of the extended ADM equipment.

The balanced signal provided as an input for the OC-12 ADM or OC-3 ADM equipmemt is also provided as an input for the balanced type receiver device 106 in the united form of the signal lines with or without the mark ○ through a fail safe circuit portion which is terminated with the line impedance R2 and uses Thevenin terminal composed of the resistors r1, r2 and Vss as well as the resestors r1, r2 and Vcc for establishing the logic condition upon the interruption of the balanced signal line, that is upon the interruption of the connectiong cable between connectors.

After the balanced signal is converted into the same TTL/CMOS logic signal as the output signal from the switching device p of the extended ADM equipment, it reaches to the switching element H on the EXT side of the terminated OC-12 ADM or OC-3 ADM equipment.

At this time, this balanced signal is directly connected, in the united signal lines with or without the mark ○, to the output of the balanced driver device 107 high-impedance-controlled by the TTL/CMOS logic signal provided as an output from the switching device p on the EXT side of the terminated OC-12 ADM or OC-3 ADM equipment.

However, the TTL/CMOS logic signal provided as an output from the switching device p has a level maintained at logic "L" under the influence of the switching device p being interrupted. Consequently, the output with respect to the balanced signal line has a high impedance without any influence on an input signal to the switching device H.

Furthermore, this balanced signal is broadcast by a daisy chain connection with the cable 12 to the externally connecting connector of all of the terminated OC-12 ADM or OC-3 ADM equipments as externally connected through the E2A2 (or E2A1) externally connecting connector 108 of the terminated OC-12 ADM or OC-3 ADM equipments.

The message from the E2A-TBOS equipment broadcast from the extended ADM equipment through the information path 12 to those terminated OC-12 ADM or OC-3 ADM equipments is combined with the responses from the ADM equipments on a relay route.

The ADM equipments only filter out the above message whereby the resources of the terminated ADM equipments and the extended ADM equipments per se are selectively extracted through the extended ADM equipments from the external devices. These resources are combined with the broadcast message which each of the terminated ADM equipment and the extended ADM equipment per se similarly repeats.

Finally, the ADM equipments directly connected to the E2A-TBOS equipment only filter out the resources respectively extracted from the terminated ADM equipments and the extended ADM equipments and transfer them to the E2A-TBOS equipment.

These resources return to the externally connecting connector E2A1 (or E2A2) 104 of the extended ADM equipment through the opposite route to the above route by the balanced signal output of a high impedance (logic "H") or VCC (logic "H") and Vss (logic "L") of the TTL/CMOS logic signal provided as an output from the switching device q of the ADM equipments selected by the message.

Those resourses are provided for the balanced type receiver device 110 in the united signal lines with or without the mark ○ through a fail safe circuit portion terminated at the line impedance R3 and having Thevenin terminal composed of the resistors r3, r4 and the Vss and the resistors r3, r4 and Vcc for establishing the logic condition upon the interruption of the balanced signal line, that is upon the interruption of the connecting cable between the connectors.

Then, the balanced signal is converted into the same TTL/CMOS logic signal as the output signal from the switching device q of each of the terminated ADM equipments, and thereafter it reaches to the switching device I on the EXT side of the extended ADM equipment.

At this time, this balanced signal is directly connected to the output of the balanced type driver device 111 high-impedance-controlled by the TTL/CMOS logic signal provided as an output from the switching device q on the EXT side of the extended ADM equipment in the united signal lines with or without the mark ○.

However, the TTL/CMOS logic signal provided as an output from the switching device q has a level maintained at the logic "L" under the influence of the switching device q being interrupted. Since the output with respect to the balanced signal line has a high impedance, no influence is provided for an input signal to the switching device I.

The input signal to the switching device I on the EXT side of the extended ADM equipment reaches to the E2A-TBOS equipment for the recovery of the response to the external devices.

A high impedance (logic "H") condition where the output signal from the switching device q of the terminated ADM equipments provides on the balanced signal line connected in the form of bus can maintain a voltage higher than a minimum differential voltage so that the switching device I on the EXT side of the extended ADM equipment has a logic "H" level in the response system balanced signal line circuit network by a fail safe circuit portion using Thevenin terminal composed of the resistors r3, r4 and VSS as well as the resistors r3, r4 and VCC for establishing the logic condition upon the interruption of the balanced signal line of the balanced type receiver device 112 positioned at the former stage of the switch device I of the terminated ADM equipments and by a balanced signal line termination at the line impedance R3.

The high impedance condition of the balanced signal line due to the logic "H" level for the TTL/CMOS logic signal from the switching device q of the terminated ADM device can transparently trasfer the logic "H" level for the TTL/CMOS logic signal at the switching device I on the EXT side of the terminated ADM equipment.

Of course, to the switching device I of the terminated ADM equipments the output signal condition of the switching device q of the terminated ADM equipments is conveyed as it is while by a preset interruption of the switching device I no influence will be effected to the signal following the switching device I because of the interruption of an input signal going ahead.

Figure 11:
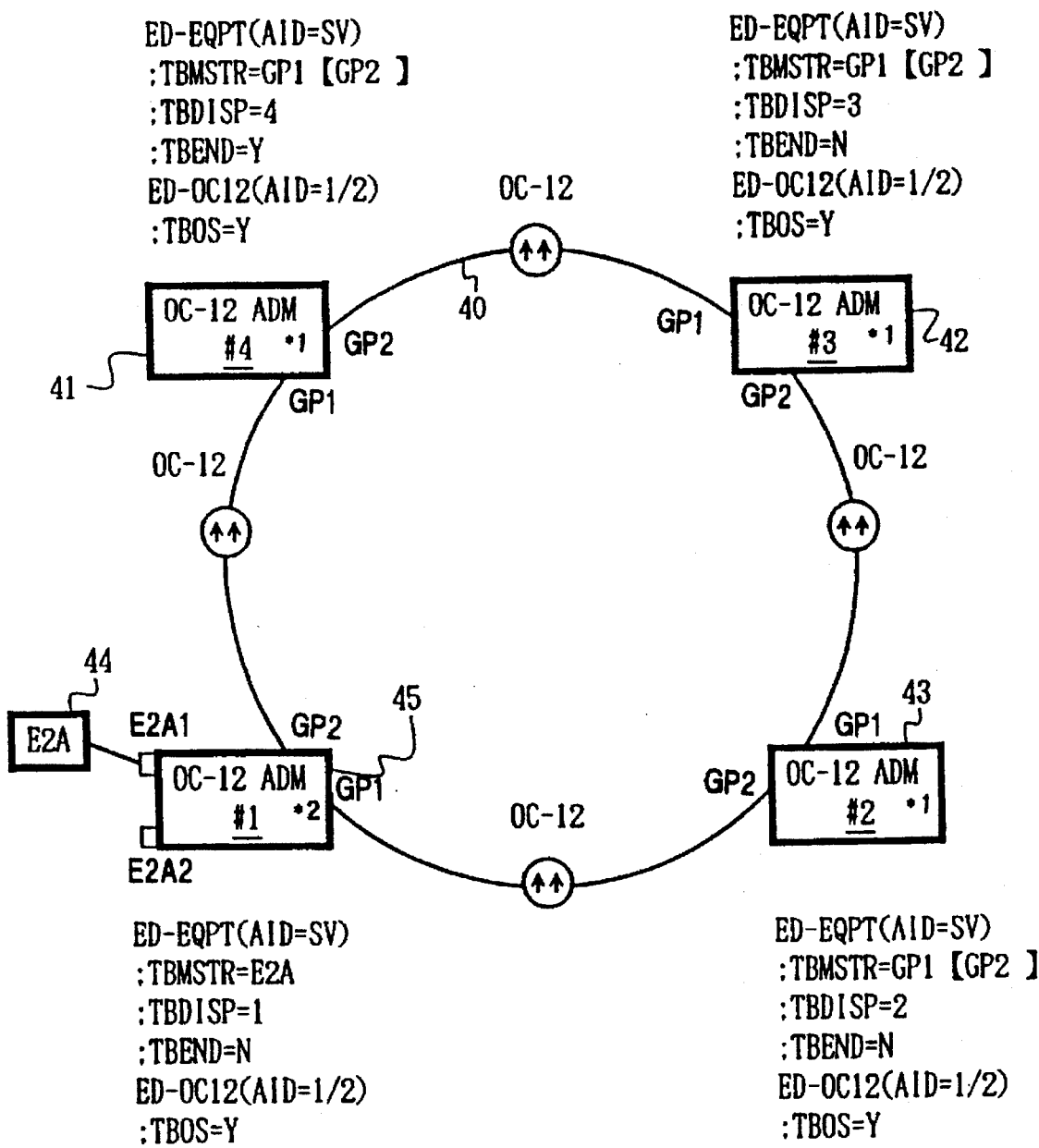
FIG. 11 is a diagram schematically showing a first application of the present invention.

FIG. 11 shows an application of the universal link configurator of the present invention to a recursive network.

The universal link configurator according to the present invention having a detailed arrangement as shown in FIGS. 8–10 is included in the OC-12 ADM or OC-3 ADM equipment allocated as described referring to FIGS. 3–6, each of the ADM equipments being disposed in each of the nodes in the recursive network in a link form as shown in FIG. 11 with the OC-12 optical transmission line 40.

As will be described later in detail, the ADM equipments are provided with "provisioning" including a double routing allocation function for a facility fault as illustrated in FIG. 11.

FIGS. 12–17 show the internal connection of the universal configurator in each of the ADM equipments with respect to the arrangement in FIG. 11. It is to be noted that FIGS. 12–17 are divided diagrams wherein FIGS. 12 and 13, FIGS. 14 and 15, FIGS. 16 and 17 respectively form a two-divided combination.

The external interface and the protocol of the E2A-TBOS equipment is formed in accordance with the specification established by Bell Core in the United States. The setting of the E2A-TBOS parameters in the ADM equipments is performed e.g. in TL-1 which is one of the exclusive transaction languages.

The contents of the setting of the parameters in the language TL-1 include, (1) the setting of TBOS Display No, (2) the setting of the final Display No, (3) whether or not OC-N should be used as a TBOS link, and (4) the setting of a TBOS master link.

Thus, by using the exclusive transaction laguage TL-1, the ADM equipments are provided with provisioning from the craft virtual terminal 29 in any of the ADM equipments so as to establish the parameters related to the E2A-TBOS equipments in the embodiment as described in FIG. 11.

It is therefore possible to establish a route as shown in FIGS. 12–17 with respect to the universal configurator.

Namely, the craft virtual terminal 29 of the ADM equipments are completely linked by using service bits different from those for the E2A-TBOS equipment in the overhead bits for the ADM equipments and a different external connecting system.

Therefore, by using the craft virtual terminal 29 in any of the ADM equipments in the network, it is possible to provide provisioning for the ADM equipment per se and any other ADM equipments in the network.

There will now be described how each of the link configurations as shown in FIG. 11 is attained by a route setting of the universal link configurators with reference to FIGS. 12–17.

It is to be noted that the response of the ADM equipments combined on a relay route with the aforementioned broadcast message is once read into the UART 9 in the ADM equipments for terminating the combining information and is developed into the shared memory 32. Then, the configuration controller 10 only retrieves, or filters out the broadcast message from the shared memory 32 and provided for the ADM equipments.

Also on route, the response of the ADM equipments combined with the broadcast message similarly repeated by the ADM equipments is once read in UART 9 in the ADM equipments finally and directly connected to the E2A-TBOS equipment and is developed into the shared memory 32. Then, the configuration controller 10 only retrieves, or filters out the response from the shared memory. This response is combined with the response of the corresponding ADM equipments and is immediately transferred from UART 9 in the ADM equipments to the E2A-TBOS equipments.

Figure 12:
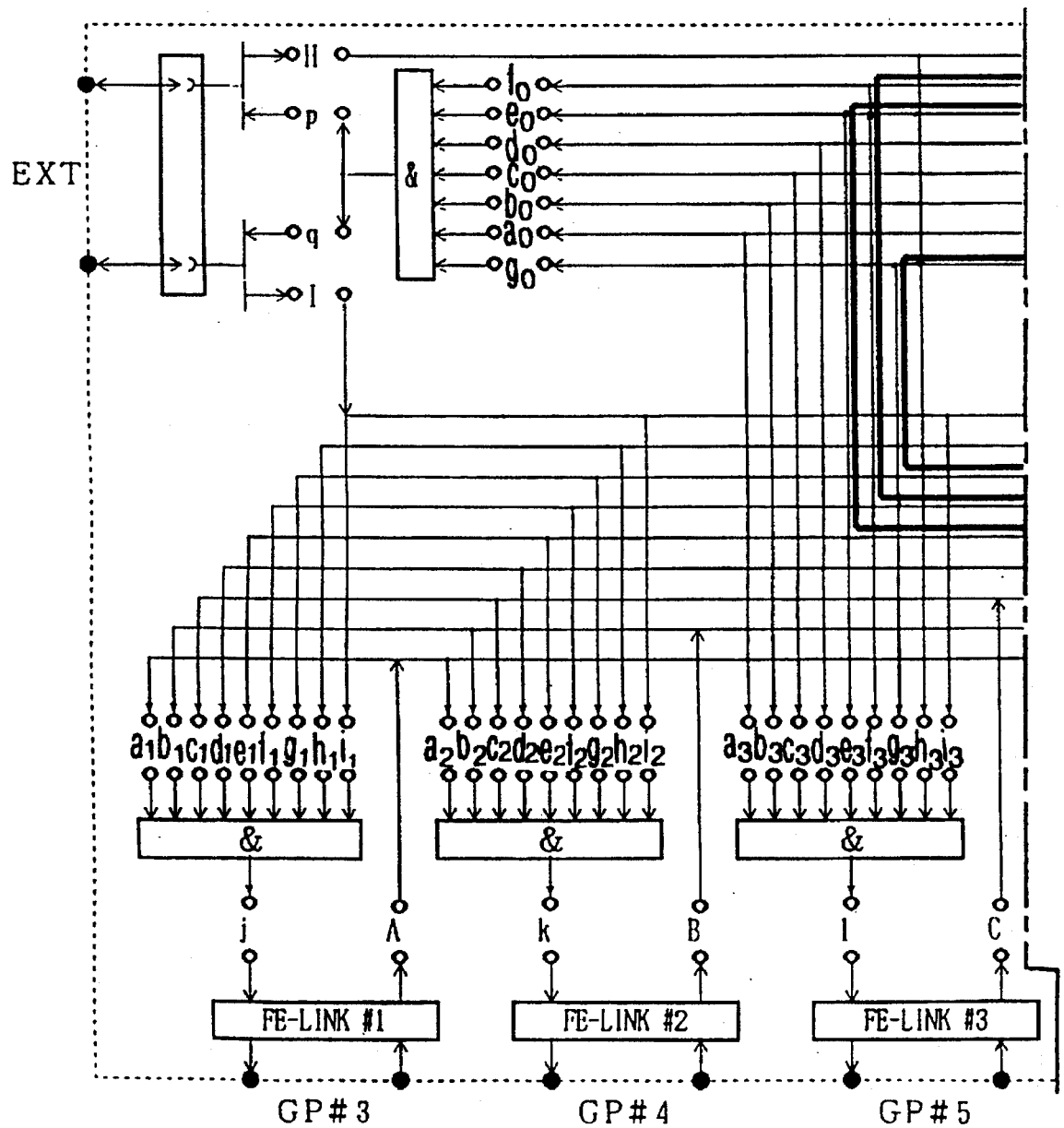
FIG. 12 is a diagram showing a part of a detailed arrangement of the first application of the present invention.
Figure 13:
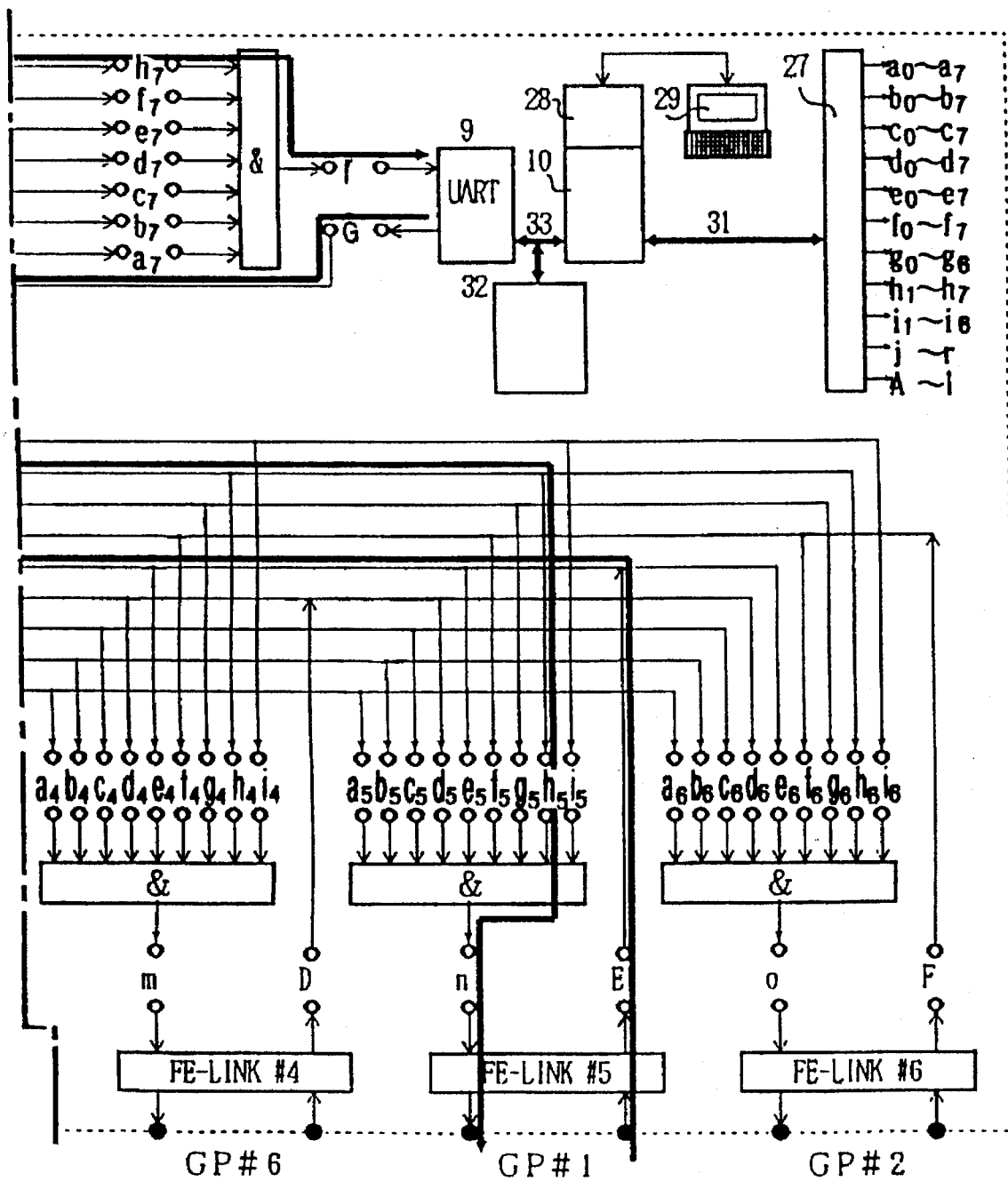
FIG. 13 is a diagram showing a part of the detailed arrangement of the first application of the present invention having a connection with FIG. 12.

FIG. 11 illustrates a link configuration in a ring form having the OS-12 optical transmission lines 40 as described above. The universal link configurators 41–43 provided with a first setting (*1) have a message/command/response shared path (E-e7-r) or (F-f7-r), (G-G5-n) or (F-f5-n), and (G-g6-o) or (E-e6-o) as illustrated in FIGS. 12 and 13.

Figure 14:
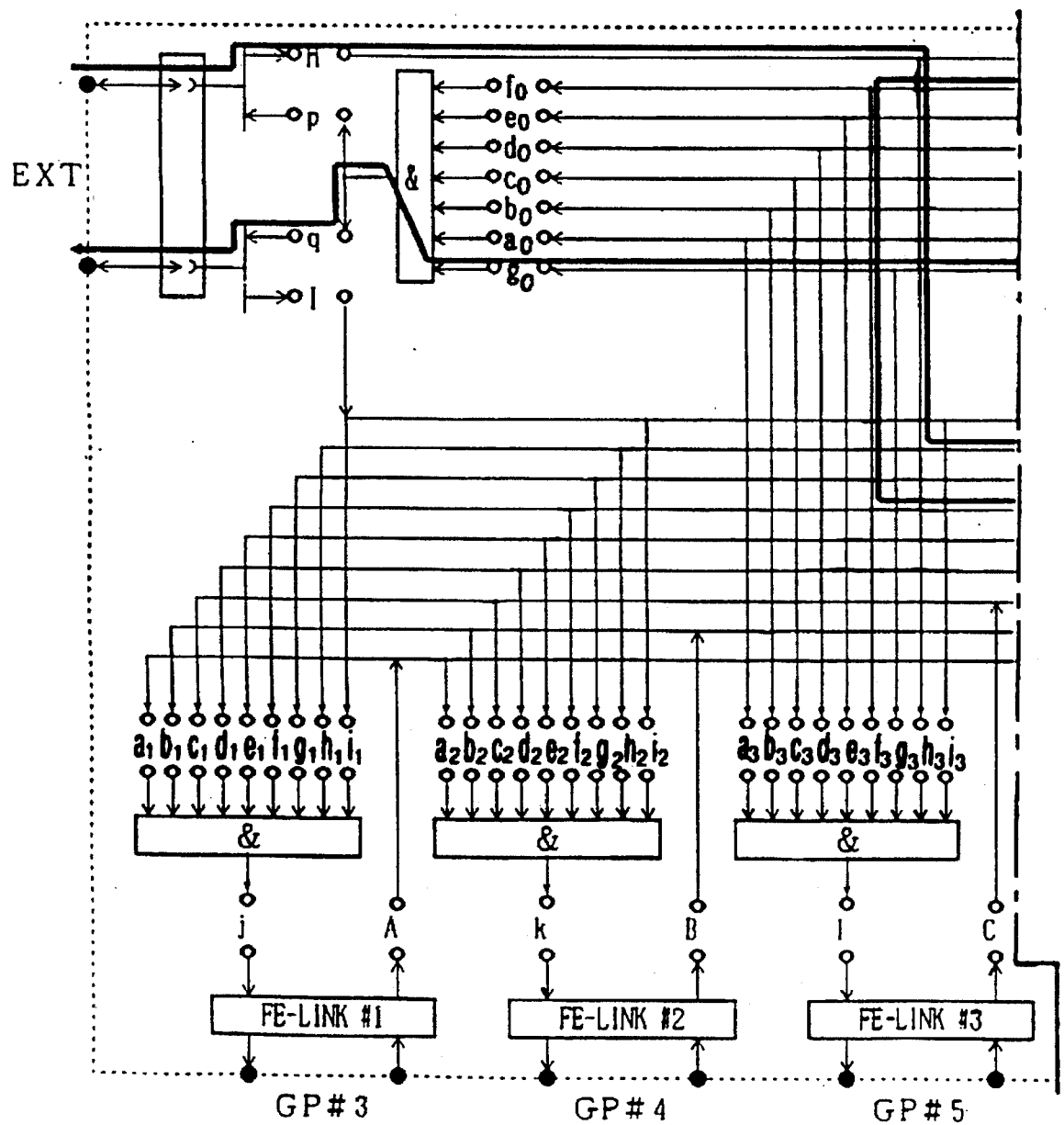
FIG. 14 is a diagram showing a part of a detailed arrangement of a second application of the present invention.
Figure 15:
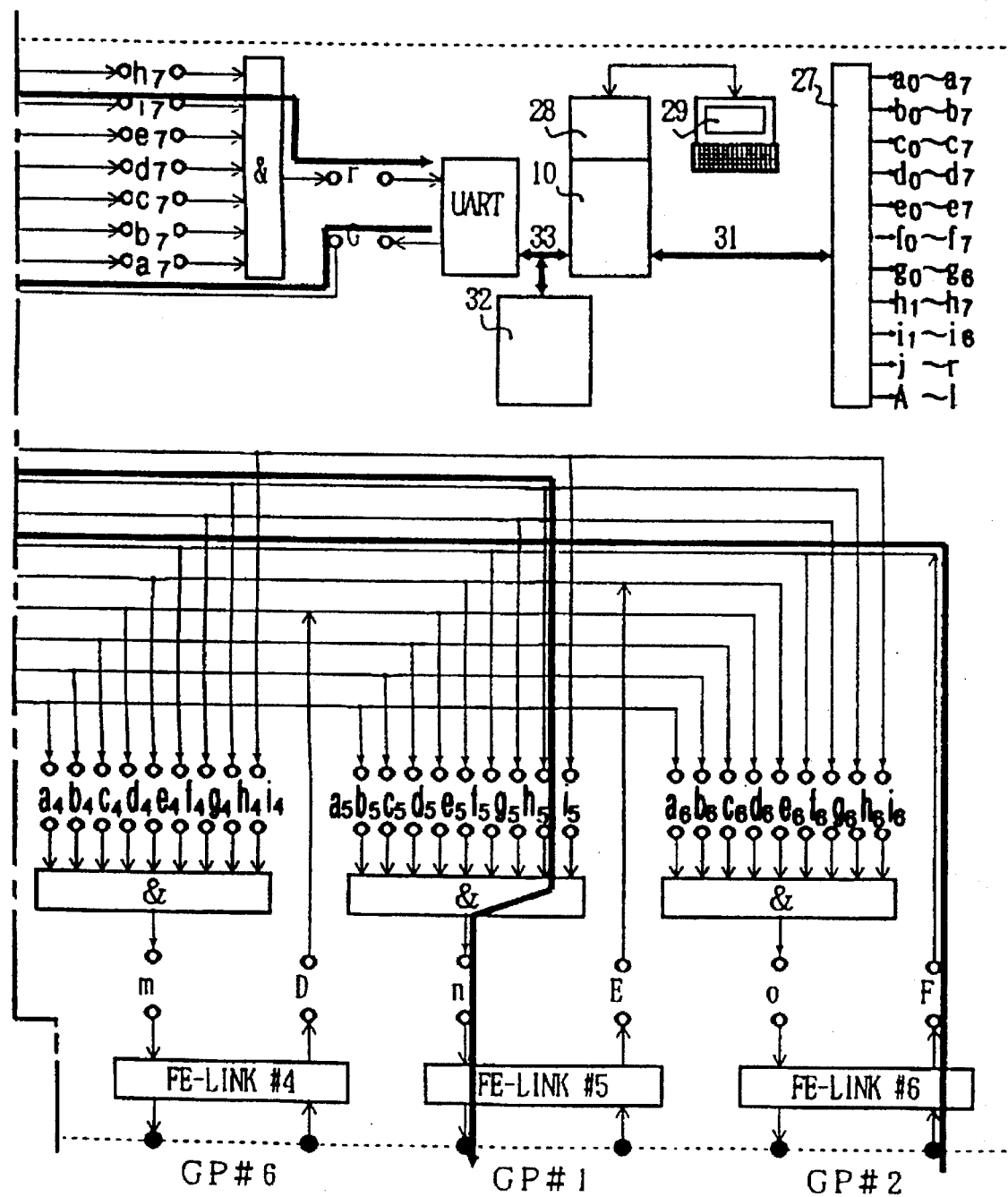
FIG. 15 is a diagram showing a part of the detailed arrangement of the second application of the present invention having a connection with FIG. 14.
Figure 16:
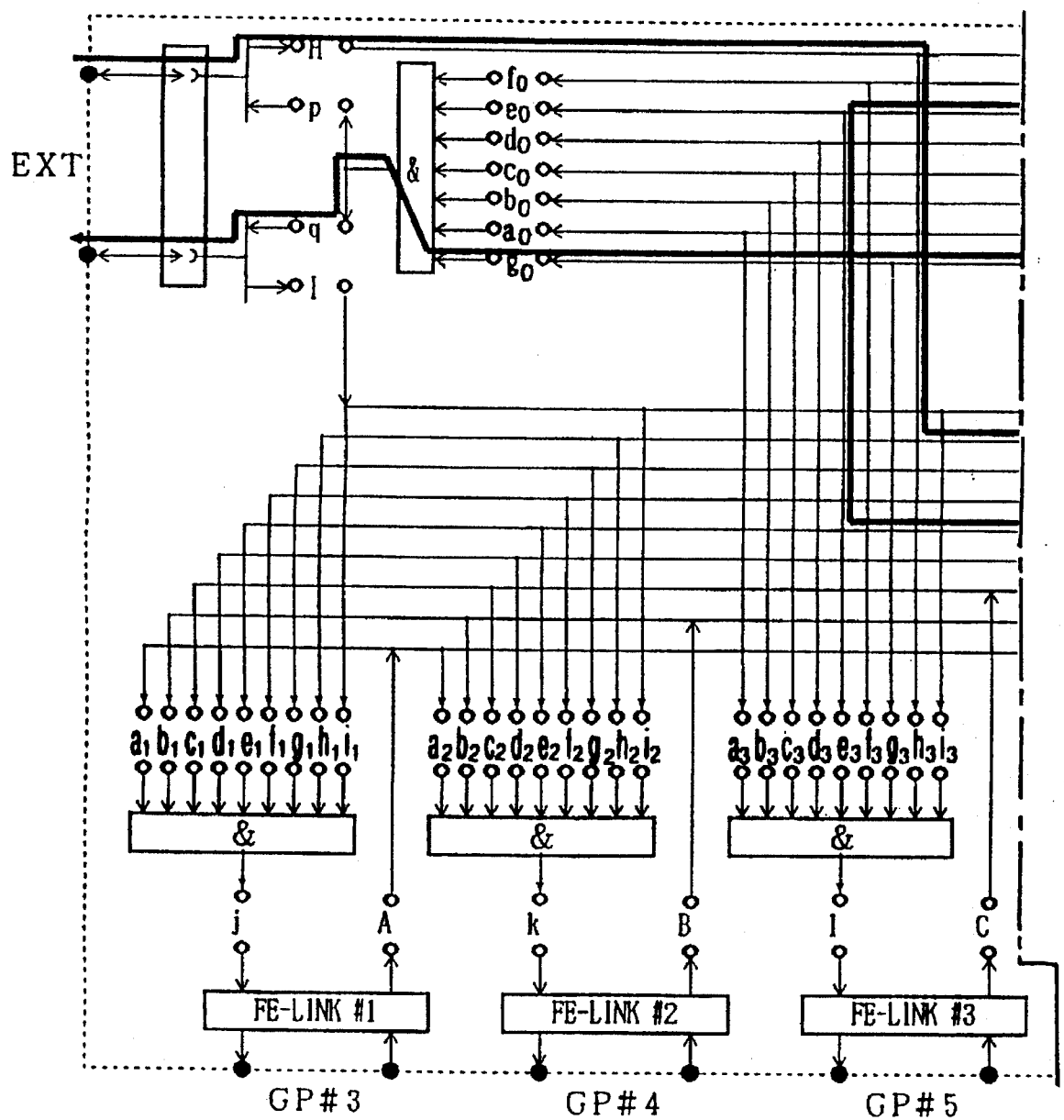
FIG. 16 is a diagram showing a part of a detailed arrangement of a third application of the present invention.
Figure 17:
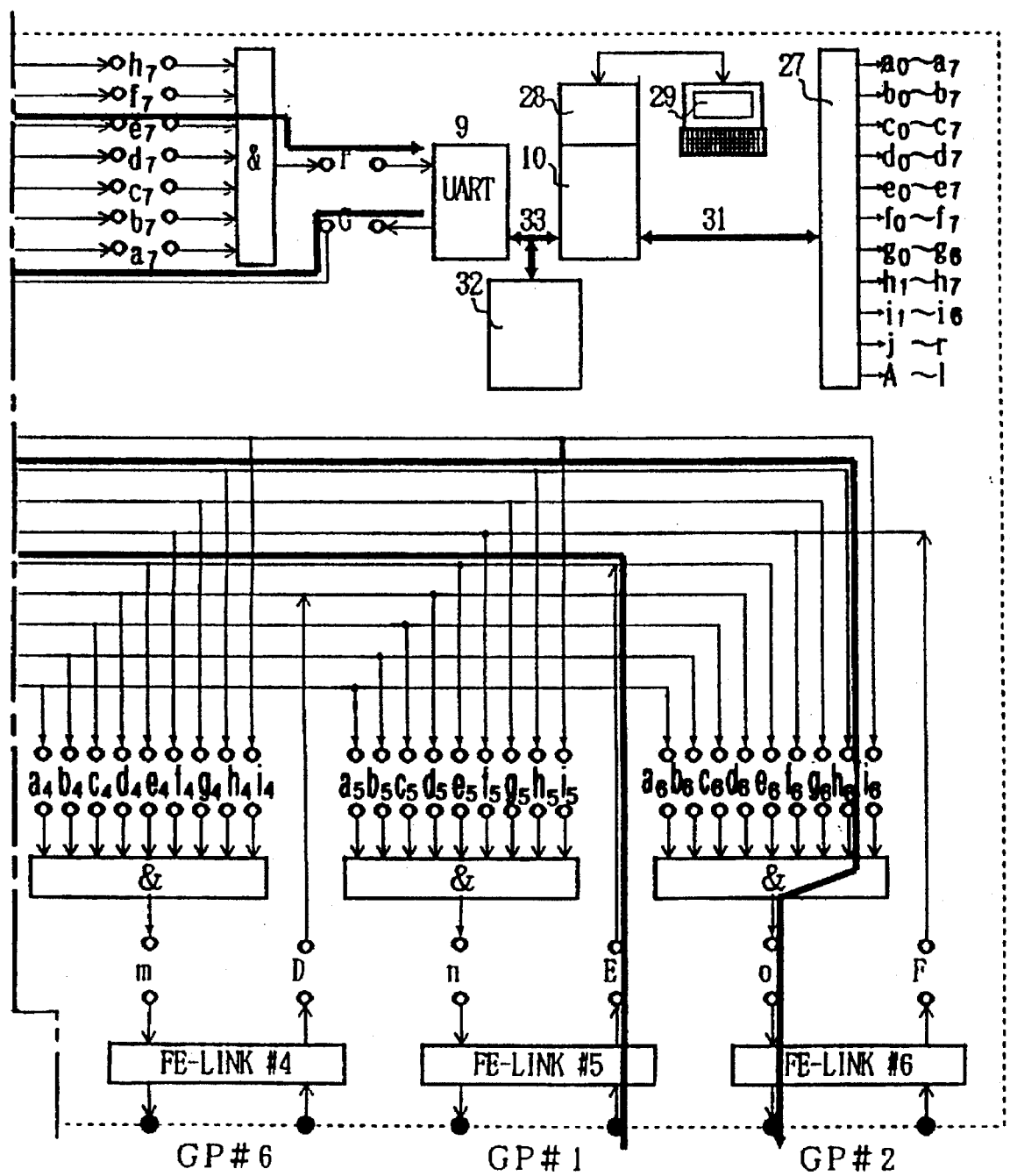
FIG. 17 is a diagram showing a part of the detailed arrangement of the third application of the present invention having a connection with FIG. 16.

The universal link configurator 45 provided with a second setting (*2) and connected to the E2A-TBOS equipment 44 has message/command/response shared paths (H-i5-n) and (F-f7-r) and a response exclusive path (G-g0-q) particularly shown in FIGS. 14 and 15 and has message/command/response shared paths (H-h6-o) and (E-e7-r) and a response exclusive path (G-g0-q) particularly shown in FIGS. 16 and 17.

Figure 18:
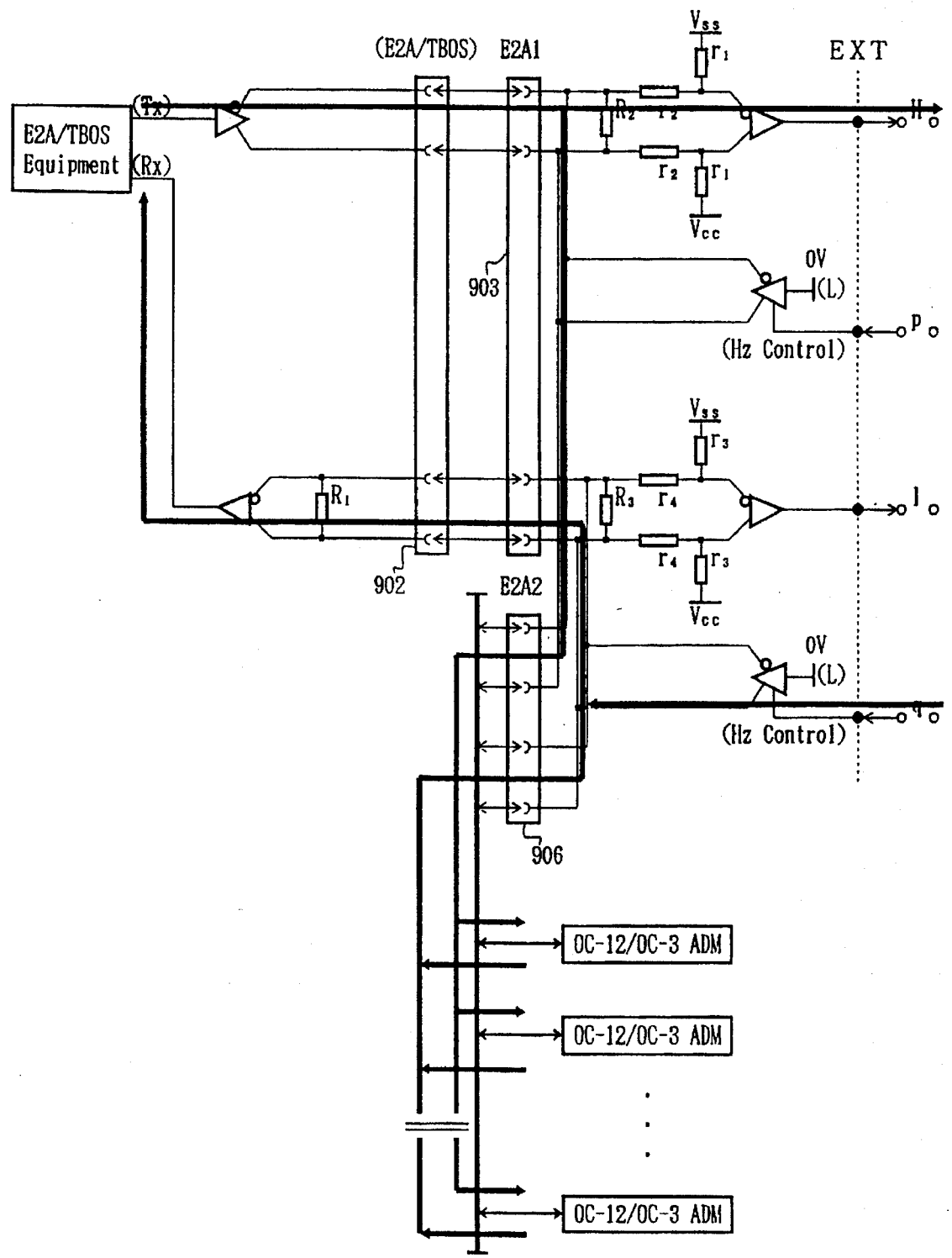
FIG. 18 is a diagram showing a detailed arrangement of a fourth application of a present invention.

An ADM equipment having a universal link configurator provided with provisioning as in FIGS. 14 and 15 or FIGS. 16 and 17 forms an externally connecting system path as in FIG. 18 in the externally connecting system as illustrated in FIG. 9.

The externally connecting system path is composed of a message/command/response shared path ((TX)-(E2A/TBOS)-E2A1-H) from the E2A-TBOS equipment to the OC-12/OC-3 ADM equipment and a response exclusive path (q-E2A1-(E2A/TBOS)-(RX)) from the OC-12/OC-3 ADM equipment to the E2A-TBOS equipment.

Figure 19:
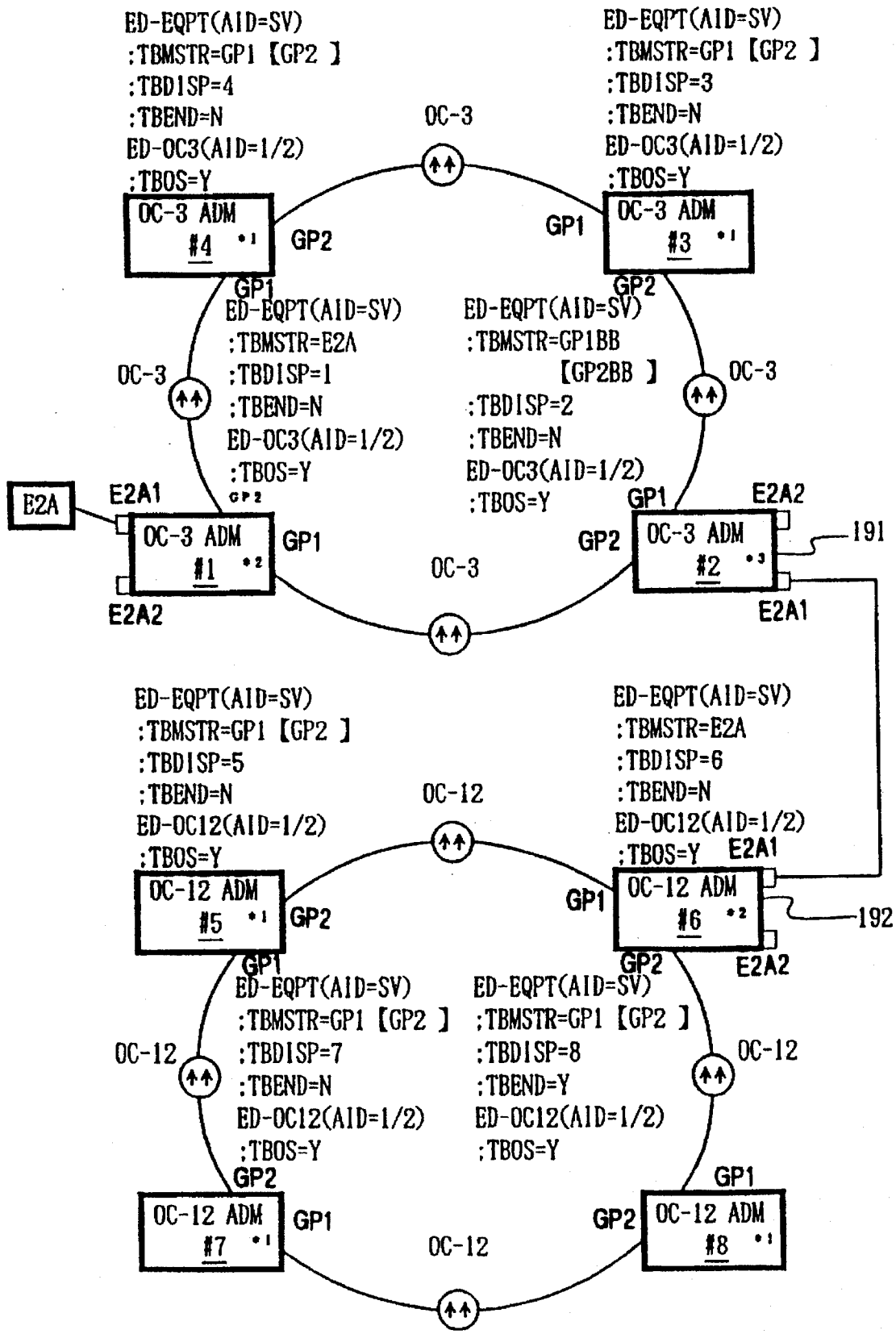
FIG. 19 is a diagram schematically showing a second application of the present invention.

FIG. 19 shows a link configuration in a ring form as in FIG. 11. In this embodiment, the universal link configurator of the present invention is arranged so that two rings are interconnected by means of back to back connection utilizing the external connecting systems of the ADM equipments in each of the rings.

In this arrangement, the ADM equipment is composed of a universal link configurator provided with the first setting (*1), the second setting (*2) and a third setting (*3). The arrangement of the information path according to the first setting (*1) and the second setting (*2) is as described with reference to FIG. 11.

Figure 20:
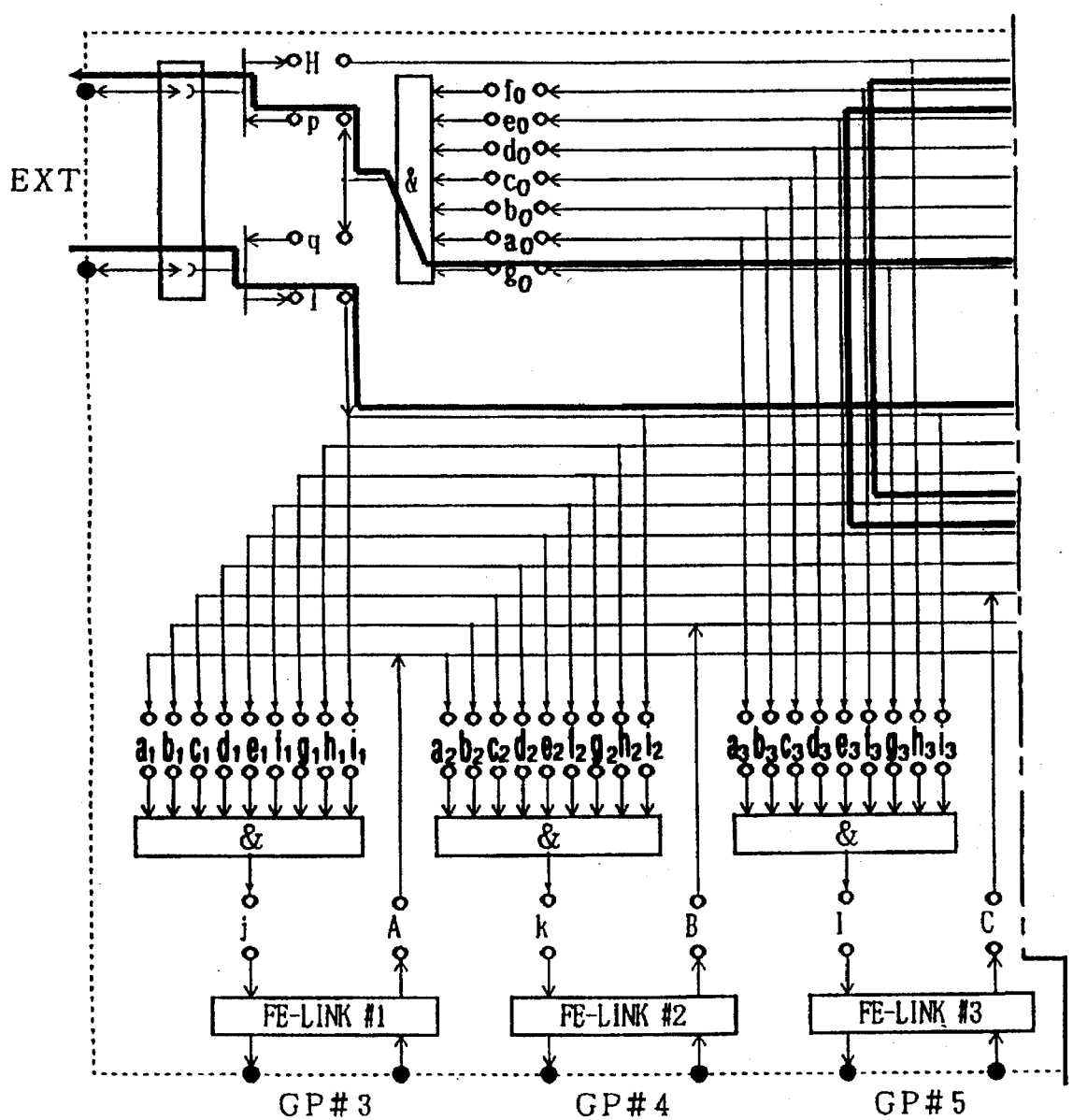
FIG. 20 is a diagram showing a part of a detailed arrangement of a fifth application of the present invention.
Figure 21:
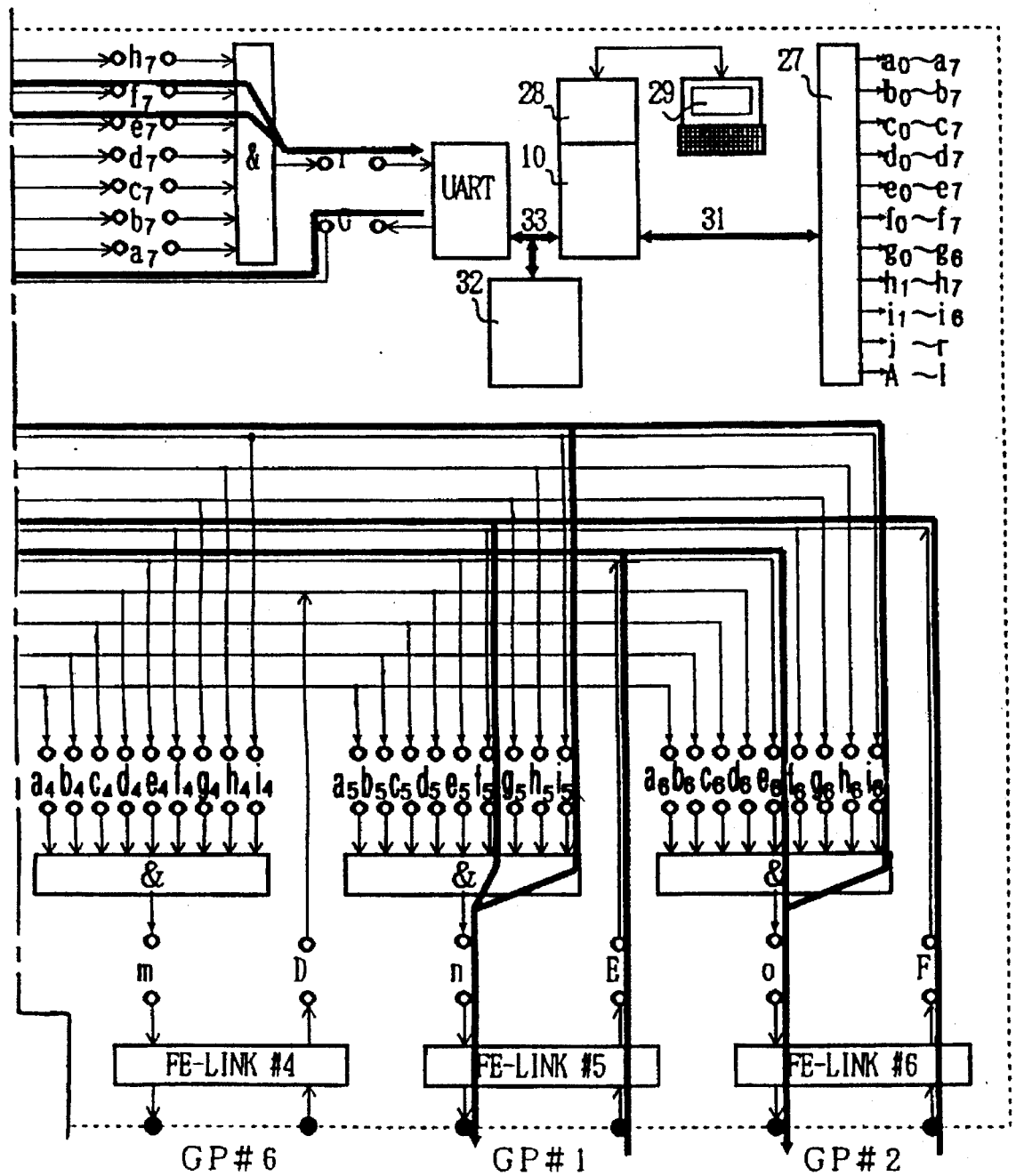
FIG. 21 is a diagram showing a part of the detailed arrangement of the fifth application of the present invention having a connection with FIG. 20.

Namely, the arrangement of the information path according to the third setting (*3) has a message/command/response shared path (E-e7-r) or (F-f7-r) and (G-g0-p) and a message/command/response shared path (E-e6-o) or a response exclusive path (I-i5-n), and a message/command/response shared path (F-f5-n) or a response exclusive path (I-i6-o) as shown in FIGS. 20 and 21 as two-divided.

Figure 22:
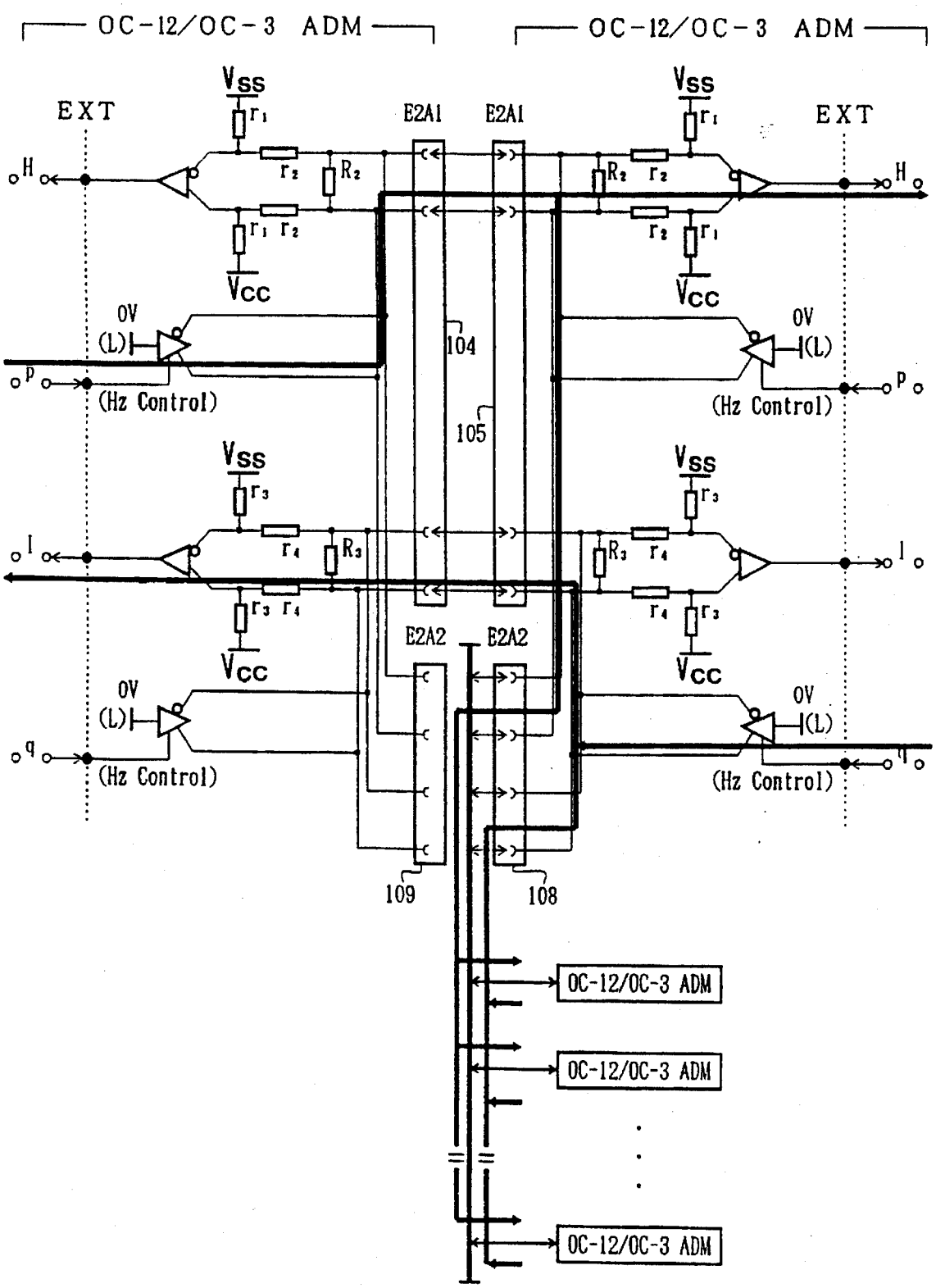
FIG. 22 is a diagram showing a detailed arrangement of a sixth application of the present invention.

As shown in FIGS. 20 and 21, the ADM equipment having the universal link configurator with provisioning also has an externally connecting system path as in FIG. 22. Namely, this externally connecting system path forms a path as in FIG. 22 in the externally connecting system as described in FIG. 10.

At a disconnecting point of the FE-LINK facility of the E2A-TBOS equipoment (in this example, between the OC-3 ADM (#2) 191 and the OC-12 ADM (#6) 192 in FIG. 19), the provisions of the ADM equipment set as an extention of the E2A-TBOS equipment on one side and a conventional ADM equipment as a terminated one on the other side and the external connection of both can further extend the FE-LINK facility.

This externally connecting system has two paths. Namely, between the OC-3 ADM (#2) 191 and the OC-12 ADM (#6) 192, the first one is a message/command/response shared path((p-E2A1(104)-E2A1(105)-H) and (p-E2A1(104)-2A1 (105)-E2A2(108)-HM); M=3(HM represents a path to the OS-12 ADM (#6) 192 in FIG. 19)) from the extended ADM (OC-12/OC-3 ADM on the left side in FIG. 22) to the terminated ADM (OC-12/OC-3 ADM on the right side in FIG. 22).

The second one is a response exclusive path((q-E2A1 (105)-E2A1(104)-I) or (qM-E2A2(108)-E2A1(105)-E2A1 (104)-I); M=3(qM represents a path from OC-12 ADM (#6) 192 in FIG. 19)) from the terminated ADM to the extended ADM.

There will now be described how the UART device 9 respectively included in the universal link configurators in the ADM equipments filters out the information which has passed through the message/command/response shared path and the response exclucive path in its inside in view of the flow of the message/command and the response in the network.

At first, in the ring form in FIG. 11, the message/command flows from the OC/12 ADM (#1) to the OC-12 ADM (#2) 43 along the route ((TX-(E2A/TBOS)(902)-E2A1(903)-H)-(H-h5-n)(see FIGS. 8, 14 and 15) between the E2A-TBOS equipment 44 and the OC-12 ADM(#1) 45 directly and externally connected to the equipment 44.

In the OC-12 ADM (#2) 43, the message/command is captured on the route (F-f7-r) through the UART device 9 and relayed by using the route (F-f5-n) (see FIGS. 12 and 13). In case this message/command is addressed to the UART device 9 and a predetermined response is required to be returned, the UART device 9 broadcasts the message/command to the route (G-g5-n) and (G-g6-o)(see FIGS. 12 and 13).

As a result, such a response is directly returned to the OC-12 ADM (#1) 45 from the OC-12 ADM (#2) while the OC-12 ADM (#1) 45 interrupts the reception of the GP#1. Therefore, the OC-12 ADM (#1) 45 receives no response from the route in this direction.

On the other hand, the message/command and response flows from the OC-12 ADM (#2) 43 to the OC-12 ADM (#3) 42 and is similarly relayed in the direction for the OC-12 ADM (#4) 41 through the route (F-f5-n) in the OC-12 ADM (#3) 42.

At the same time, the message/command and response flows from the OC-12 ADM (#2) 43 is captured on the route (F-f7-r) through the UART device 9 (see FIGS. 12 and 13).

The captured message/command and response is separated into the message/command and the response where the response is discarded. If the message/command is addressed to the UART device 9 and a predetermined response is required to be returned, it is broadcast through the route (G-g5-n) and (G-g6-o) (see FIGS. 12 and 13).

As carried out between the OC-12 ADM (#1) 45 and the OC-12 ADM (#2) 43, similarly from the OC-12 ADM (#3) 42, the response is returned in order of the OC-12 ADM (#3) 42→the OC-12 ADM (#2) 43→the OC-12 ADM (#1) 45. However, since the reception of the GP#1 of the OC-12

ADM (#1) is interrupted as described above, no response on this route can be received.

Subsequently, the OC-12 ADM (#4) 41 also carries out the same transaction as in the OC-12 ADM (#3) 42. The message/command finally goes arround the ring one time counterclockwise from the OC-12 ADM (#1) 45 and again reaches to the OC-12 ADM (#1) 45.

At the same time, the response of the respective ADM equipments of the OC-12 ADM (#2) 43, the OC-12 ADM (#3) 42, and the OC-12 ADM (#4) 41 similarly goes arround counterclockwise and reaches to the OC-12 ADM (#1) 45.

The OC-12 ADM (#1) 45 captures the message/command and response on the route (F-f7-r) through the UART device 9. The response again passes through the UART device 9 and the route (G-g0-q)-(q-E2A1(903)-(E2A/TBOS) (902)-(Rx)) and is reproduced and relayed to the E2A-TBOS equipment through the external connecting system (see FIGS. 14, 15 and 18).

When the message/command is addressed to the OC-12 ADM (#1) 45 itself and a predetermined response is required to be returned, it is returned to the E2A-TBOS equipment through the externally connecting system from the UART device 9 on the same route (G-g0-q)-(q-E2A1-(E2A-TBOS) -(RX)).

As above observed, with respect to the message/command and response captured through the UART device 9 of the respective ADM equipment, the response is extracted by the respective configuration controllers 10 at a node (the OC-12 ADM (#1) 45) according to the second setting (*2) and is reproduced and transferred while unnecessary message/ command filters off so that only necessary ones are received and the response thereto is provided as an output.

The response unconditionally filters off and discarded at nodes (the OC-12 ADM 41, 42, 43) according to the first setting while the message/command is treated as nodes (the OC-12 ADM (#1) 45) according to the second setting and the response thereto is provided as an output.

It is to be noted that the above descriptions assume the second setting (*2) in FIG. 11 corresponding to FIGS. 14, 15 and 18. Assuming that the second setting corresponds to FIGS. 16–18, all of the flow operation is not counterclockwise but clockwise.

There will now be described an application of the universal link configurator of the present invention to a non-recursive type.

It is to be noted that in the application of the universal link configurator of the present invention, the settings of an external interface specifications and protocol of the E2A-TBOS and the parameters according to the exclusive transaction language TL-1 are the same as previously described referring to FIGS. 11 and 19. Therefore, no description will be repeated hereinafter.

Figure 23:
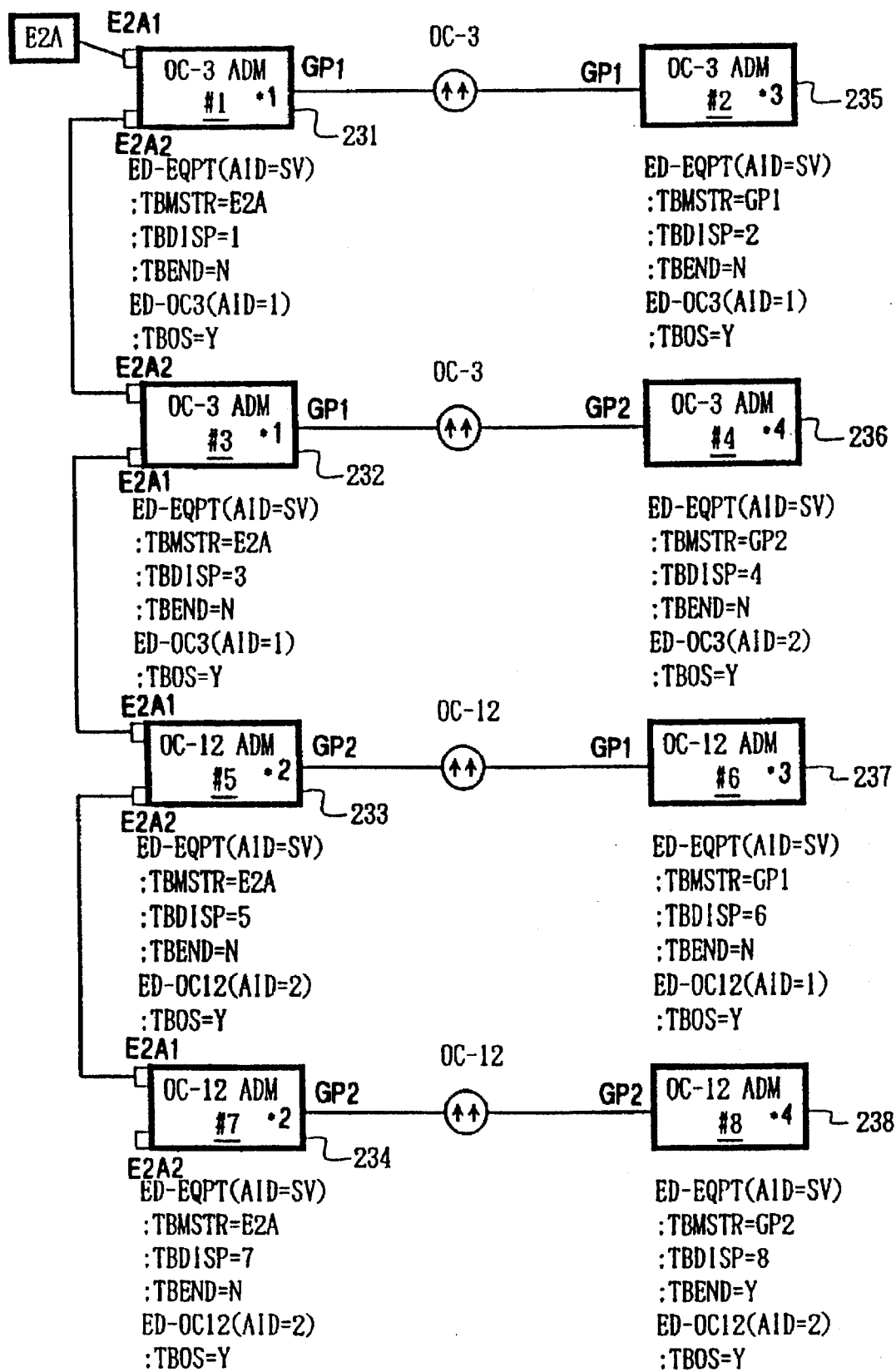
FIG. 23 is a diagram schematically showing a third application of the present invention.

FIG. 23 shows one application of the universal link configurator of the present invention to a non-recursive network type wherein a link configuration in the form of point to point is illustrated.

Figure 24:
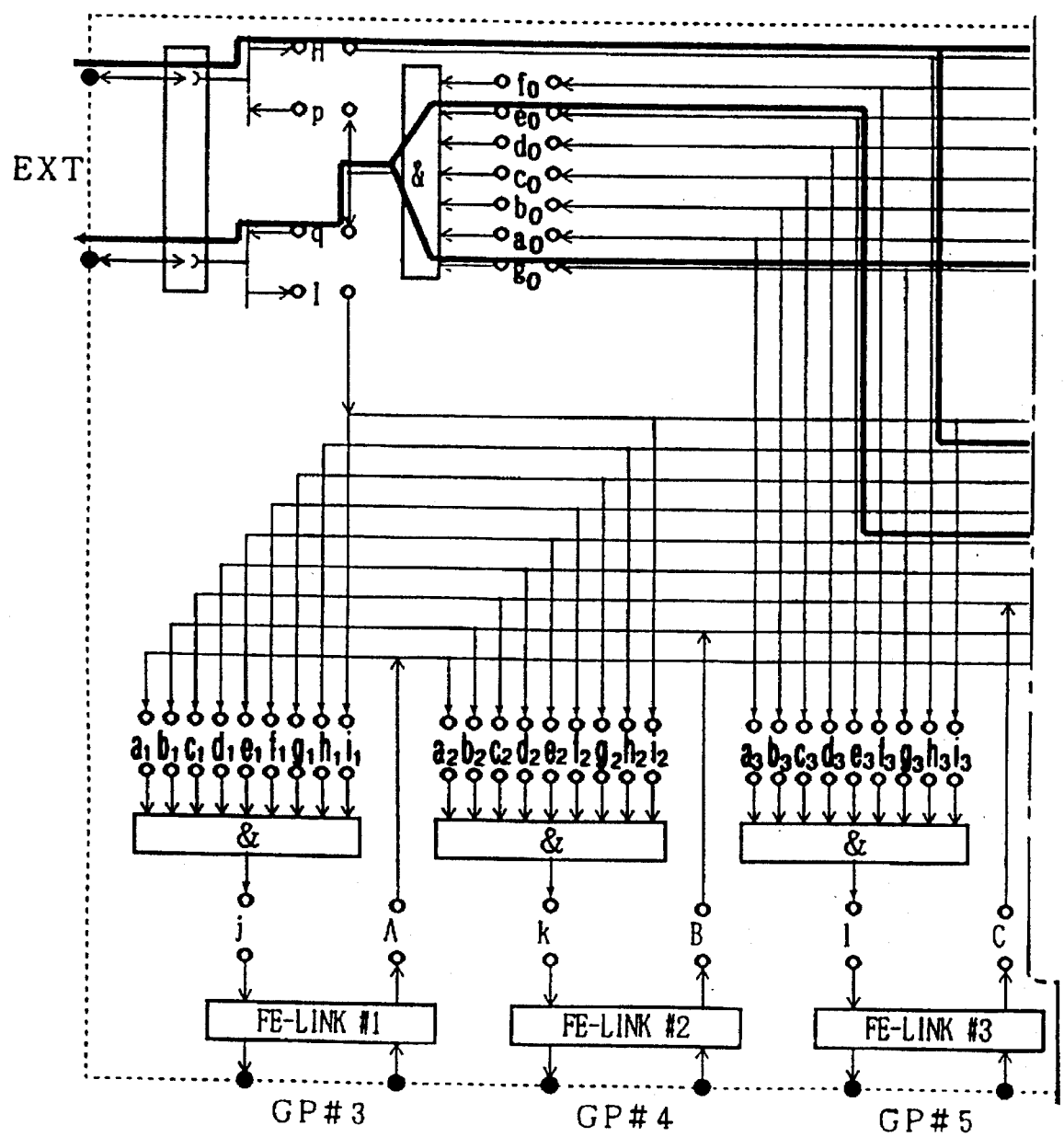
FIG. 24 is a diagram showing a part of a detailed arrangement of a seventh application of the present invention.
Figure 25:
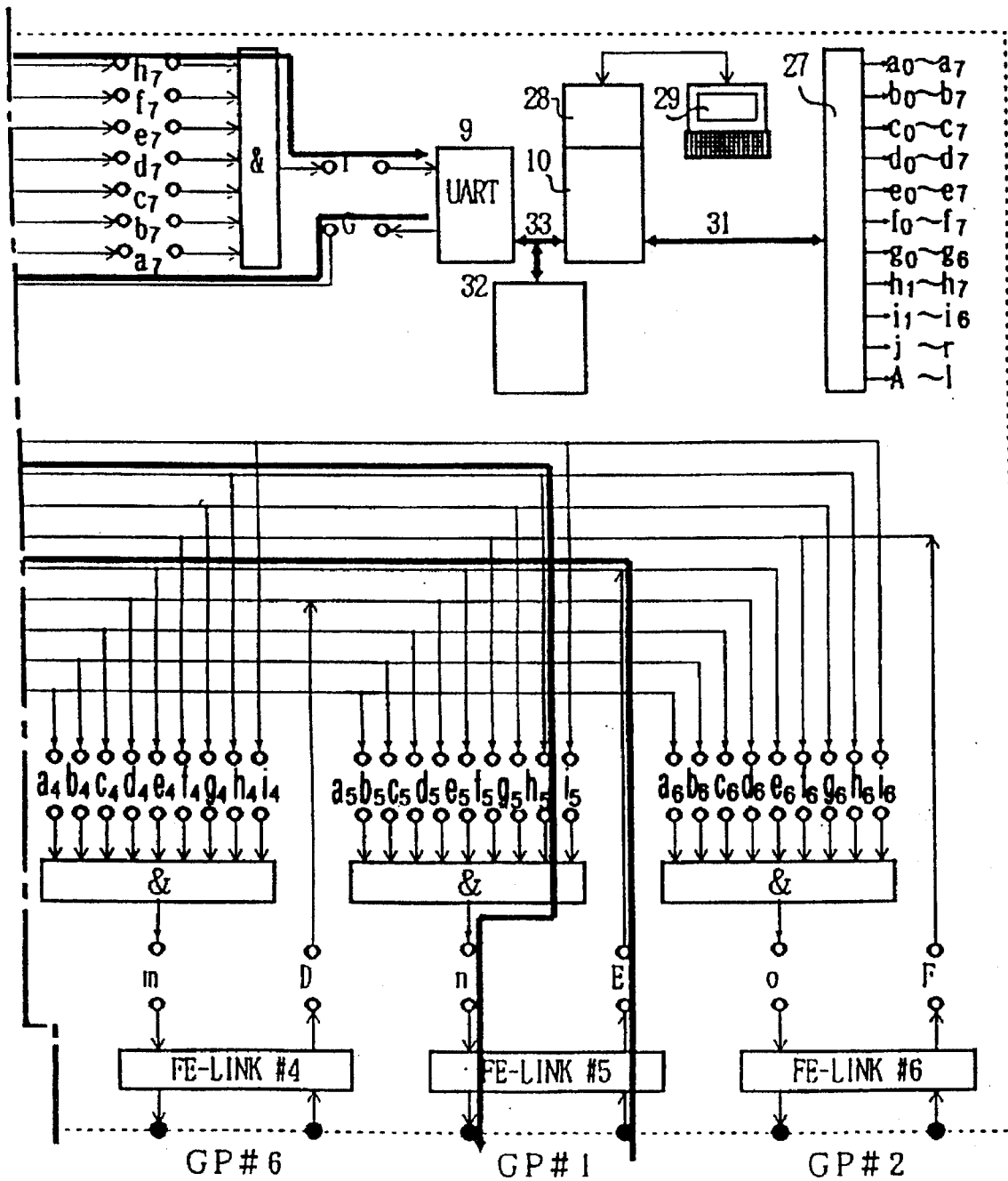
FIG. 25 is a diagram of a part of the detailed arrangement of the seventh application of the present invention having a connection with FIG. 24.

The universal link configurators 231, 232 provided with the first setting (*1) have message/command paths (H-h7-r) and (H-h5-n) and the response path (G-g0-q) or (E-e0-q) as shown in FIGS. 24 and 25 as two-divided.

Figure 26:
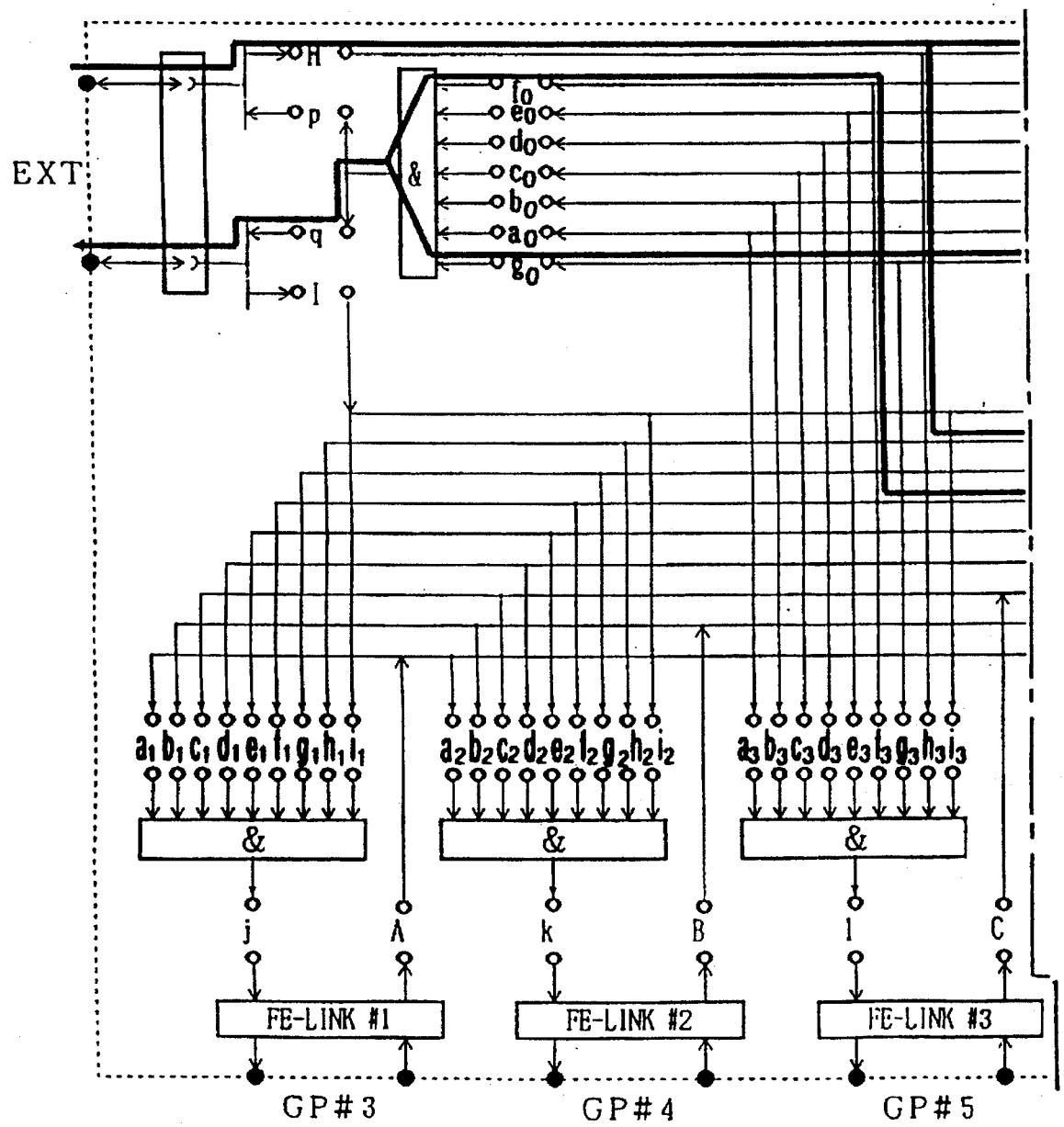
FIG. 26 is a diagram showing a part of a detailed arrangement of a eighth application of the present invention.
Figure 27:
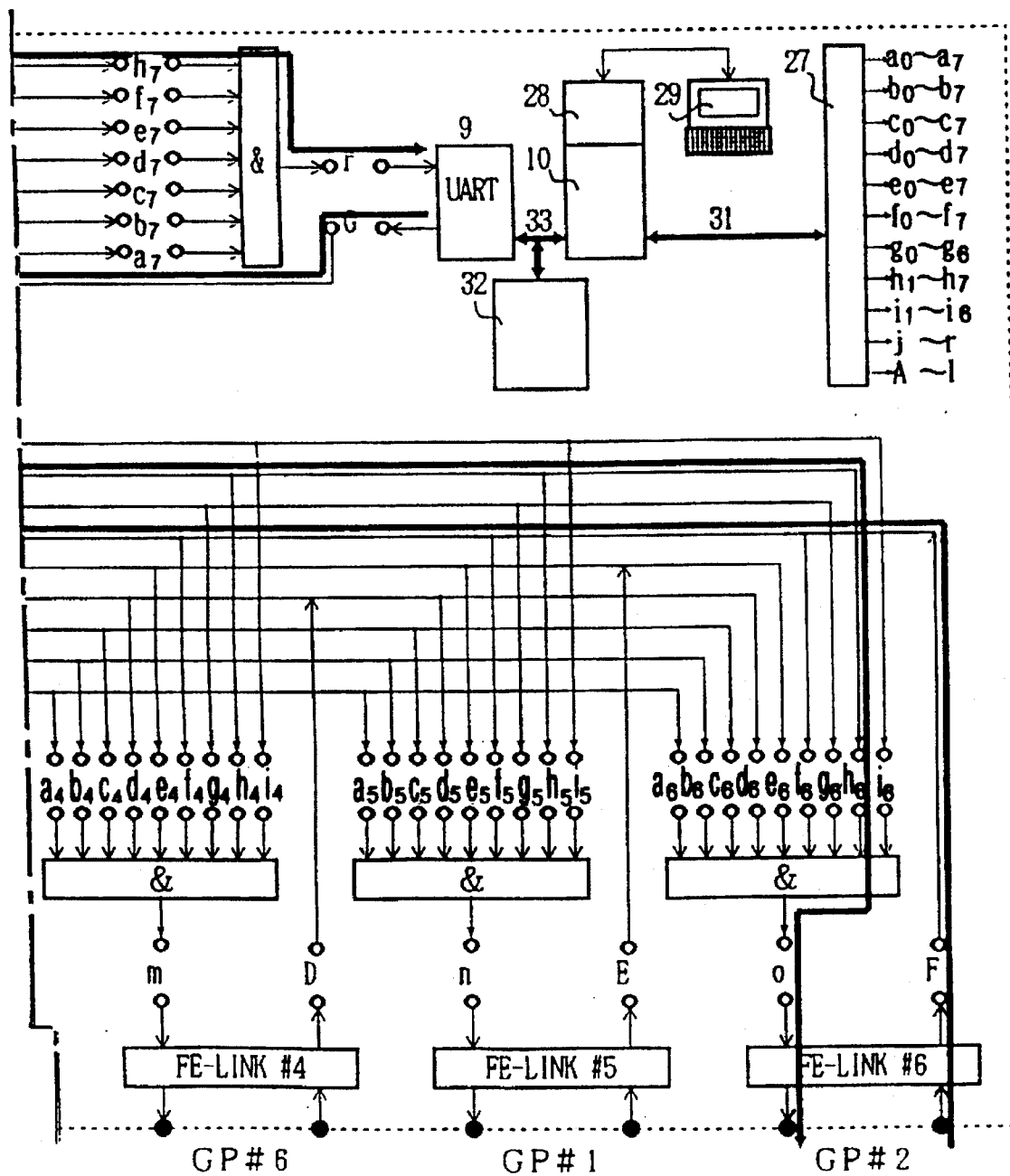
FIG. 27 is a diagram showing a part of the detailed arrangement of the eighth application of the present invention having a connection with FIG. 26.

The universal link configurators 233, 234 provided with the second setting (*2) have message/command paths (H-h7-r) and (H-h6-o) as shown in FIGS. 26 and 27 as two-divided.

The ADM equipment having the universal link configurator of the present invention with provisioning as in FIGS. 24–27 has the same externally connecting system as in FIG. 18 and is composed of a message/command path and a response path.

The message/command paths from the E2A-TBOS to the OC-12/OC-3 ADM are ((TX)-(E2A/TBOS) (902) -E2A1 (903))-H) and ((TX)-(E2A/TBOS) (902)-E2A2(906)-H N); (N=3, 5, 7 (H N represents a path to the OC-3 ADM (#3) 232, the OC-12 ADM (#5) 233, the OC-12 ADM (#7) 234 in FIG. 23)).

The response path from the OC-12/OC-3 ADM to E2A-TBOS is (q-E2A1(903)-(E2A/TBOS)(902)-(RX)) or (qN-E2A2(906)-(E2A/TBOS)(902)-(RX));(N=3, 5, 7 (qN represents a path from the OC-3 ADM (#3) 232, the OC-12 ADM (#5) 233, the OC-12 ADM (#7) 234 in FIG. 23)).

Figure 28:
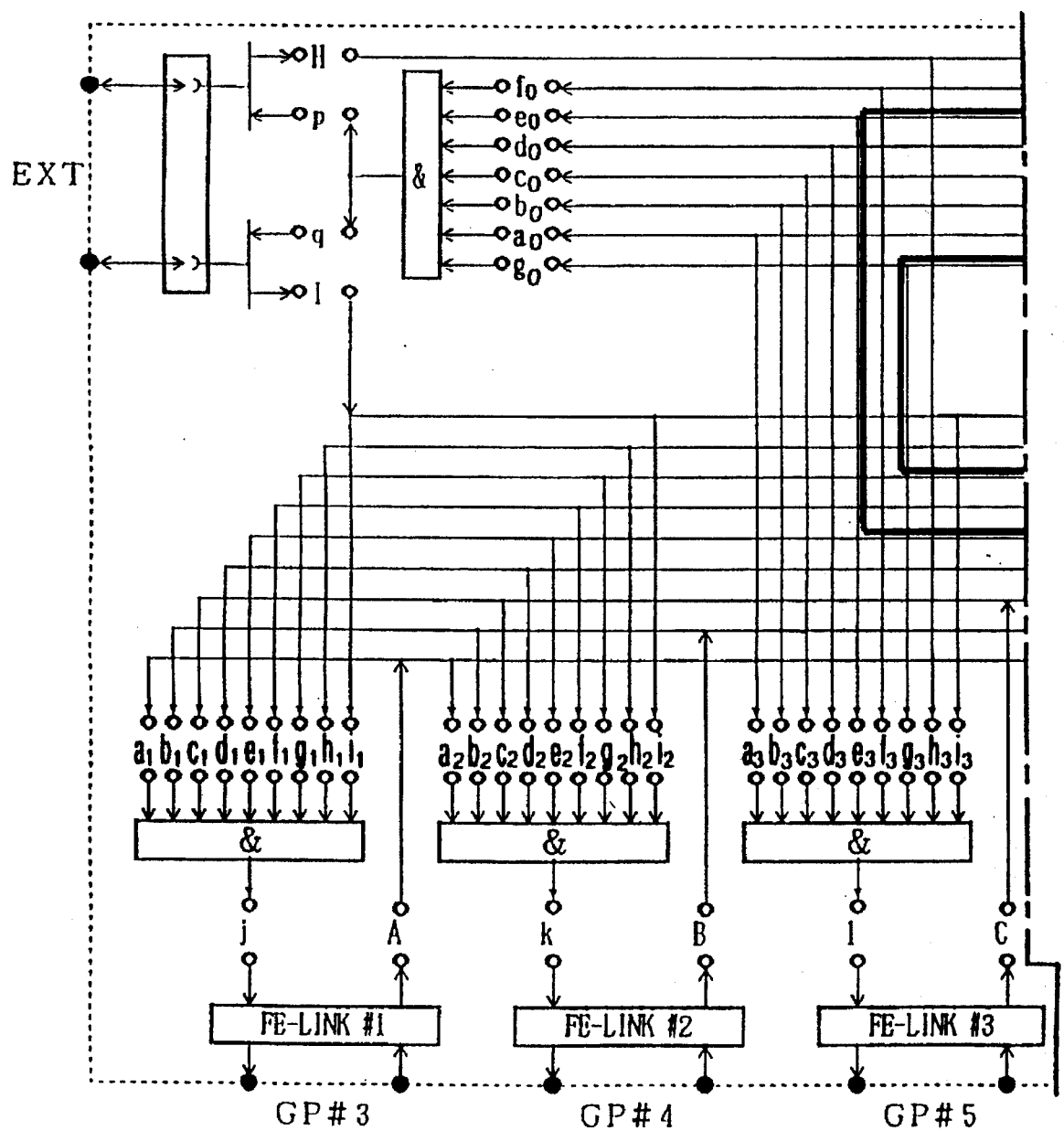
FIG. 28 is a diagram showing a part of a detailed arrangement of a ninth application of the present invention.
Figure 29:
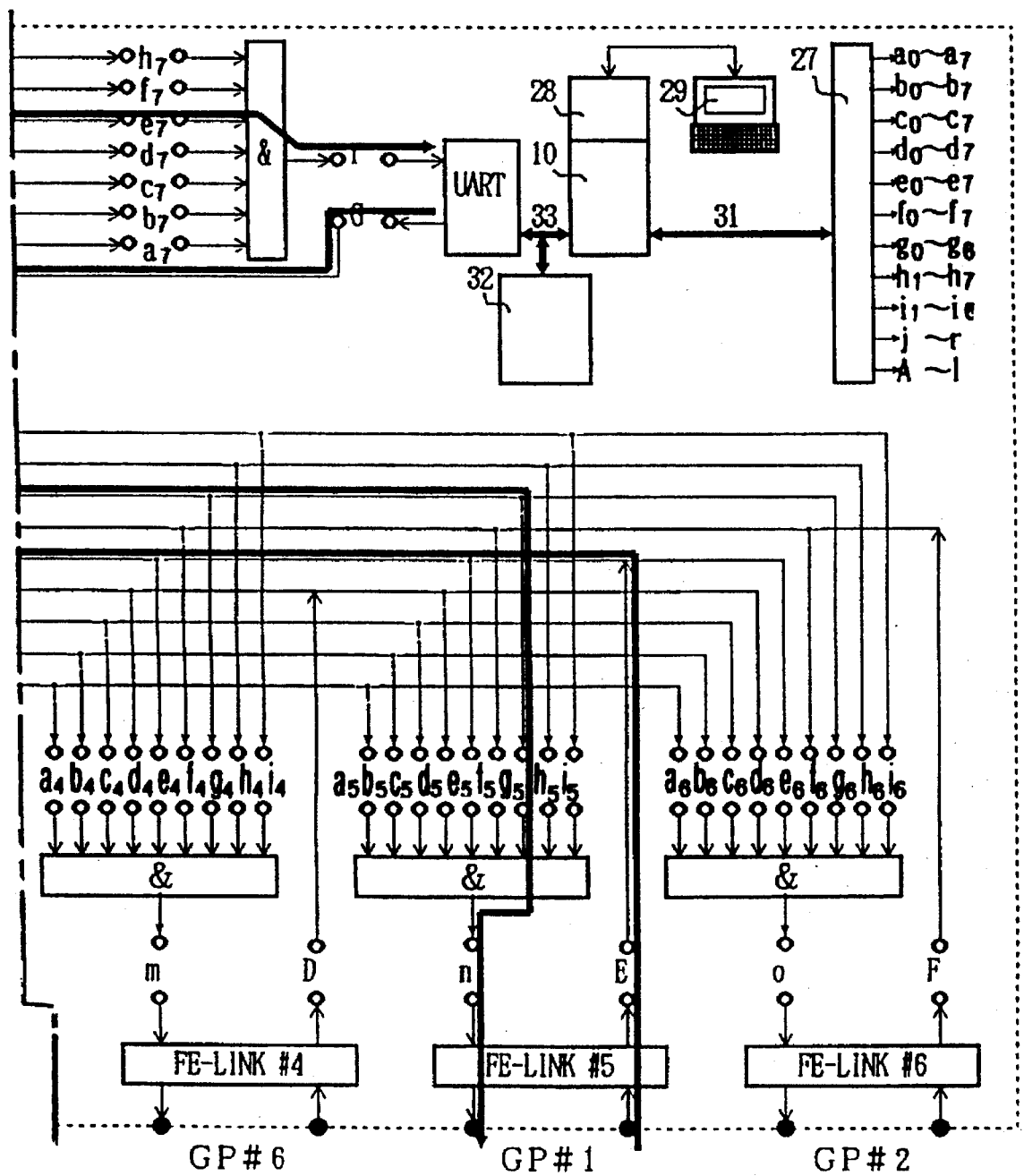
FIG. 29 is a diagram showing a part of the detailed arrangement of the ninth application of the present invention having a connection with FIG. 28.
Figure 30:
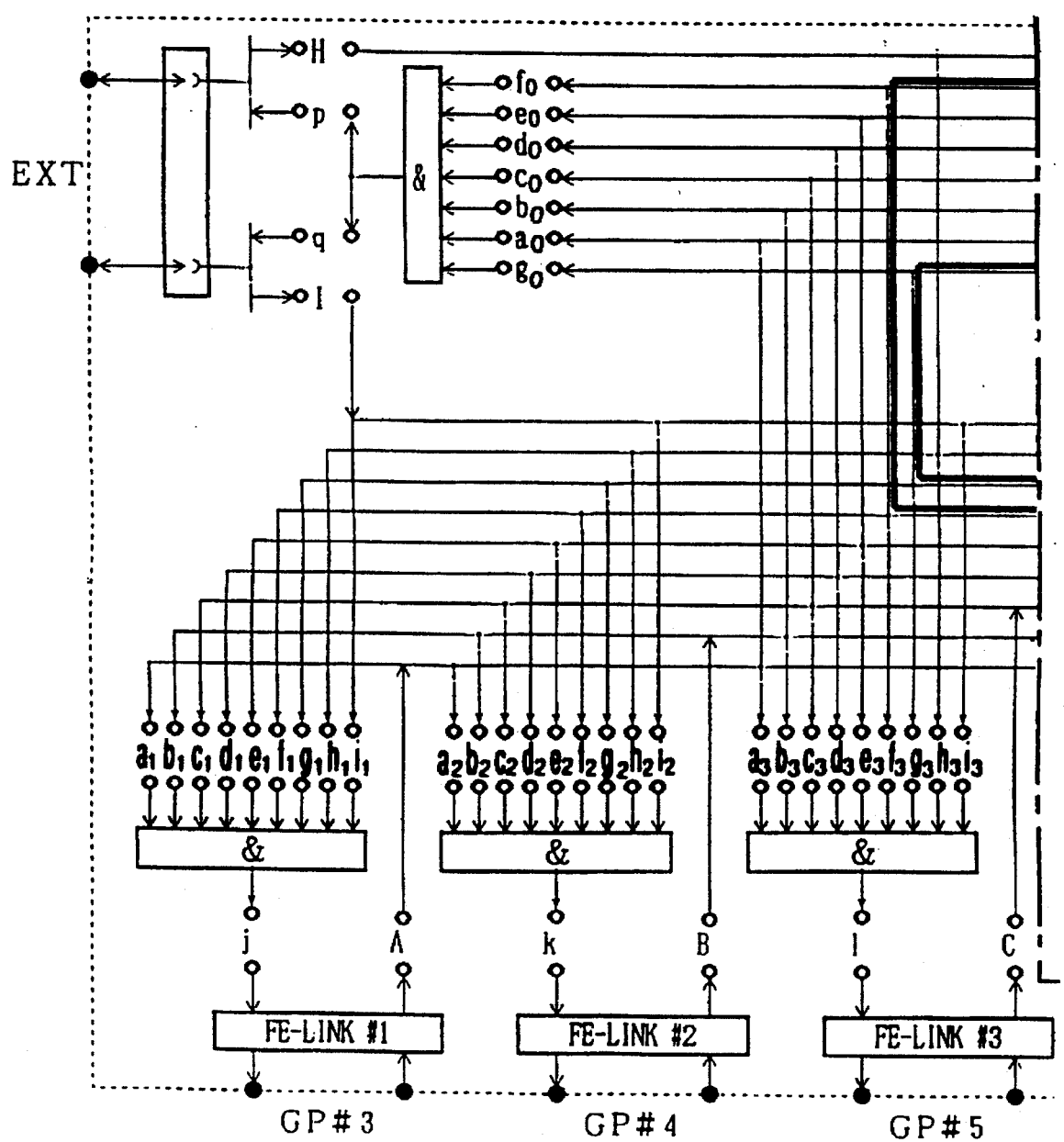
FIG. 30 is a diagram showing a part of a detailed arrangement of a tenth application of the present invention.
Figure 31:
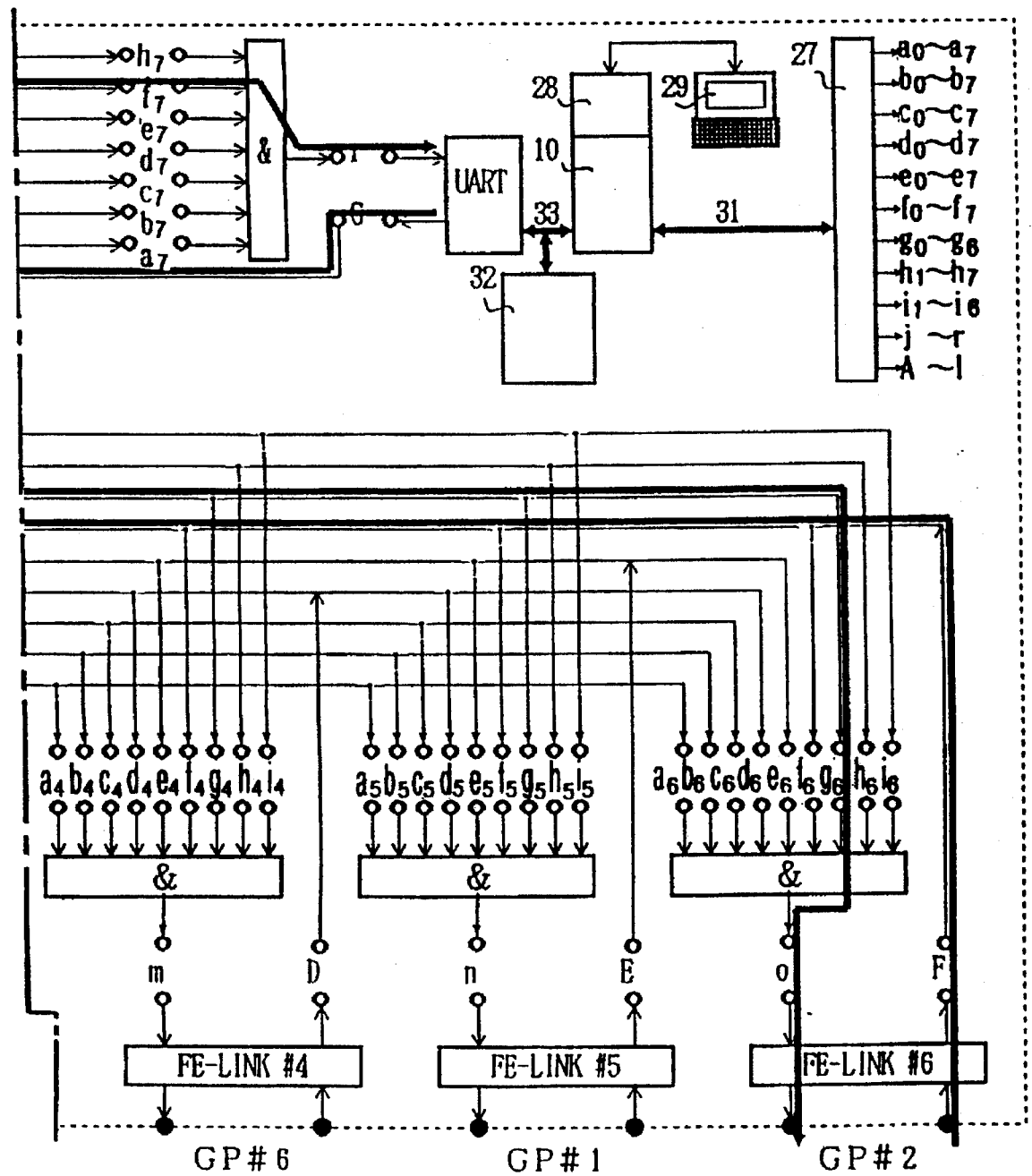
FIG. 31 is a diagram showing a part of the detailed arrangement of the tenth application of the present invention having a connection with FIG. 30.

The ADM equipments having the universal link configurators 235, 237 according to the third setting (*3) with the message/command path (E-e7-r) and the response path (G-g5-n) as shown in FIGS. 28 and 29 as two-divided and the universal link configurators 236, 238 according to a fourth setting (*4) with the message/command path (F-f7-r) and the response path (G-g6-o) as shown in FIGS. 30 and 31 as two-divided is also included in a network in the form of point to point.

Figure 32:
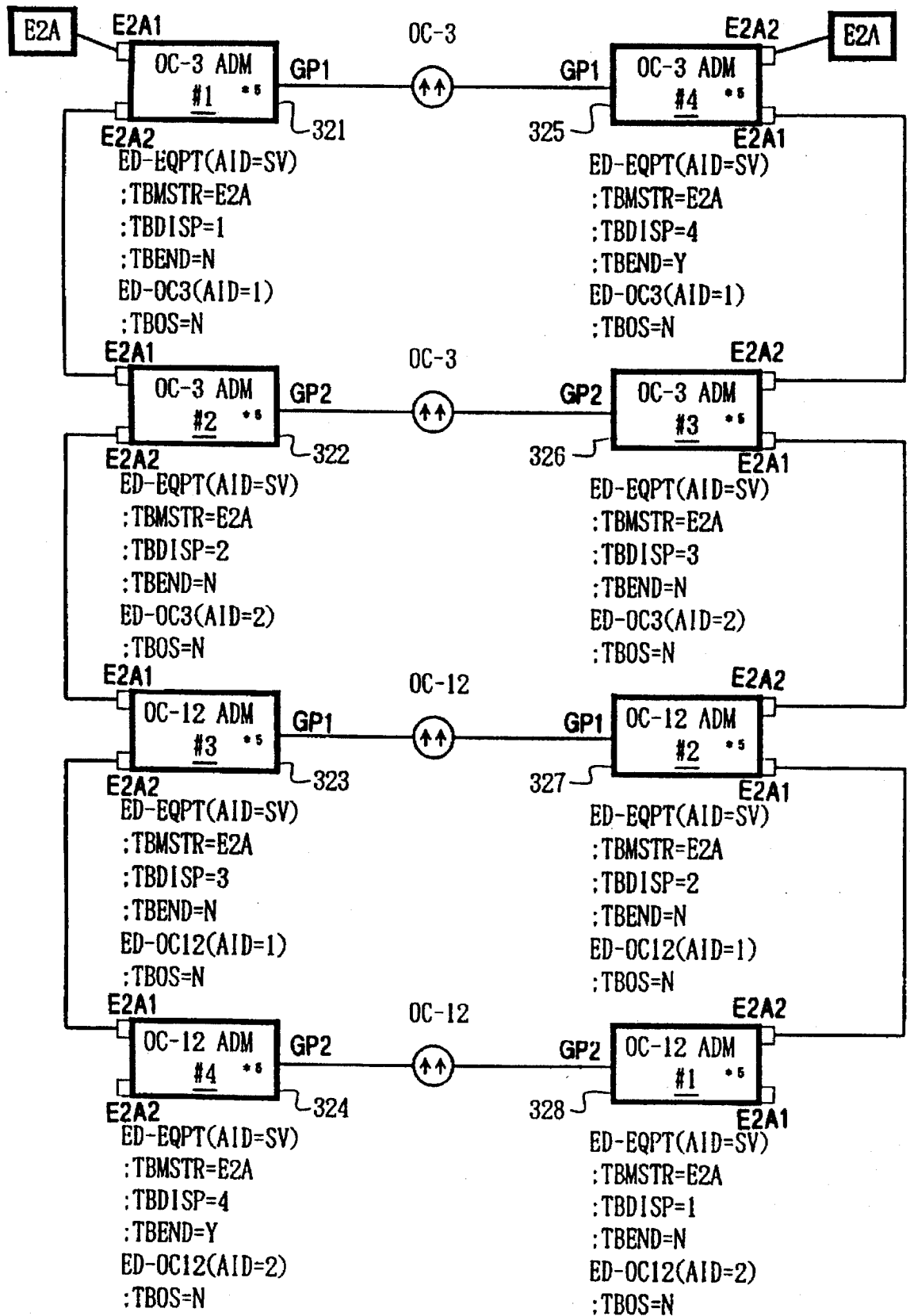
FIG. 32 is a diagram schematically showing a fourth application of the present invention.

Although FIG. 32 represents a link configuration in the same form of point to point, it shows an application characterizing an arrangement only using an externally connecting system without FE-LINK facility. The universal link configurators 321–328 in all of the ADM equipments according to that arrangement are provided with a fifth setting (*5) which only has the message/command path (H-h7-r) and the response path (G-go-q) as shown in FIGS. 33 and 34 as two-divided.

Figure 33:
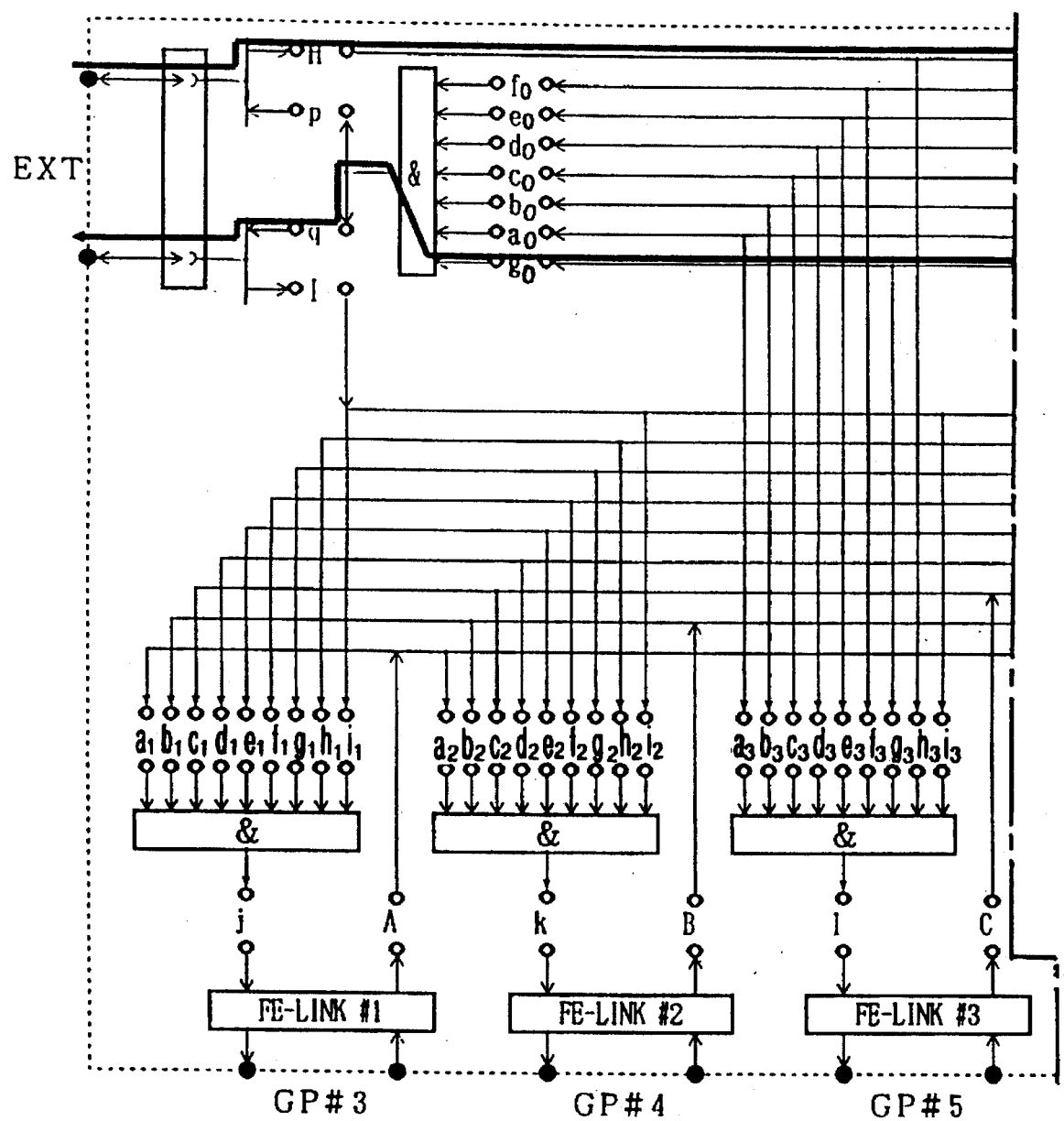
FIG. 33 is a diagram showing a part of a detailed arrangement of an eleventh application of the present invention.
Figure 34:
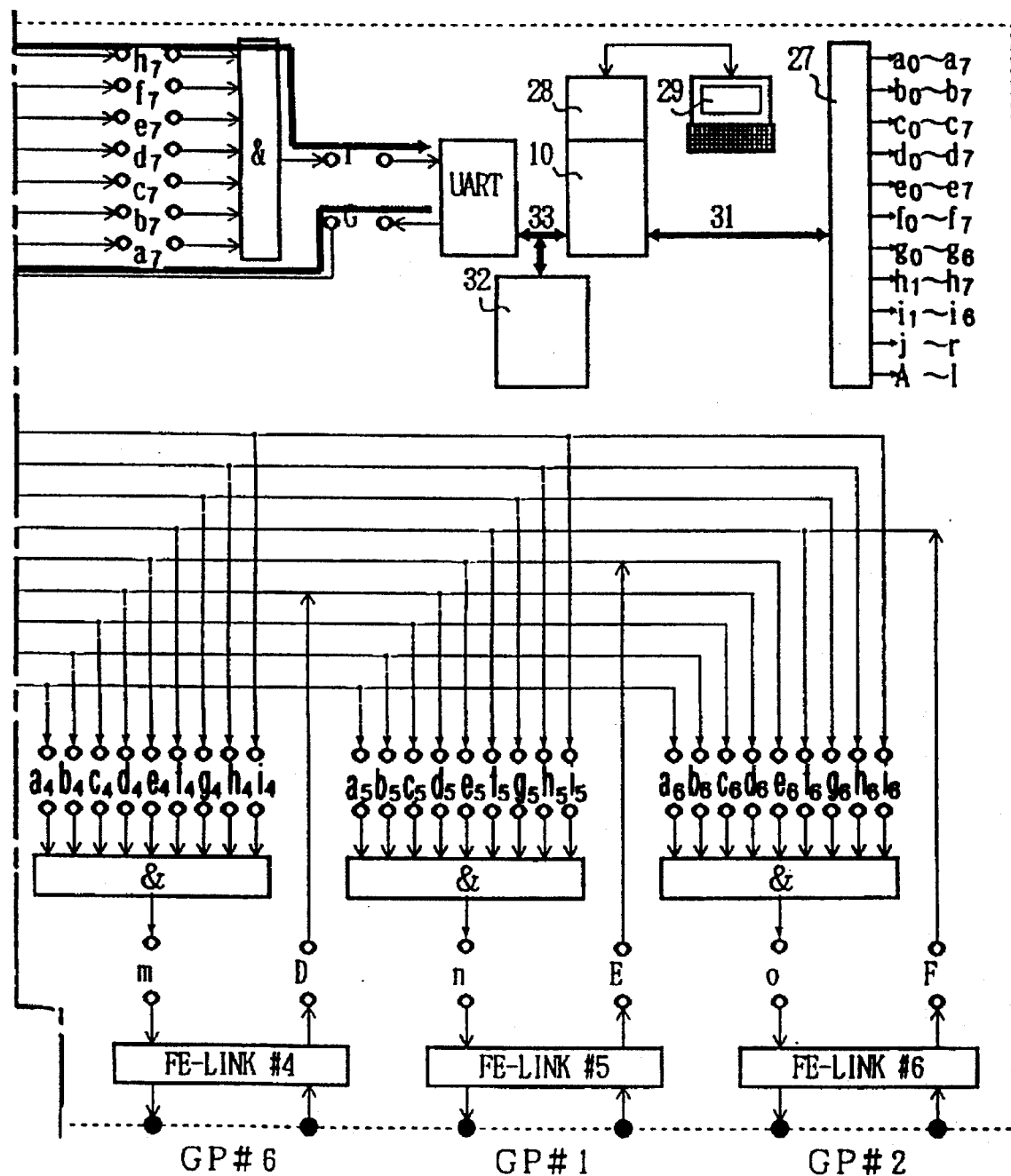
FIG. 34 is a diagram showing a part of the detailed arrangement of the eleventh application of the present invention having a connection with FIG. 33.

The ADM equipments having the universal link configurator with provisioning as shown in FIGS. 33 and 34 have the same externally connecting system as in FIG. 18. Namely, this externally connecting system has the following paths.

Firstly, in the figures, there are message/command paths ((T X)-(E2A/TBOS)(902)-E2A1(903)-H) and ((TX)-(E2A/ TBOS)(902)-E2A2(906)-H L);(L=2, 3, 4 (H L represents a path to the OC-3 ADM (#2) 322, the OC-12 ADM (#3) 323, the OC-12 ADM (#4) 324 in FIG. 32)) from the E2A-TBOS on the left side from the OC-12/OC-3 ADM on the rigth side, and a response path (q-E2A1(903)-(E2A/TBOS(902)-(RX)) or (qL-E2A2(906)-(E2A/TBOS)(902)-(R X));(L=2, 3, 4 (qL represents a path from the OC-3 ADM (#2) 322, the OC-12 ADM (#3) 323, the OC-12 ADM (#4) 324)).

Secondly, in the figures, there are message/command paths ((TX)-(E2A/TBOS)(902)-E2A1(903)-H) and ((TX)-(E2A/TBOS)(902)-E2A2(906)-H K);(K=1, 2, 3 (H K represents a path to the OC-3 ADM (#1) 328, the OC-12 ADM (#2) 327, the OC-12 ADM (#3) 326) on the right side in FIG. 32) from the E2A-TBOS on the left side from the OC-12/ OC-3 ADM on the right side, and is a response path (q-E2A1(903)-(E2A/TBOS)(902)-(RX)) or (qK-E2A2(906) -(E2A/TBOS)(902)-(R X));(K=1, 2, 3 (qK represents a path from the OC-3 ADM (#1) 328, the OC-12 ADM (#2) 327, the OC-12 ADM (#3) 326 on the right side in FIG. 32)) from the OC-12/OC-3 ADM on the right side to the E2A-TBOS on the left side.

FIG. 35 illustrates a link configuration in the form of back to back and an ADM equipment composed of the universal link configurators 351, 353, 356, and 358 provided with the first setting (*1), the universal link configurators 354 and 359 provided with the third setting (*3), and the universal link configurators 352 and 357 provided with a sixth setting (*6).

The arrangement of the information path according to the first and the third setting (*1, *3) has been described referring to FIG. 23. The arrangement of the information path according to the sixth setting (*6) has, as shown in the two-divided FIGS. 36 and 37, are message/command path (E-e7-r) and (E-e0-p) and are response path (G-g5-n) or (I-i5-n).

Figure 36:
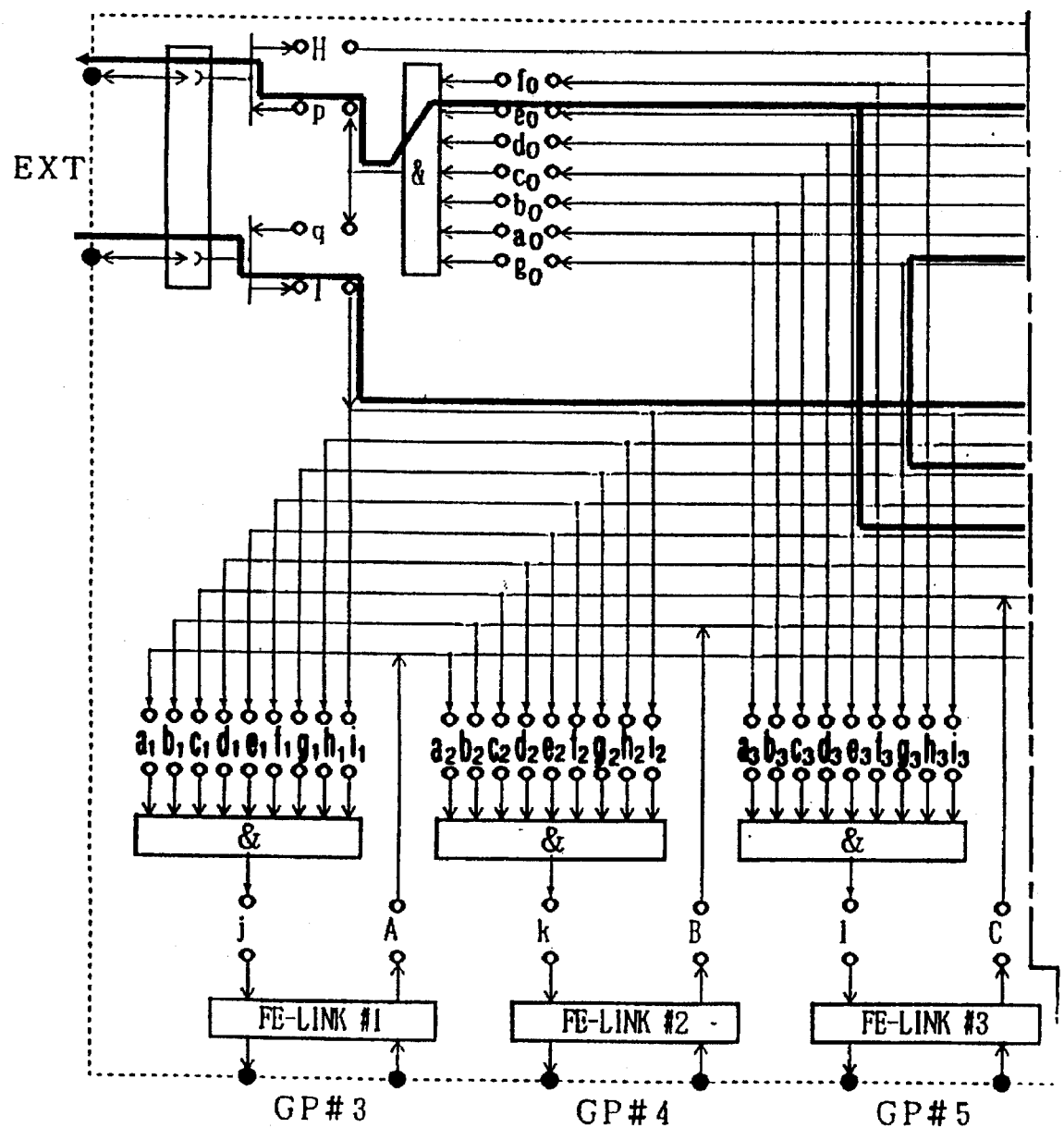
FIG. 36 is a diagram showing a part of a detailed arrangement of a twelfth of the present invention.
Figure 37:
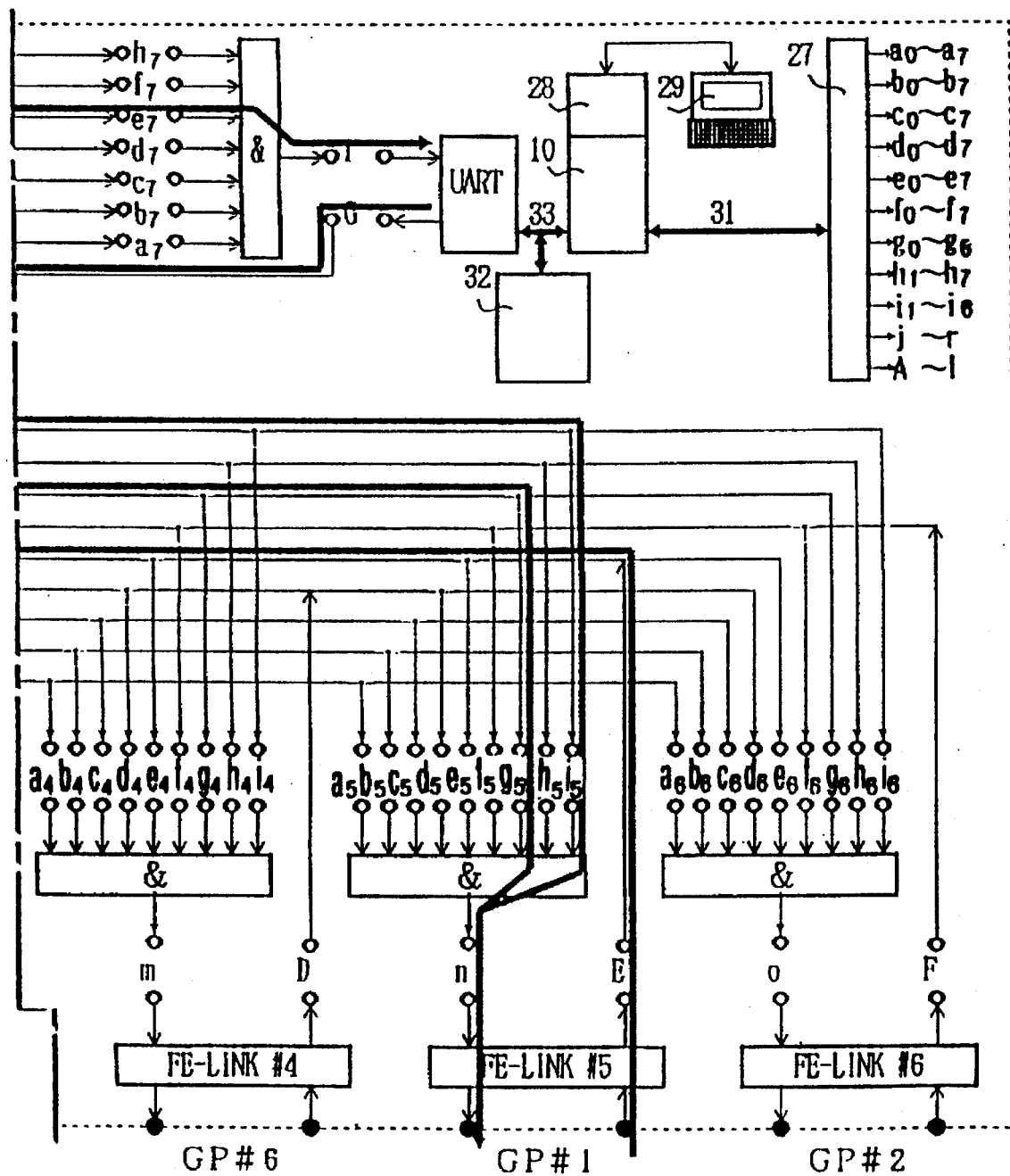
FIG. 37 is a diagram showing a part of the detailed arrangement of the twelfth application of the present invention having a connection with FIG. 36.

The ADM equipment having the universal link configurator with provisioning as shown in FIGS. 36 and 37 has the same externally connecting system as in FIG. 22. At the disconnecting point of the FE-LINK facility of the E2A-TBOS equipment, i.e. in this example, between the OC-3 ADM (#2) 352 and the OC-3 ADM (#3) 353 and between the OC-12 ADM (#6) 357 and the OC-12 ADM (#7) 358, the externally connecting system has an ADM equipment set as an extended E2A-TBOS equipment disposed on one side and has a conventional ADM equipment set as a terminated E2A-TBOS equipment on the other side. The external connection of both equipments can further extend the FE-LINK facility.

Between the OC-3 ADM (#2) 352 and the OC-3 ADM (#3) 353, this externally connecting system has message/command paths (p-E2A1(104)-E2A1(105)-H) and (p-E2A1(105)-E2A1(104)-E2A2(108)-HM);(M=3 (H M represents a path to the OC-3 ADM (#3) 353 in FIG. 35)) from the extended ADM (the OC-12/OC-3 ADM on the left side in FIG. 22) to the terminated ADM (the OC-12/OC-3 ADM on the right side in FIG. 22), and has a response path (q-E2A1(105)-E2A1(104)-I) or (qM-E2A2(108)-E2A1(105)-E2A1(104)-I);(M=3 (q M represents a path from the OC-3 ADM (#3) 353 in FIG. 35)) from the terminated ADM to the extended ADM.

Between the OC-12 ADM (#6) 357 and the OC-12 ADM (#7) 358, the externally connecting system has message/command paths (p-E2A1(104)-E2A1(105)-H) and (p-E2A1(104)-E2A1(105)-E2A2(108)-H L);(L=7 (H L represents a path to the OC-12 ADM (#7) 358 in FIG. 35)) from the extended ADM to the terminated ADM, and has a response path (q-E2A1(105)-E2A1(104)-I) or (qL-E2A2(108)-E2A1(105)-E2A1(104)-I);(L=7 (q L represents a path from the OC-12 ADM (#7) 358 in FIG. 35)) from the terminated ADM to the extended ADM.

Figure 38:
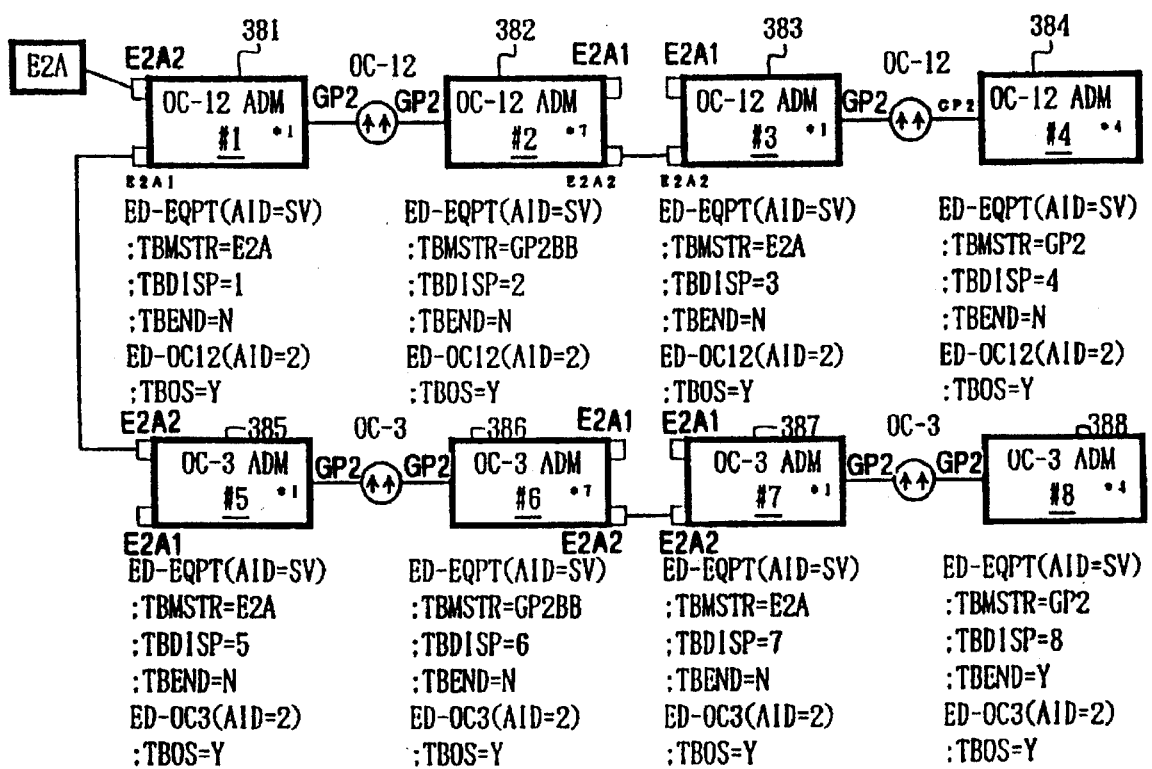
FIG. 38 is a diagram schematically showing a sixth application of the present invention.

Similarly, the ADM equipment in the form of back to back in FIG. 38 has the universal link configurators 381, 383, 385, and 387 provided with the first setting (*1), the universal link configurator 384 provided with the fourth setting (*4), and the universal link configurators 382 and 386 provided with a seventh setting (*7).

The arrangement of the information paths according to the first and the fourth settings has been already described referring to FIG. 23. The arrangement of the information paths according to the seventh setting (*7) has, as shown in the FIGS. 39 and 40 as two-divided, are message/command paths (F-f7-r) and (F-f0-p) and a response path (G-g6-o) or (I-i6-o).

Figure 39:
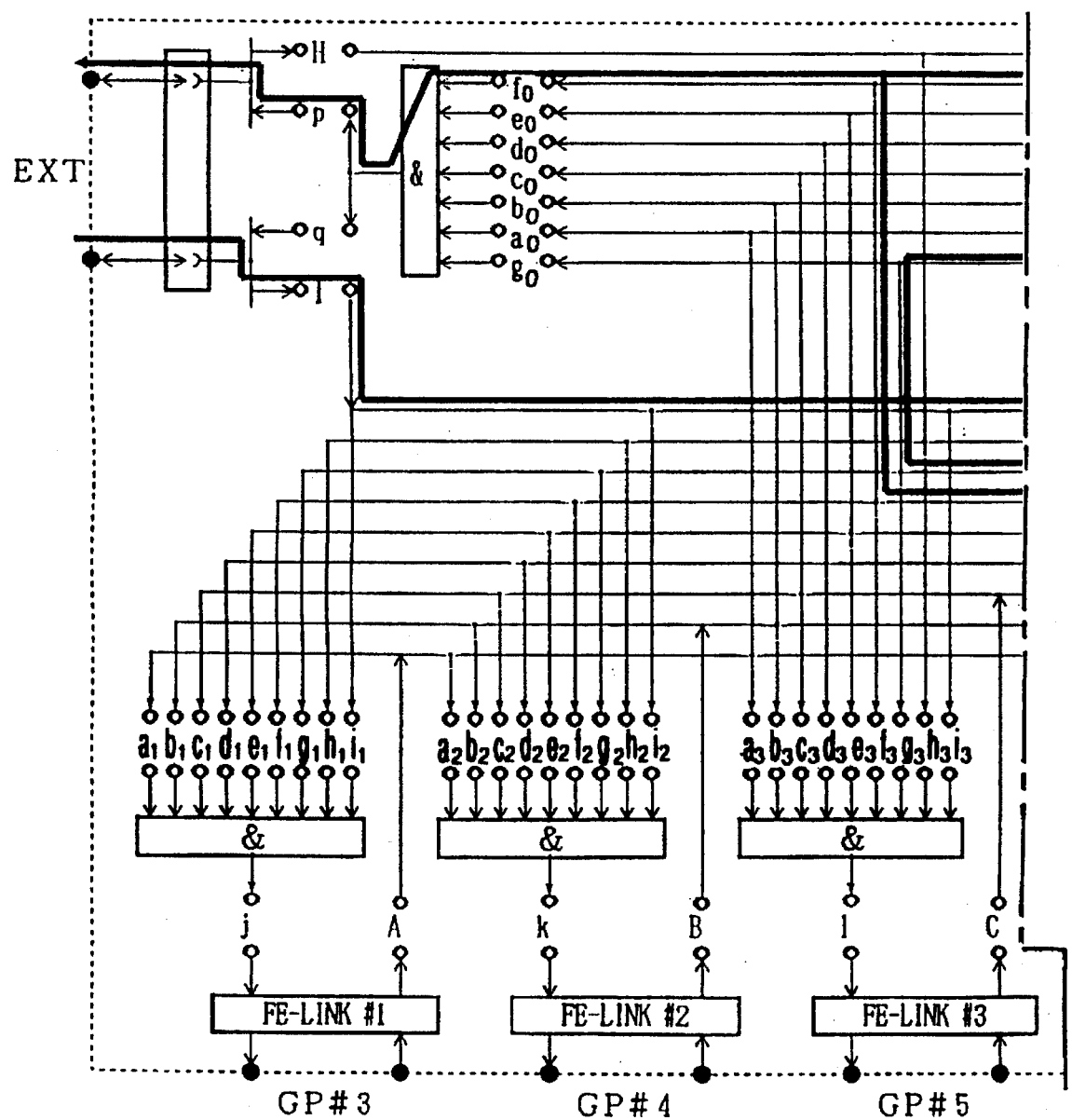
FIG. 39 is a diagram showing a part of a detailed arrangement of a thirteenth application of the present invention.
Figure 40:
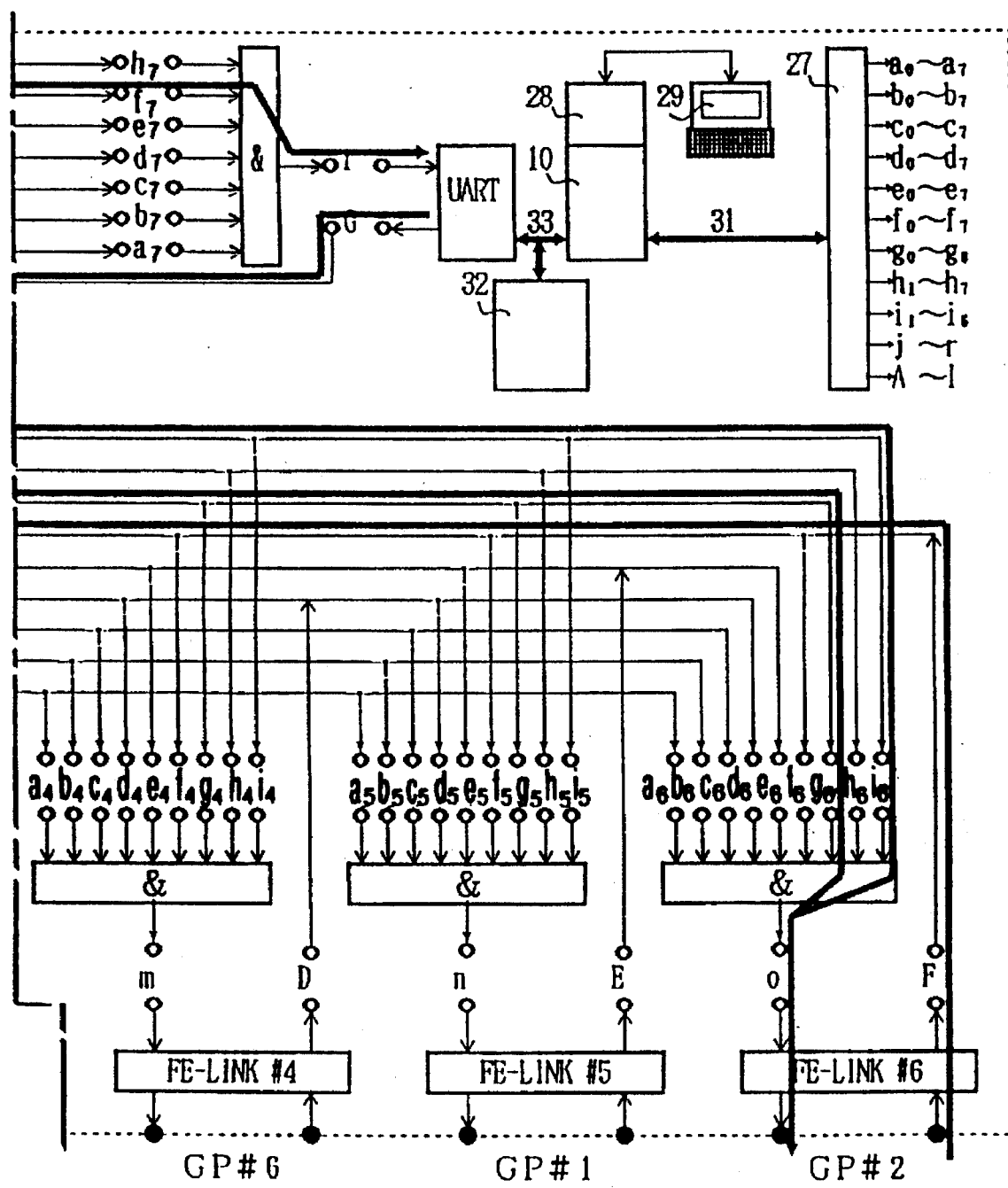
FIG. 40 is a diagram showing a part of the detailed arrangement of the thirteenth application of the present invention having a connection with FIG. 39.

The ADM equipments having the universal link configurator with provisioning in FIGS. 39 and 40 has the same externally connecting system as in FIG. 22. At the disconnecting point of the FE-LINK facility of the E2A-TBOS equipment, i.e. in this embodiment, between the OC-12 ADM (#2) 382 and the OC-12 ADM (#3) 383 and between the OC-3 ADM (#6) 386 and the OC-3 ADM (#7) 387, the externally connecting system has an ADM equipment set as an extended E2A-TBOS equipment disposed on one side and a conventional ADM equipment set as a terminated E2A-TBOS equipment disposed on the other side. The external connection of both equipments can further extend the FE-LINK facility.

Between the OC-12 ADM (#2) 382 and the OC-12 ADM (#3) 383, the externally connecting system has message/command paths (p-E2A2(108)-E2A2(109)-H) and (p-E2A2(108)-E2A2(109)-E2A1(105)-H M);(M=3 (H M represents a path to OS-12 ADM (#3) 383 in FIG. 38)) from the extended ADM from the terminated ADM, and has a response path (q-E2A2(108)-E2A2(109)-I) or (qM-E2A1(105)-E2A2(108)-E2A2(109)-I);(M=3 (q M represents a path from the OC-12 ADM (#3)383 in FIG. 38)) from the terminated ADM to the extended ADM.

Between the OC-3 ADM (#6) 386 and the OC-3 ADM (#7) 387, the externally connecting system has message/command paths (p-E2A2(109)-E2A2(108)-H) and (p-E2A2(109)-E2A2(108)-E2A1(105)-H L); (L=7 (H L represents a path to the OC-3 ADM (#7) 387 in FIG. 38)) from the extended ADM to the terminated ADM, and has a response path (q-E2A2(108)-E2A2(109)-I) or (qL-E2A1(105)-E2A2(108)-E2A2(109)-I); L=7 (q L represents a path from the OC-3 ADM (#7) 387 in FIG. 38) from the terminated ADM to the extended ADM.

Figure 41:
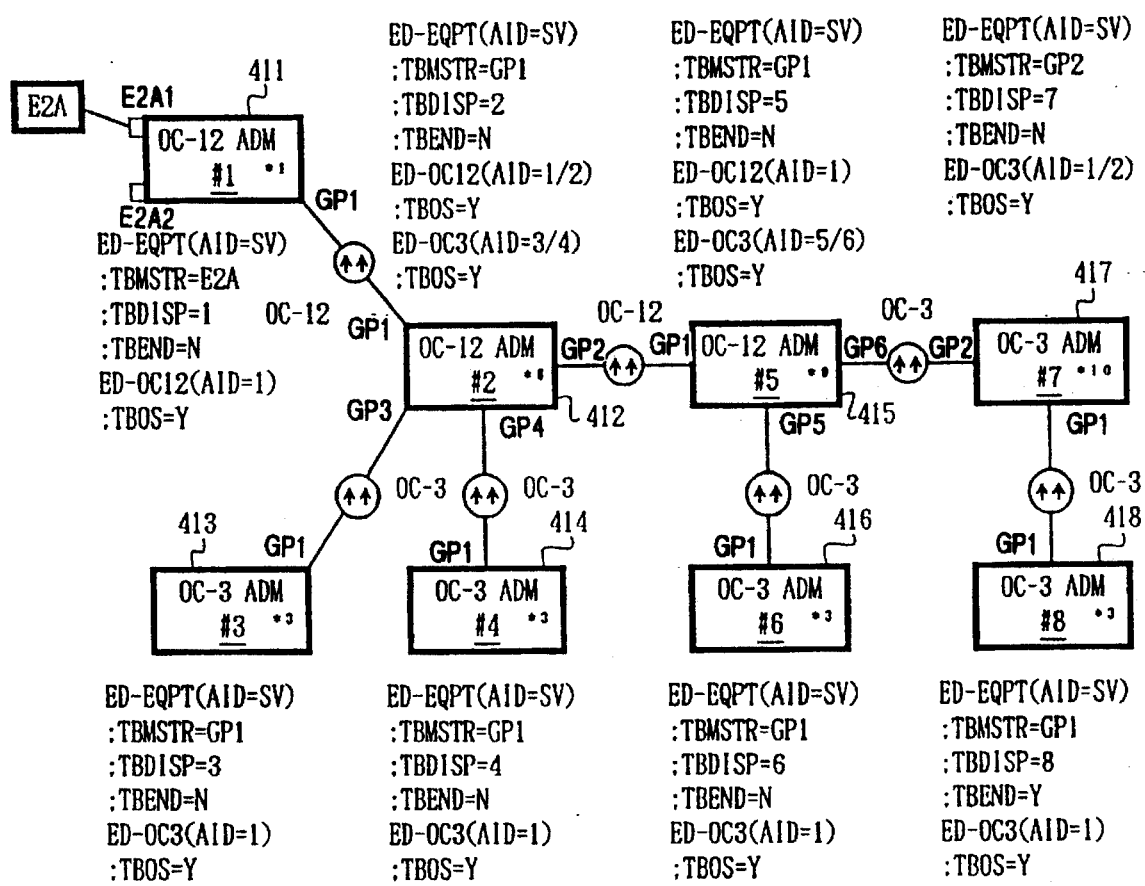
FIG. 41 is a diagram schematically showing a sixth application of the present invention.

FIG. 41 shows an application of the universal link configurator of the present invention to a link configuration in the form of fiber hubbing. This ADM equipment has the universal link configurator 411 provided with the first setting (*1), and the universal link configurators 413, 414, 416, and 418 provided with the third setting (*3), and the universal link configurator 412 provided with a eighth setting (*8), the universal link configurator 415 provided with a ninth setting (*9), and the universal link configurator 417 provided with a tenth setting (*10).

Figure 42:
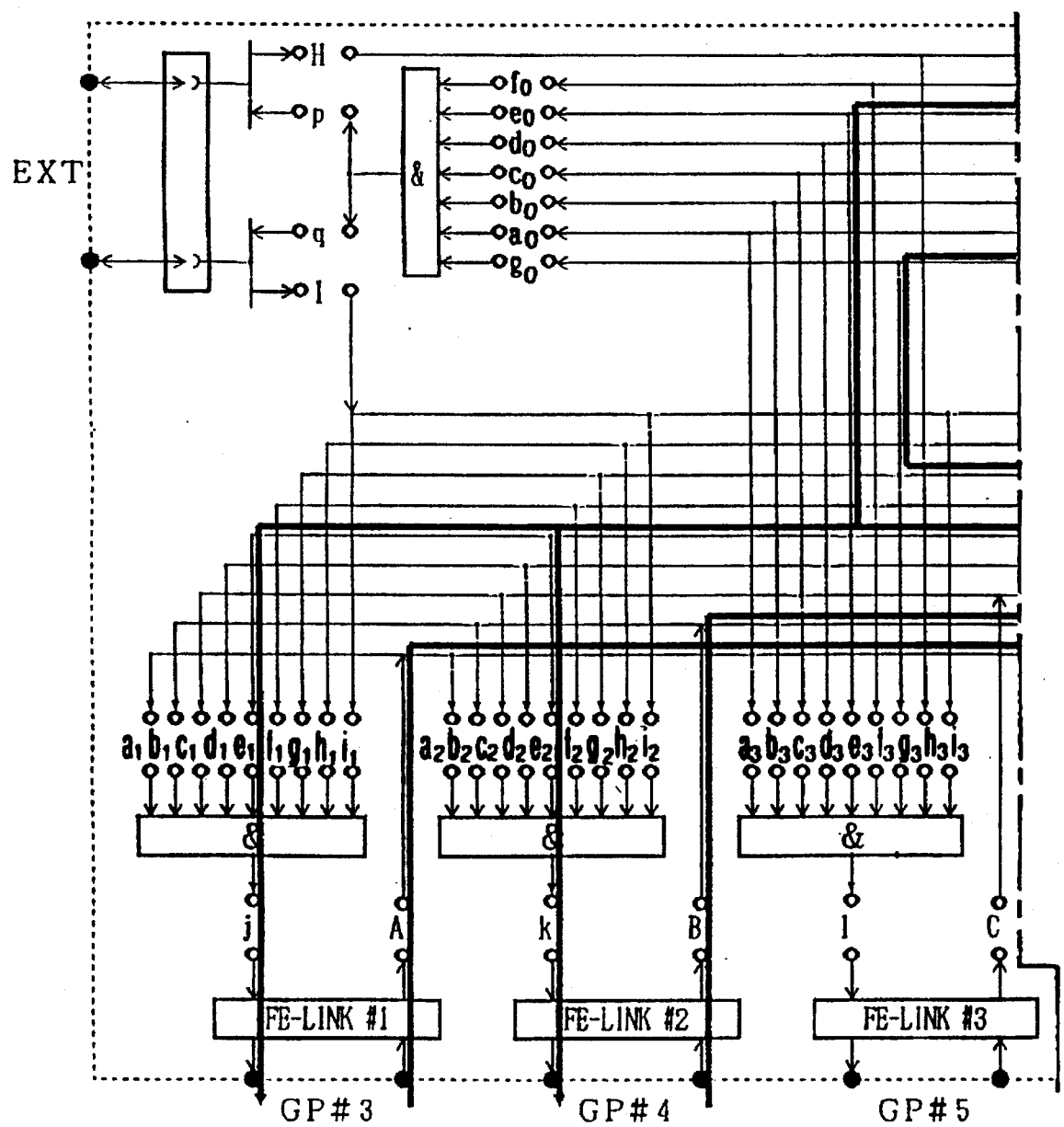
FIG. 42 is a diagram showing a part of a detailed arrangement of a fourteenth application of the present invention.
Figure 43:
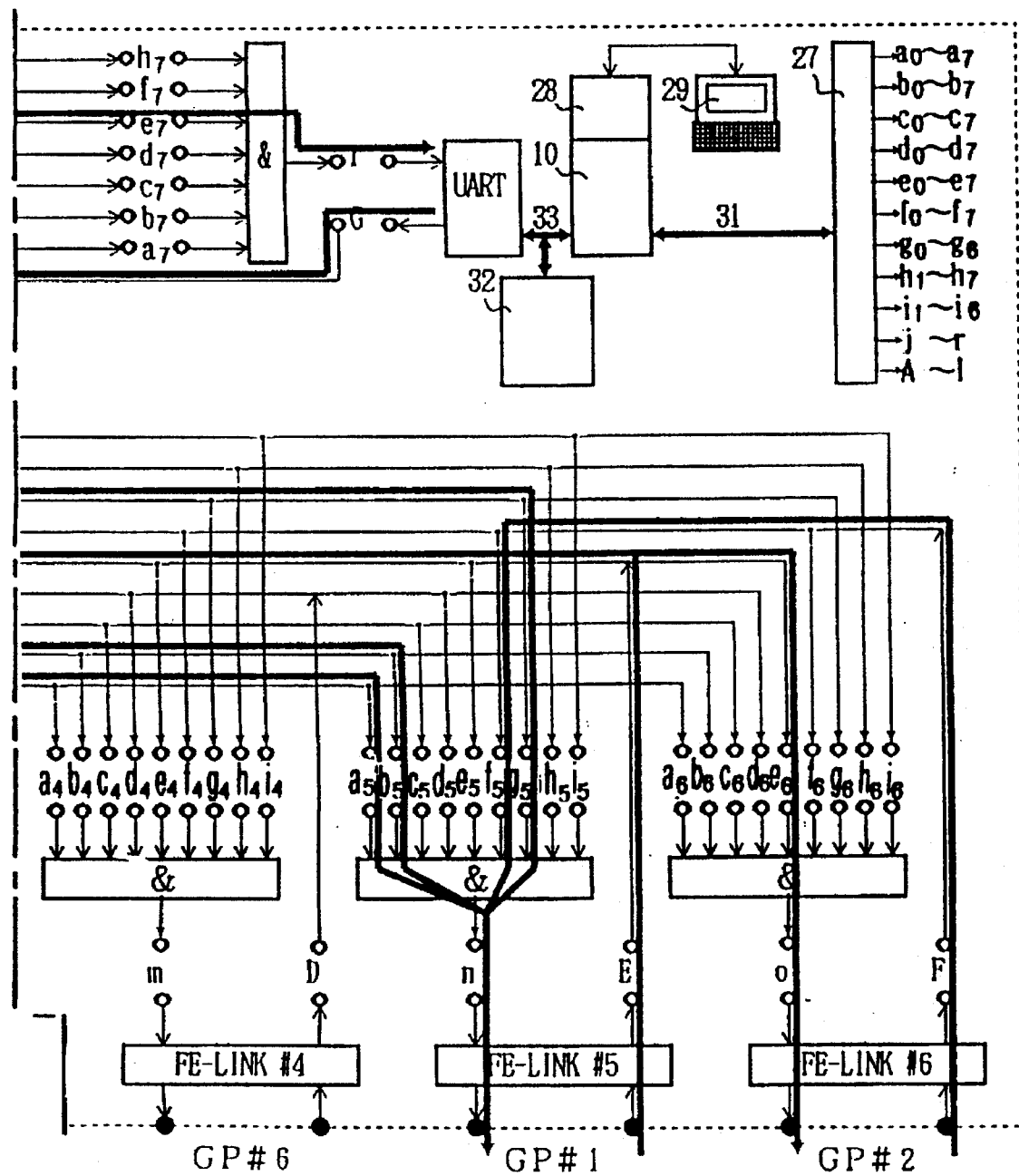
FIG. 43 is a diagram showing a part of the detailed arrangement of the fourteenth application of the present invention having a connection with FIG. 42.

The arrangement of the information path according to the first and the second settings has been described referring to FIG. 23. The arrangement of the information path according to the eighth setting (*8) has, as shown in FIGS. 42 and 43 as two-divided, message/command paths (E-e7-r), (E-e6-o), (E-e1-j), and (E-e2-k) and a response path (G-g5-n), (F-f5-n), (A-a5-n), or (B-b5-n).

Figure 44:
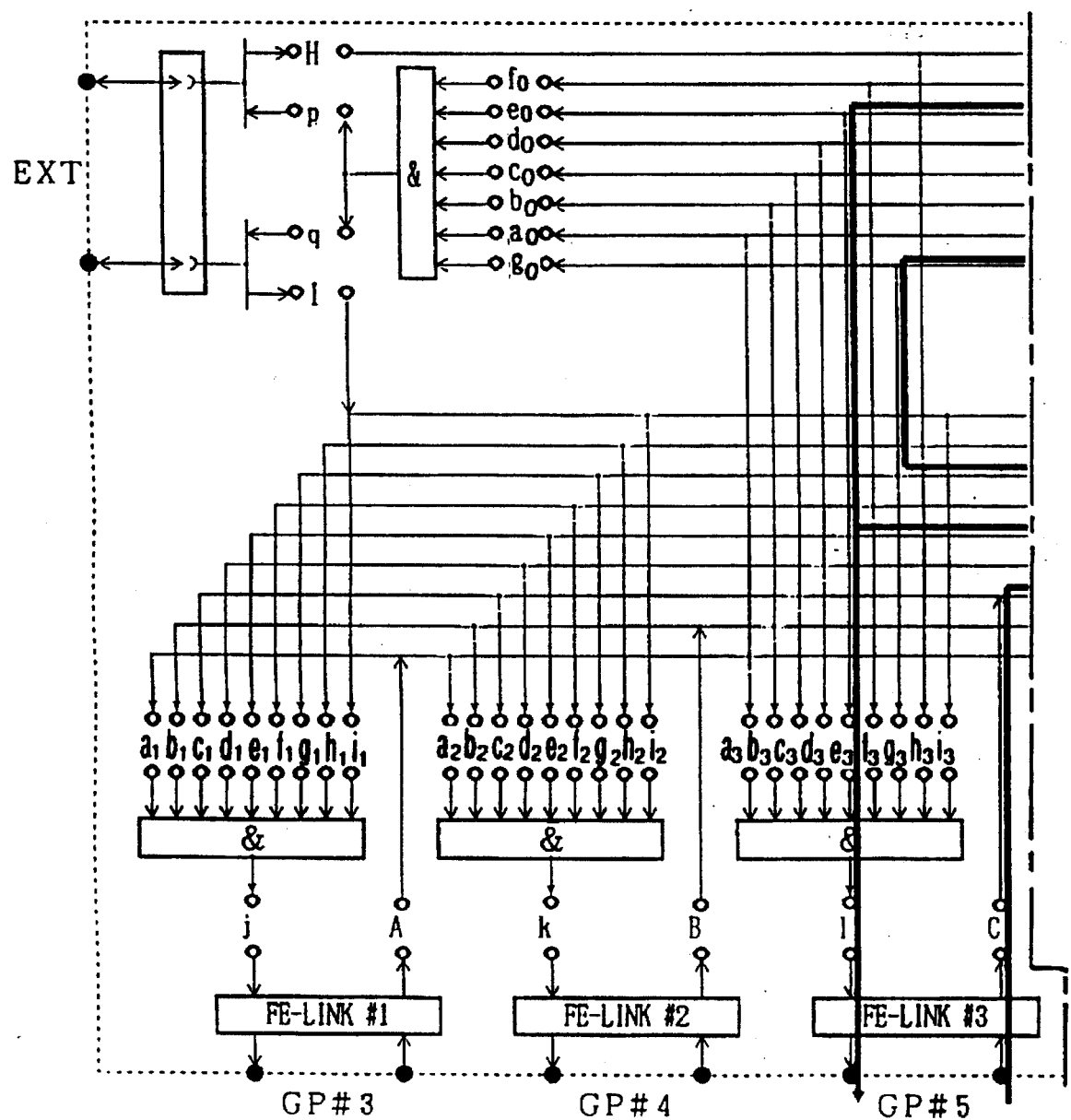
FIG. 44 is a diagram showing a part of a detailed arrangement of a fifteenth application of the present invention.
Figure 45:
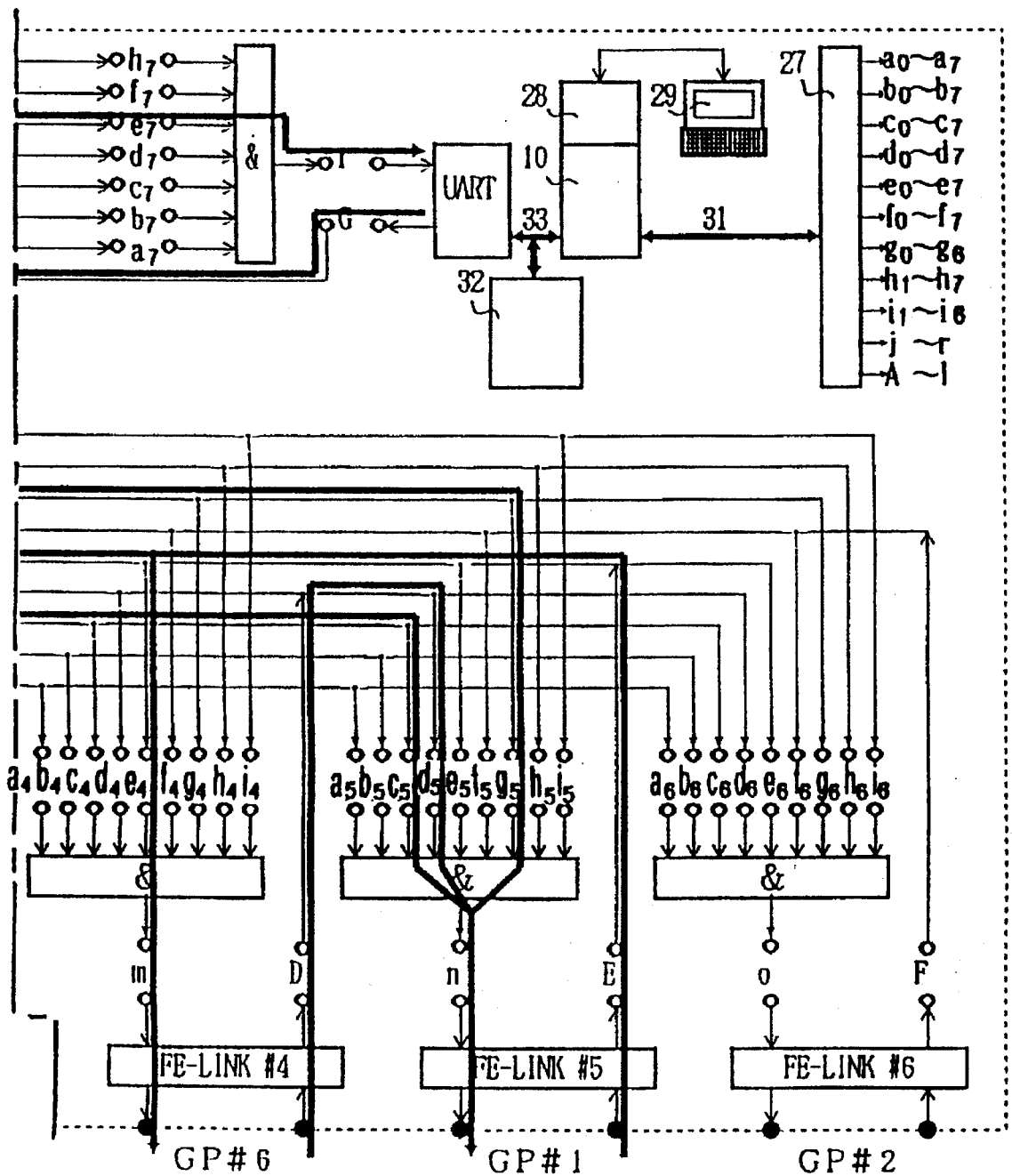
FIG. 45 is a diagram showing a part of the detailed arrangement of the fifteenth applicatin of the present invention having a connection with FIG. 44.

The arrangement of the information path according to the ninth setting (*9) has, as shown in the two-divided FIGS. 44 and 45, message/command paths (E-e7-r), (E-e3-1) and (E-e4-m) and a response path (G-g5-n), (C-c5-n) or (D-d5-n).

Figure 46:
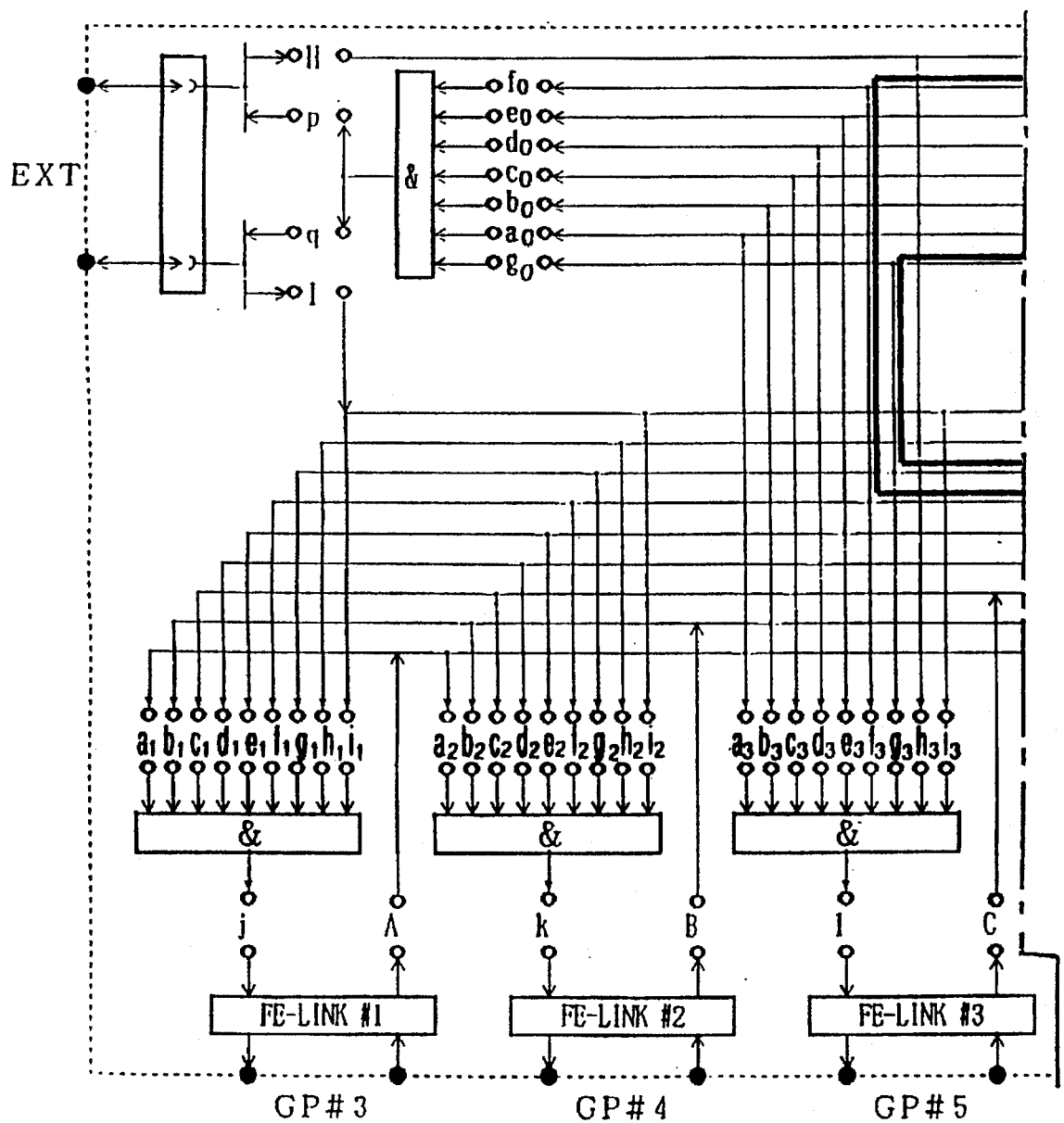
FIG. 46 is a diagram showing a part of a detailed arrangement of a sixteenth application of the present invention.
Figure 47:
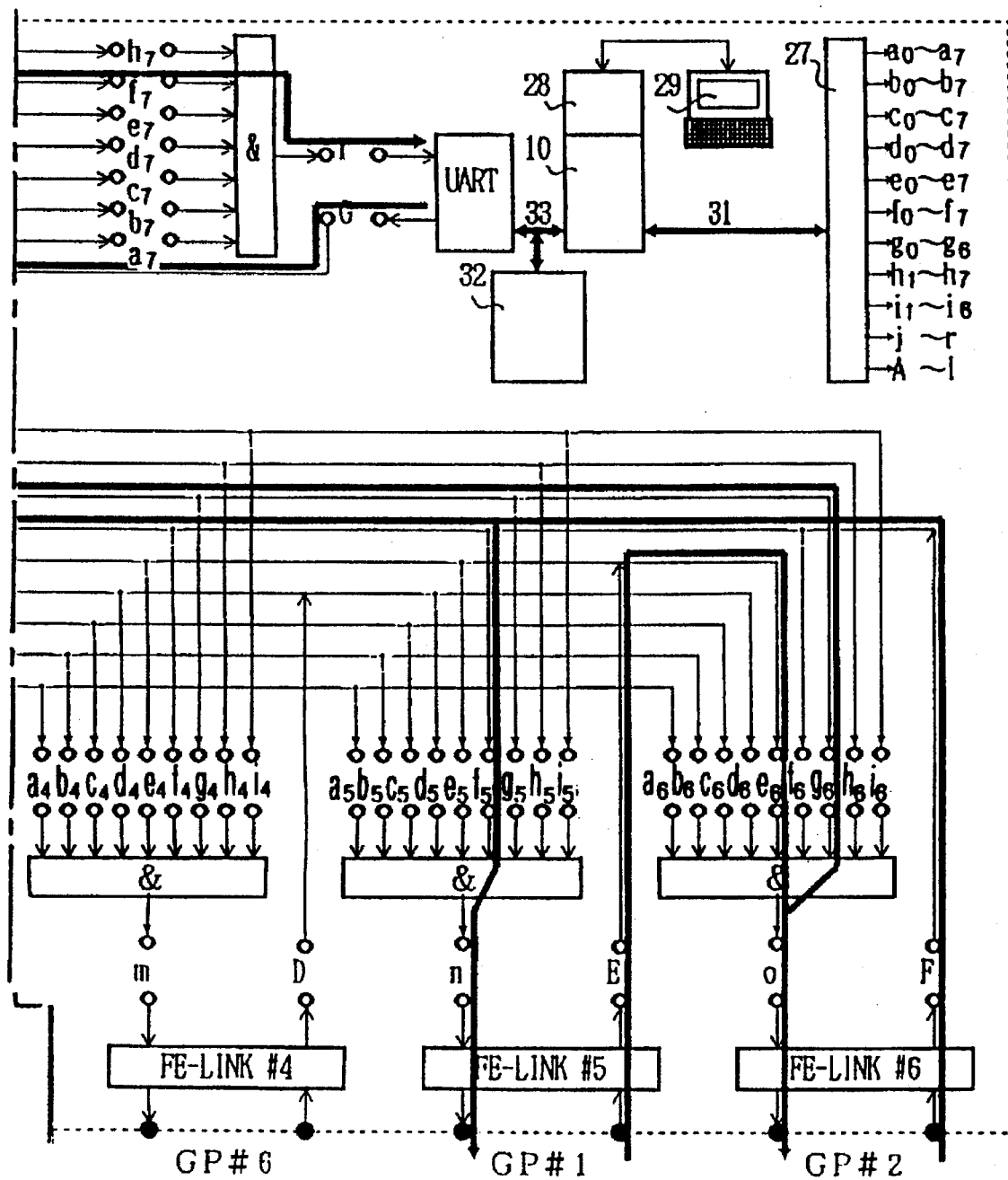
FIG. 47 is a diagram showing a part of the detailed arrangement of the sixteenth application of the present invention having a connection with FIG. 46.

Furthermore, the arrangement of the information path according to the tenth setting (*10) has, as shown in FIGS. 46 and 47 as two-divided, message/command paths (F-f7-r) and (F-f5-n) and a response path (G-g6-o) or (E-e6-o).

Figure 48:
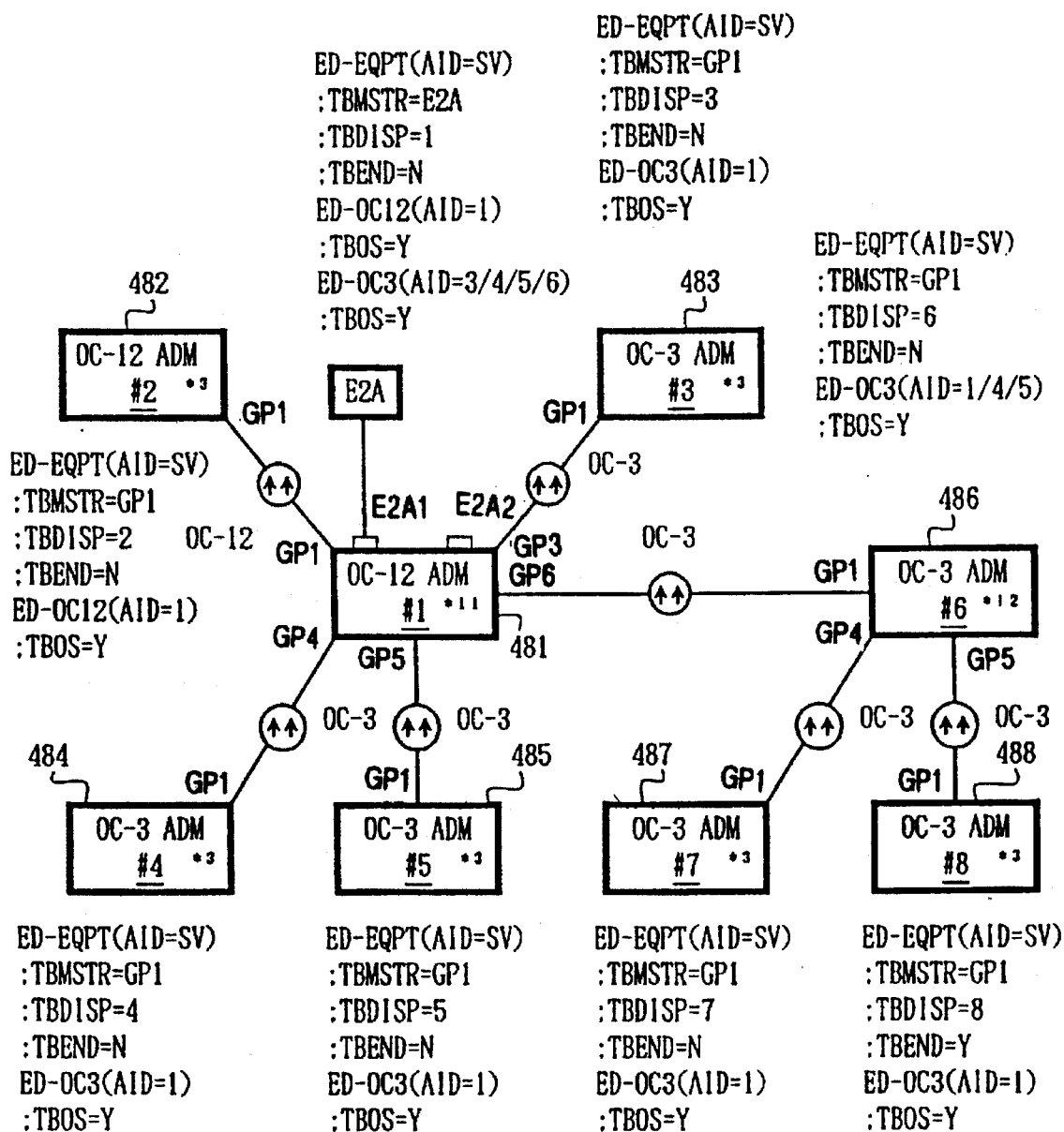
FIG. 48 is a diagram schematically showing a seventh application of the present invention.

Similarly, the application in the form of fiber hubbing in FIG. 48 provides an ADM equipment having the universal link configurators 482–488 provided with the third setting (*3), the universal link configurator 481 provided with an eleventh setting (*11), and the universal link configurator 486 provided with a twelfth setting (*12).

The arrangements of the information path according to the third setting (*3) has been described referring to FIG. 23. The arrangement of the information path according to the eleventh setting (*11) has, as shown in the two-divided FIGS. 49 and 50, message/command paths (H-h7-r), (H-h5-n), (H-hi-j), (H-h2-k), (H-h3-1), and (H-h4-m) and a response path (G-g0-q), (E-e0-q), (A-a0-q), (B-b0-q), (C-c0-q), or (D-d0-q).

Figure 49:
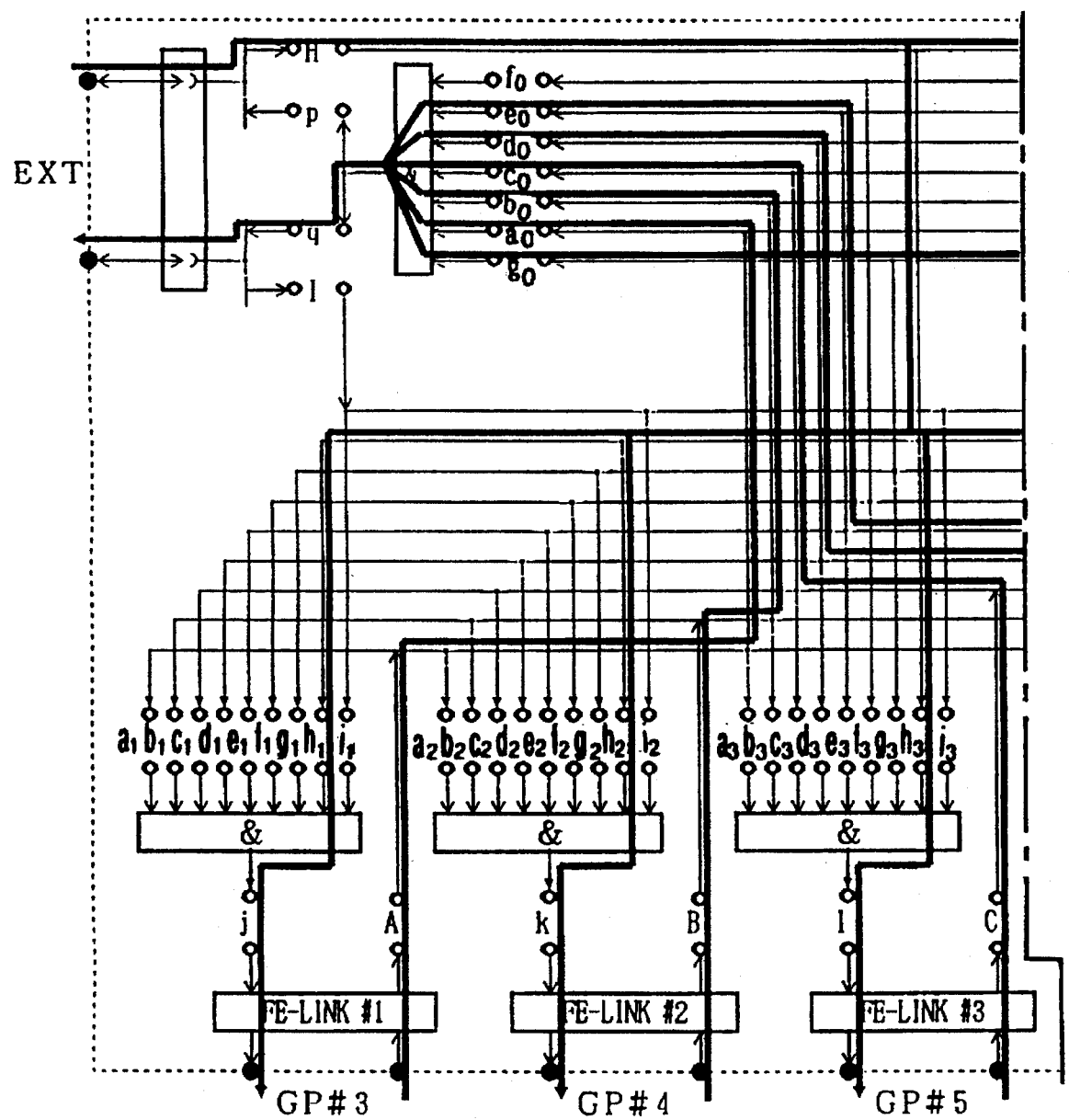
FIG. 49 is a diagram showing a part of a detailed arrangement of a seventeenth application of the present invention.
Figure 50:
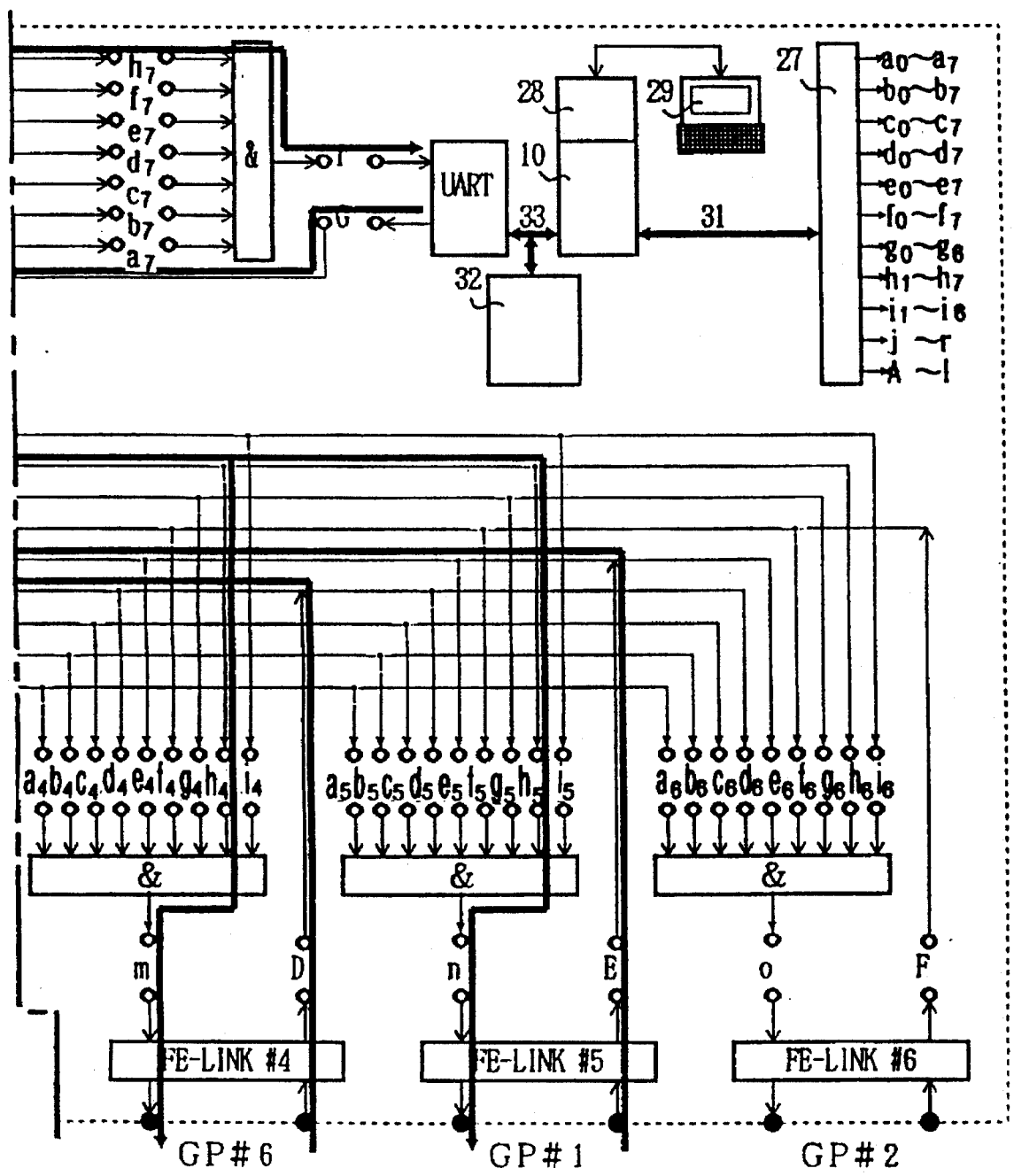
FIG. 50 is a diagram showing a part of the detailed arrangement of the seventeenth applilcation of the present invention having a connection with FIG. 49.

The ADM equipment having the universal link configurator with provisioning in FIGS. 49 and 50 has the same externally connecting system as in FIG. 18. This externally connecting system has a message/command path ((TX)-

(E2A/TBOS)(902)-E2A1(903)-H) from the E2A-TBOS to the OC-12/OC-3 ADM and a response path (q-E2A1(903)-E2A/TBOS)(902)-(RX)) from the OC-12/OC-3 ADM to the E2A-TBOS.

Figure 51:
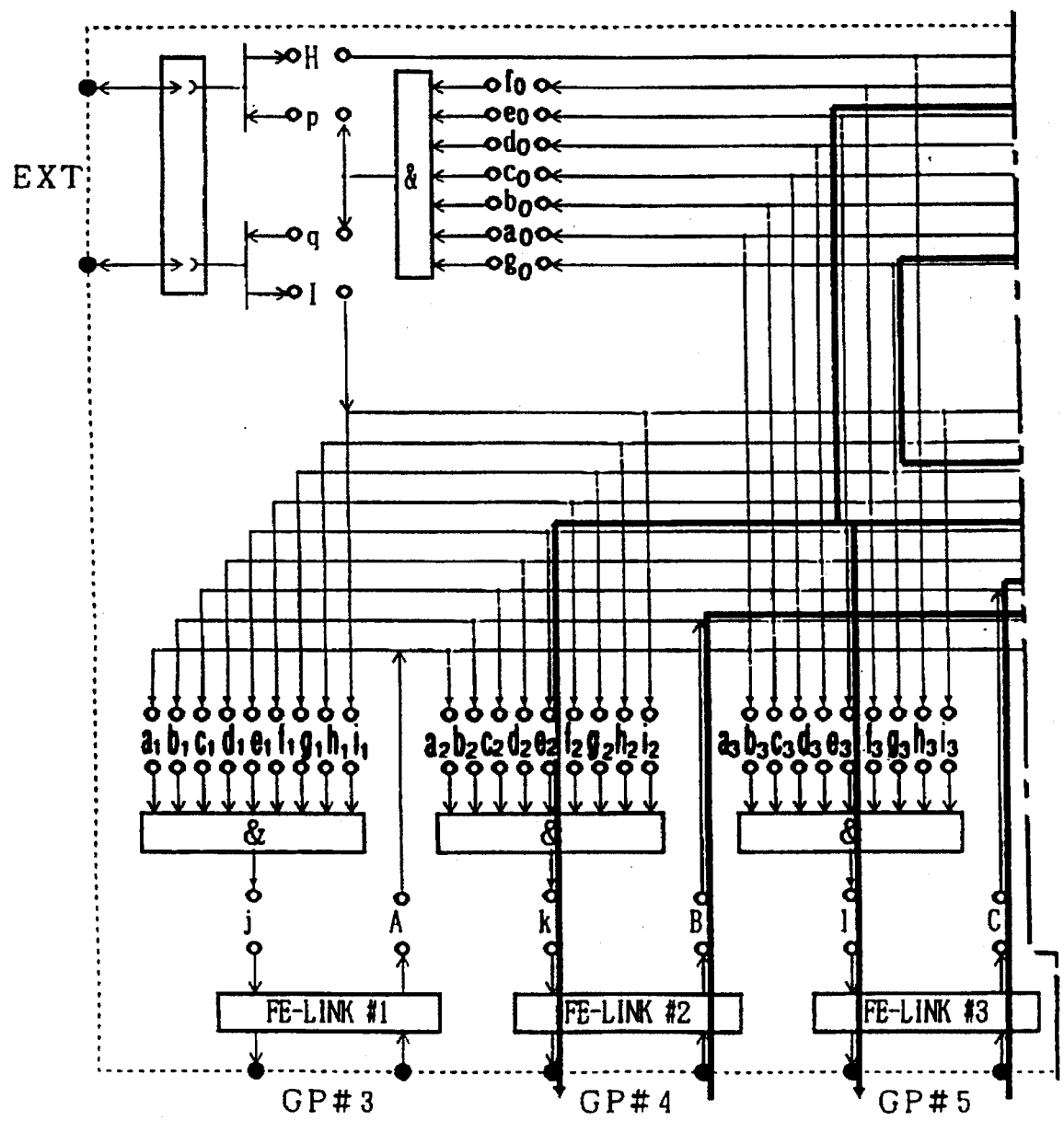
FIG. 51 is a diagram showing a part of a detailed arrangement of a eighteenth application of the present invention; and, FIG. 52 is a diagram showing a part of the detailed arrangement of the eighteenth application of the present invention having a connection with FIG. 51.
Figure 52:
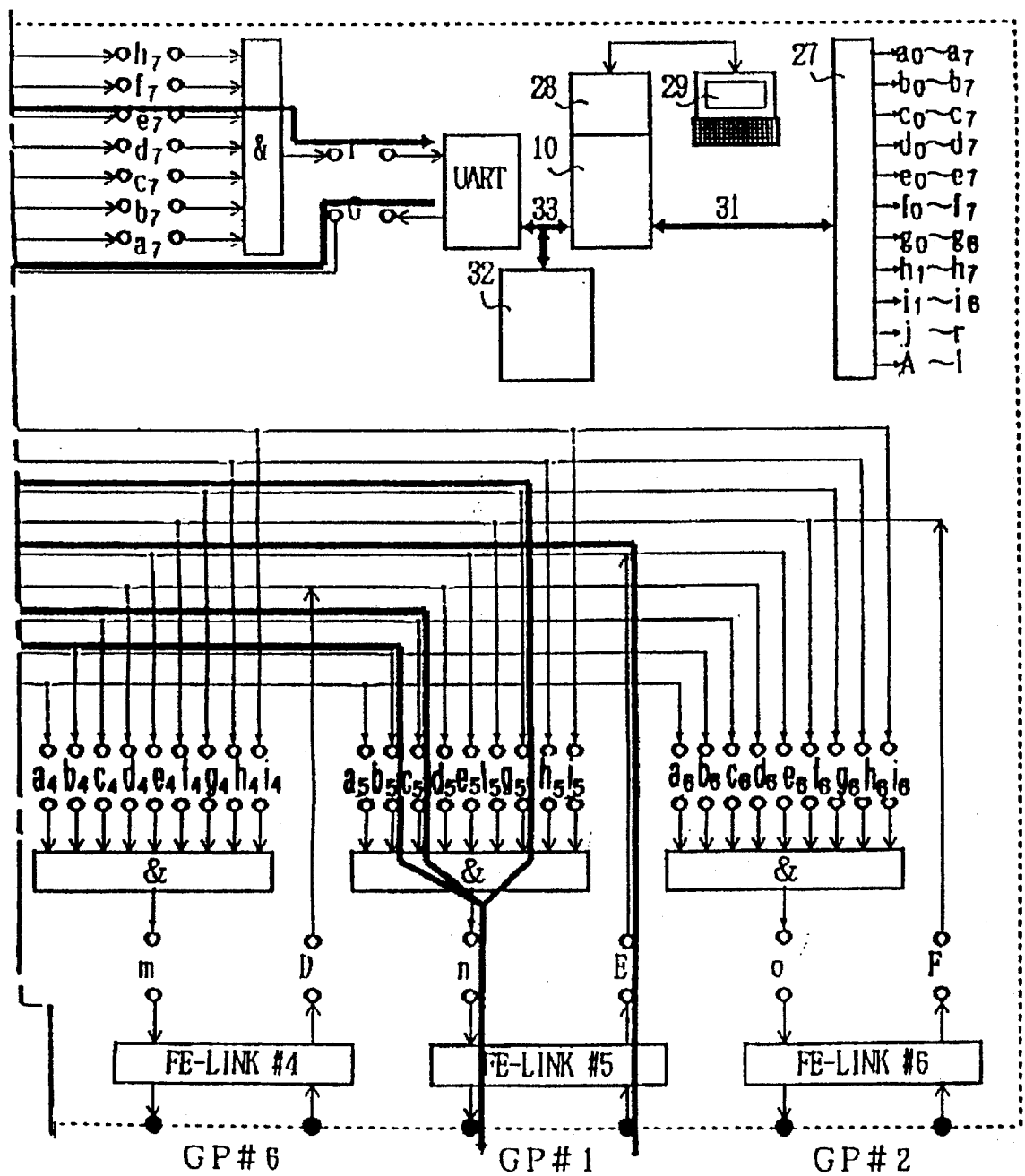

Additionally, the ADM equipment having the universal link configurator provided with a twelfth setting (*12) having message/command paths (E-e7-r), (E-e2-k), and (E-e3-1) and a response path (G-g5-n), (B-b5-n) or (C-c5-n) as shown in FIGS. 51 and 52 as two-divided is also included in a network of fiber hubbing.

While the present invention has been described based on the embodiments, all of the ADM equipments in the network are incorporated with the universal link configurators according to the present invention.

This universal link configurator is subject to an electronic provisioning in conformity with a link configuration forming networks through data communication channel (DCC) facilities completely linked with service bits the band of which is different from that used for the E2A-TBOS within the overhead bits which the ADM equipments preliminarily have and with a defferent externally connecting system of the equipment by the craft virtual terminal 29 of one ADM equipment in the network.

This realizes that all of the information transferring paths (message/command path and response path) relating to concentrated control or concentrated management service by the E2A-TBOS system from the E2A-TBOS equipments directed to those link configurators can be freely combined or segregated.

Furthermore, it is possible to completely link all of the network nodes and the E2A-TBOS equipments for a sole concentrated control or concentrated management regardless of a network topology belonging to the network directly or indirectly.

Consequently, a predetermined message/command issued from those network nodes and the E2A-TBOS equipments for a sole concentrated control/management reach to all of the network nodes completely linked in the network so that the resources in the nodes can be selectively extracted in the form of response from a specific node designated by the message or command.

The present invention can meet the requirement of operating means for an electronic provisionable link configurator which can freely include any network topologies belonging to a network formed by a physical link configuration varying in accordance with increase of carrier current facilities according to the increase of demand of universal function for network configuration (frequently occurring management object, e.g. line subscribers of telephone service) which can be freely changed in arrangement.

It is intended that the present invention may be exploited in other various forms without departing from the spirits or the principle features thereof so that the aforementioned embodiments are described only by way of example and not as a limitation. It is also intended that the scope of the present invention is recited by the apended claims and not be restricted by the descriptions of the specification.

It is further intended that modifications or changes belonging to an equivalent scope of the claims are included in the scope of the present invention.

What we claim is:

1. A universal link configurator provided in each of a plurality of add-drop-multiplexers each provided at each node of a plurality of nodes of a network system with each node being connected to adjacent near end nodes by information transfer paths using a hardwire and to adjacent far end nodes by information transfer paths of independent links, for configuring connections of each node with adjacent near end nodes and far end nodes in the network, the universal link configurator comprising:

first means for converting a first data stream on the hard-wire to TTL/CMOS logic level signals and for converting the TTL/CMOS logic level signals to the first data stream;

a transfer switch logic circuit operatively connected to the first means for switching over the converted first data stream of the TTL/CMOS logic level signals to terminate at an aggregate side or relay at a tributary side at a specific node said converted first data stream of the TTL/CMOS logic level signals;

a plurality of second means, each operatively connected to a corresponding one of the far end nodes for converting second data streams from the far end nodes to the TTL/CMOS logic level signals;

a plurality of switch logic circuits operatively connected to the plurality of the second means for switching over the converted second data streams of the TTL/CMOS logic level signals to terminate at an aggregate side or relay at a tributary side at the specific node said converted second streams of the TTL/CMOS logic level signals; and connecting group means operatively connected to the transfer switch logic circuit and the switch logic circuits for making connections of the first and the second data streams of the TTL/CMOS logic level signals between the first means and the plurality of the switch logic circuits.

2. The universal link configurator according to claim 1, wherein the first means has an interface circuit to interface with an external device, which has a balanced type driver device at a latter stage to provide a balanced output signal and including:

a line impedance for terminating the balanced output signal, and a fail-safe circuit system using Thevenin termination for establishing logic condition in case of an interruption of the balanced output signal.

3. The universal link configurator according to claim 2, wherein the balanced output signal is broadcasted to add-drop-multiplexers located at the near end nodes through hard-wires with a daisy chain connection.

4. The universal link configurator according to claim 3, wherein the hard-wires transmit overhead information, the first data stream being extracted from the overhead information, and wherein the information transfer paths of independent links are formed by an optical transmission line for transmitting a data block train formed of the overhead information and a main signal, and the second data stream is extracted from the overhead information flowing through the optical transmission line.

5. The universal link configurator according to claim 4, wherein the optical transmission line comprises a first ring and a second ring to form a first ring-shaped recursive network and second ring-shaped recursive network, respectively, each of rings of said recursive networks being closed and the hard-wire is connected between the aggregate sides or tributary sides, respectively at specific nodes on the optical transmission line.

6. The universal link configurator according to claim 1, wherein the network system forms a recursive ring-shaped network.

7. The universal link configurator according to claim 1, wherein the network system is composed of optical fiber-connected nodes disposed at point to point and the hard-wire is connected between nodes which are not connected with an optical fiber.

8. The universal link configurator according to claim 1, wherein the network system is composed of optical fiber-connected nodes disposed in a back to back configuration, and the hard-wire is connected between nodes which are not connected with an optical fiber.

9. The universal link configurator according to claim 1, wherein the network system is composed of optical fiber-connected nodes disposed in a fiber hubbing form, and the hard-wire is connected between nodes which are not connected with an optical fiber.

* * * * *